US009420208B2

(12) United States Patent
Tashiro et al.

(10) Patent No.: US 9,420,208 B2
(45) Date of Patent: Aug. 16, 2016

(54) DRIVING METHOD FOR IMAGE PICKUP APPARATUS AND DRIVING METHOD FOR IMAGE PICKUP SYSTEM

(71) Applicant: CANON KABUSHIKI KAISHA, Tokyo (JP)

(72) Inventors: Kazuaki Tashiro, Isehara (JP); Keisuke Ota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/939,500

(22) Filed: Jul. 11, 2013

(65) Prior Publication Data

US 2014/0016006 A1    Jan. 16, 2014

(30) Foreign Application Priority Data

Jul. 13, 2012 (JP) ................................. 2012-157552
Jul. 13, 2012 (JP) ................................. 2012-157553

(51) Int. Cl.
| | | |
|---|---|---|
| *H04N 5/374* | (2011.01) | |
| *H04N 5/217* | (2011.01) | |
| *H04N 5/347* | (2011.01) | |
| *H04N 5/378* | (2011.01) | |
| *H04N 9/04* | (2006.01) | |

(52) U.S. Cl.
CPC ............. *H04N 5/3741* (2013.01); *H04N 5/217* (2013.01); *H04N 5/347* (2013.01); *H04N 5/378* (2013.01); *H04N 9/045* (2013.01)

(58) Field of Classification Search
CPC ..... H04N 5/217; H04N 5/347; H04N 5/3741; H04N 5/378; H04N 9/045
See application file for complete search history.

(56) References Cited

U.S. PATENT DOCUMENTS

| | | | | |
|---|---|---|---|---|
| 8,314,376 B2 * | 11/2012 | Watanabe | ......... | H01L 27/14609 250/208.1 |
| 2009/0167915 A1 * | 7/2009 | Hirota | .................... | H04N 5/357 348/302 |
| 2010/0060754 A1 * | 3/2010 | Ogura | .................... | H04N 5/378 348/241 |
| 2010/0118167 A1 * | 5/2010 | Johnson | ............... | H04N 5/3745 348/294 |
| 2010/0328511 A1 * | 12/2010 | Tashiro | ................ | H04N 5/3575 348/301 |
| 2011/0007193 A1 * | 1/2011 | Fujimura | ............... | H04N 5/347 348/294 |
| 2012/0262616 A1 * | 10/2012 | Sa | ........................ | H04N 5/3745 348/311 |
| 2012/0314106 A1 * | 12/2012 | Kanemitsu | ............. | H04N 5/361 348/243 |
| 2012/0314908 A1 * | 12/2012 | Hirasawa | .................. | G06T 5/20 382/106 |
| 2014/0016009 A1 * | 1/2014 | Tashiro | .................. | H04N 5/335 348/302 |

FOREIGN PATENT DOCUMENTS

| | | |
|---|---|---|
| JP | H04-192890 A | 7/1992 |
| JP | H11-275367 A | 10/1999 |
| JP | 2003-9003 A | 1/2003 |
| JP | 2010-239337 A | 10/2010 |
| JP | 2011-23825 A | 2/2011 |

* cited by examiner

*Primary Examiner* — Amy Hsu

(74) *Attorney, Agent, or Firm* — Canon U.S.A., Inc., IP Division

(57) ABSTRACT

A driving method for an image pickup apparatus that includes a plurality of pixels each including a photoelectric conversion portion includes performing photoelectric conversion in each of the plurality of photoelectric conversion portions during a period between first time and second time, generating a plurality of first signals, each being a signal deriving from electric charge generated through the photoelectric conversion in the photoelectric conversion portion, which is a plurality of signals to be generated for each of the plurality of pixels, and generating a plurality of second signals by performing moving average processing on the plurality of first signals.

18 Claims, 33 Drawing Sheets

| FIG.3A | FIG.3B |
|---|---|

FIG.6A

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A | R | Gr | R | Gr | R | Gr | R | Gr | R | Gr | R | Gr | R | Gr | R | Gr |
| B | Gb | B | Gb | B | Gb | B | Gb | B | Gb | B | Gb | B | Gb | B | Gb | B |
| C | R | Gr | R | Gr | R | Gr | R | Gr | R | Gr | R | Gr | R | Gr | R | Gr |
| D | Gb | B | Gb | B | Gb | B | Gb | B | Gb | B | Gb | B | Gb | B | Gb | B |
| E | R | Gr | R | Gr | R | Gr | R | Gr | R | Gr | R | Gr | R | Gr | R | Gr |
| F | Gb | B | Gb | B | Gb | B | Gb | B | Gb | B | Gb | B | Gb | B | Gb | B |
| G | R | Gr | R | Gr | R | Gr | R | Gr | R | Gr | R | Gr | R | Gr | R | Gr |
| H | Gb | B | Gb | B | Gb | B | Gb | B | Gb | B | Gb | B | Gb | B | Gb | B |
| I | R | Gr | R | Gr | R | Gr | R | Gr | R | Gr | R | Gr | R | Gr | R | Gr |
| J | Gb | B | Gb | B | Gb | B | Gb | B | Gb | B | Gb | B | Gb | B | Gb | B |
| K | R | Gr | R | Gr | R | Gr | R | Gr | R | Gr | R | Gr | R | Gr | R | Gr |
| L | Gb | B | Gb | B | Gb | B | Gb | B | Gb | B | Gb | B | Gb | B | Gb | B |

FIG.6B

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A |   |   |   |   |   |   |   |   |   |   |   |   |   |   |   |   |
| B |   | R | Gr |   |   | R | Gr |   |   | R | Gr |   |   | R | Gr |   |
| C |   | Gb | B |   |   | Gb | B |   |   | Gb | B |   |   | Gb | B |   |
| D |   |   |   | R | Gr |   |   |   |   | R | Gr |   |   | R | Gr |   |
| E |   |   | Gb | B |   |   | Gb | B |   |   | Gb | B |   |   | Gb | B |
| F |   | R | Gr |   |   | R | Gr |   |   | R | Gr |   |   | R | Gr |   |
| G |   | Gb | B |   |   | Gb | B |   |   | Gb | B |   |   | Gb | B |   |
| H |   |   |   | R | Gr |   |   | R | Gr |   |   | R | Gr |   |   | R | Gr |
| I |   |   | Gb | B |   |   | Gb | B |   |   | Gb | B |   |   | Gb | B |
| J |   | R | Gr |   |   | R | Gr |   |   | R | Gr |   |   | R | Gr |   |
| K |   | Gb | B |   |   | Gb | B |   |   | Gb | B |   |   | Gb | B |   |
| L |   |   |   | R | Gr |   |   | R | Gr |   |   | R | Gr |   |   | R | Gr |

FIG.7A

|   | 1 | 2 | 3 | 4 | 5 | 6 | 7 | 8 |
|---|---|---|---|---|---|---|---|---|
| A | R | Gr | R | Gr | R | Gr | R | Gr |
| B | Gb | B | Gb | B | Gb | B | Gb | B |
| C | R | Gr | R | Gr | R | Gr | R | Gr |
| D | Gb | B | Gb | B | Gb | B | Gb | B |
| E | R | Gr | R | Gr | R | Gr | R | Gr |
| F | Gb | B | Gb | B | Gb | B | Gb | B |
| G | R | Gr | R | Gr | R | Gr | R | Gr |
| H | Gb | B | Gb | B | Gb | B | Gb | B |

|   | 1 | 2 | 3 | 4 | 5 | 6 | 7 | 8 |
|---|---|---|---|---|---|---|---|---|
| A |   |   |   |   |   |   |   |   |
| B |   | R | Gr | R | Gr | R | Gr | R |
| C |   | Gb | B | Gb | B | Gb | B | Gb |
| D |   | R | Gr | R | Gr | R | Gr | R |
| E |   | Gb | B | Gb | B | Gb | B | Gb |
| F |   | R | Gr | R | Gr | R | Gr | R |
| G |   | Gb | B | Gb | B | Gb | B | Gb |
| H |   | R | Gr | R | Gr | R | Gr | R |

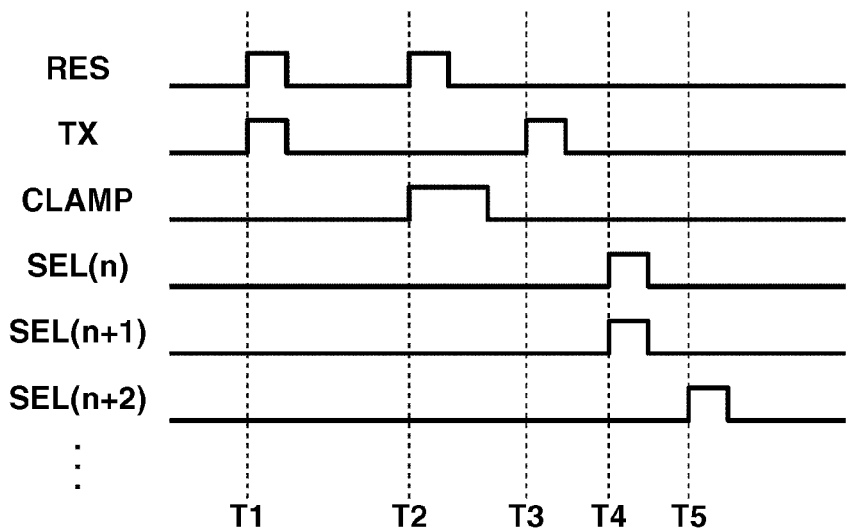
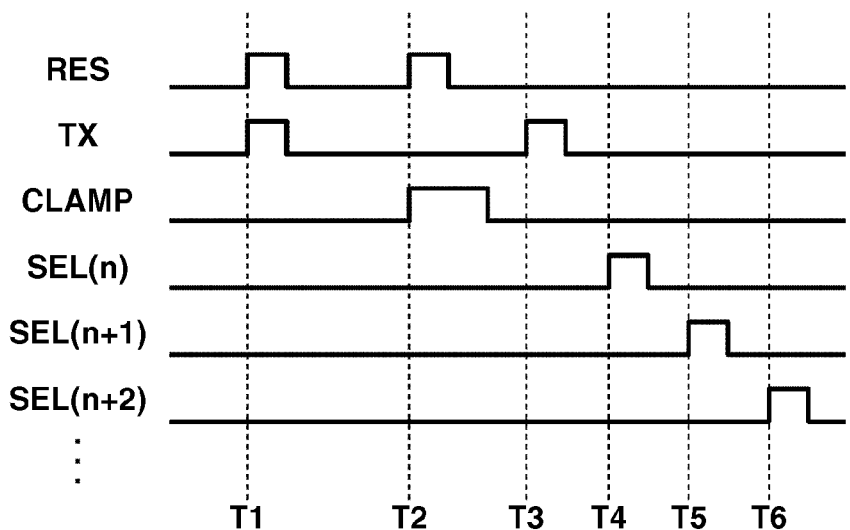

|   | 1 | 2 | 3 | 4 | 5 | 6 | 7 | 8 |
|---|---|---|---|---|---|---|---|---|
| A | R | Gr | R | Gr | R | Gr | R | Gr |
| B | Gb | B | Gb | B | Gb | B | Gb | B |
| C | R | Gr | R | Gr | R | Gr | R | Gr |
| D | Gb | B | Gb | B | Gb | B | Gb | B |
| E | R | Gr | R | Gr | R | Gr | R | Gr |
| F | Gb | B | Gb | B | Gb | B | Gb | B |
| G | R | Gr | R | Gr | R | Gr | R | Gr |
| H | Gb | B | Gb | B | Gb | B | Gb | B |

|   | 1 | 2 | 3 | 4 | 5 | 6 | 7 | 8 |
|---|---|---|---|---|---|---|---|---|
| A |   |   |   |   |   |   |   |   |
| B |   | R | Gr | R | Gr | R | Gr | R |
| C |   | Gb | B | Gb | B | Gb | B | Gb |
| D |   | R | Gr | R | Gr | R | Gr | R |
| E |   | Gb | B | Gb | B | Gb | B | Gb |
| F |   | R | Gr | R | Gr | R | Gr | R |
| G |   | Gb | B | Gb | B | Gb | B | Gb |
| H |   | R | Gr | R | Gr | R | Gr | R |

DRIVING METHOD FOR IMAGE PICKUP APPARATUS AND DRIVING METHOD FOR IMAGE PICKUP SYSTEM

BACKGROUND OF THE INVENTION

1. Field of the Invention

The present disclosure relates to an image pickup apparatus, an image pickup system, a driving method for an image pickup apparatus and a driving method for an image pickup system.

2. Description of the Related Art

A technique capable of reducing noises that may be caused by high-frequency components (e.g., aliasing distortion and moire) is conventionally proposed. As discussed in Japanese Patent Application Laid-Open No. 11-275367, it is known to the present inventors that moire can be reduced when moving average filter processing is performed on an image signal output from an image pickup apparatus.

Further, as discussed in Japanese Patent Application Laid-Open No. 4-192890, it is known to the present inventors that an addition processing of pixel signals is performed by changing the combination of the pixels to be added between odd and even fields in an interlace type charge-coupled device (CCD) sensor. Performing the above-mentioned addition processing is useful to reduce the aliasing distortion.

Further, as discussed in Japanese Patent Application Laid-Open No. 2011-23825, it is known to the present inventors that adding signals of a plurality of pixels is used to reduce the number of output signals. In other words, it is expected that a higher output rate can be attained by adding signals of a plurality of pixels.

In recent years, there has been proposed an image pickup apparatus which reduces noises such as an aliasing distortion or a moire caused by a high-frequency component without use of an optical low-pass filter. In an image pickup apparatus described in Japanese Patent Application Laid-Open No. 2006-270658, electric charges generated in one photoelectric conversion unit are transferred to two output circuits. The two output circuits are disposed such that they are mutually shifted by one photoelectric conversion unit in row and column directions. Electric charges are transferred to each of the two output circuits from four photoelectric conversion units therearound. The transferred electric charge in each output circuit is then mixed to output an electric signal. It is therefore deemed possible to reduce the aliasing distortion by synthesizing image data obtained from the two output circuits without using the optical low-pass filter.

In addition, Japanese Patent Application Laid-Open No. 2003-009003 discloses to hold a signal amplified by an in-pixel amplification unit in a capacitance of each pixel, and to add the signals held by the capacitances of pixels.

SUMMARY OF THE INVENTION

According to an aspect of the present invention, provided is a driving method for an image pickup apparatus that includes a plurality of pixels each including a photoelectric conversion portion. The driving method includes performing photoelectric conversion in each of the plurality of photoelectric conversion portions during a period starting at first time and ending at second time. The driving method includes generating a plurality of first signals, each being a signal deriving from electric charge generated through the photoelectric conversion in the photoelectric conversion portion, wherein at least two of the first signals are generated for each of the plurality of pixels. The driving method includes generating a plurality of second signals by performing moving average processing on the plurality of first signals.

According to another aspect of the present invention, provided is a driving method for an image pickup apparatus that includes a plurality of pixels each including a photoelectric conversion portion. The driving method includes performing photoelectric conversion in each of the plurality of photoelectric conversion portions during a period starting at first time and ending at second time. The driving method includes generating a plurality of first signals, each being a signal deriving from electric charge generated through the photoelectric conversion in the photoelectric conversion portion, wherein at least two of the first signals are generated for each of the plurality of pixels. The driving method includes generating a plurality of second signals by adding or averaging the at least two of first signals generated for each of the plurality of pixels to or with the first signals of respectively different pixels. The driving method includes performing adding or averaging processing in such a way as to equalize an alignment pitch of a plurality of photoelectric conversion portions in a first direction with a signal centroid pitch of the plurality of second signals in the first direction.

According to yet another aspect of the present invention, provided is a driving method for an image pickup apparatus that includes a plurality of pixels each including a photoelectric conversion portion. The driving method includes performing photoelectric conversion in each of the plurality of photoelectric conversion portions during a period starting at first time and ending at second time. The driving method includes outputting a plurality of first signals, each being a signal deriving from electric charge generated through the photoelectric conversion in the photoelectric conversion portion, wherein at least two of the first signals are generated for each of the plurality of pixels. The driving method includes generating a plurality of second signals by adding or averaging the at least two of first signals generated for each of the plurality of pixels to or with first signals of respectively different pixels. The driving method includes performing adding or averaging processing in such a way as to equalize an alignment pitch of a plurality of photoelectric conversion portions in a first direction with a sampling pitch of the plurality of second signals in the first direction.

According to yet another aspect of the present invention, provided is a driving method for an image pickup system that includes an image pickup apparatus that includes a plurality of pixels each including a photoelectric conversion portion and a signal processing device that can process a signal output from the image pickup apparatus. The driving method includes performing photoelectric conversion in each of the plurality of photoelectric conversion portions during a period starting at first time and ending at second time. The driving method includes generating a plurality of first signals, each being a signal deriving from electric charge generated through the photoelectric conversion in the photoelectric conversion portion, wherein at least two of the first signals are generated for each of the plurality of photoelectric conversion portions. The driving method includes generating a plurality of second signals by performing moving average processing on the plurality of first signals.

According to yet another aspect of the present invention, an image pickup apparatus that includes a plurality of pixels disposed in an image pickup region; and a connecting unit disposed in the image pickup region. Each of the plurality of pixels includes: a photoelectric conversion unit; an amplification unit configured to output a signal that is based on an electric charge generated in the photoelectric conversion unit; and a memory unit configured to hold the signal. The connecting unit mutually connects the memory units included in a first combination of pixels among the plurality of pixels. The connecting unit mutually connects the memory units included in a second combination of pixels among the plurality of pixels, the second combination including at least one pixel included in the first combination. The first combination of pixels includes a pixel not included in the second combination. The second combination of pixels includes a pixel not included in the first combination.

According to yet another aspect of the present invention, an image pickup apparatus comprising: a plurality of pixels disposed in an image pickup region; and a connecting unit disposed in the image pickup region. Each of the plurality of pixels includes: a photoelectric conversion unit; an amplification unit configured to output a signal that is based on an electric charge generated in the photoelectric conversion unit; and a memory unit configured to hold the signal. The connecting unit mutually connects the memory units included in a first combination of pixels among the plurality of pixels. The connecting unit mutually connects the memory units included in a second combination of pixels among the plurality of pixels, the second combination including at least one pixel included in the first combination and another pixel not included in the first combination. The memory unit included in the other pixel is not connected to the memory unit included in any of the first combination of pixels when the connecting unit mutually connects the memory units included in the first combination of pixels.

Further features of the present invention will become apparent from the following description of exemplary embodiments with reference to the attached drawings.

BRIEF DESCRIPTION OF THE DRAWINGS

FIGS. 6A and 6B schematically illustrate an imaging area of the image pickup apparatus according to an exemplary embodiment.

FIGS. 7A and 7B schematically illustrate an imaging area of the image pickup apparatus according to an exemplary embodiment.

FIGS. 10A and 10B are timing charts illustrating driving signals according to an exemplary embodiment.

FIGS. 25A and 25B are a set of schematic views illustrating an image pickup region in an exemplary embodiment of an image pickup apparatus according to the present invention;

FIGS. 26A and 26B are a set of schematic views illustrating an image pickup region in an exemplary embodiment of an image pickup apparatus according to the present invention;

DESCRIPTION OF THE EMBODIMENTS

The First Group of the Embodiments

According to a method that uses signals of different fields to form a piece of image, as discussed in Japanese Patent Application Laid-Open No. 4-192890, there is a possibility that the image quality deteriorates due to a deformation of a moving subject. Further, according to the method discussed in Japanese Patent Application Laid-Open No. 2011-23825, there is a possibility that the image quality deteriorates due to reduction in the resolution.

To solve the above-mentioned problems, some of the exemplary embodiments of the present invention provide an image pickup apparatus driving method that can reduce noises that may be caused by high-frequency components while improving the image quality (e.g., aliasing distortion and moire). According to some of the exemplary embodiments of the present invention, it is feasible to improve the image quality while reducing noises that may be caused by high-frequency components (e.g., moire).

An exemplary embodiment of the present invention is an image pickup apparatus driving method. The driving method according to the present exemplary embodiment includes performing moving average processing on signals of a plurality of pixels of an image pickup apparatus. The moving average processing is, for example, adding (or averaging) a plurality of signals while successively changing their combination in such a way as to equalize the signal centroid pitch of pre-addition (or pre-averaging) signals with the signal centroid pitch of post-addition (or post-averaging) signals. The signal centroid pitch of a plurality of signals is a sampling pitch. Alternatively, the moving average processing is adding or averaging a plurality of signals while successively changing their combination in such a way as to equalize the number of signal centroids of pre-addition (or pre-averaging) signals positioned per unit length with the number of signal centroids of post-addition (or post-averaging) signals positioned per unit length.

The driving method according to the present exemplary embodiment is characterized by generating, in each pixel, a plurality of signals deriving from electric charge generated through photoelectric conversion during the period between first time and second time. In other words, the driving method according to the present exemplary embodiment is characterized by outputting a signal deriving from electric charge generated through photoelectric conversion in the same photoelectric conversion period, for each pixel, a plurality of times. An essential configuration according to an exemplary embodiment of the present invention is described in detail below with reference to FIGS. 1A and 1B.

Figure 1A:
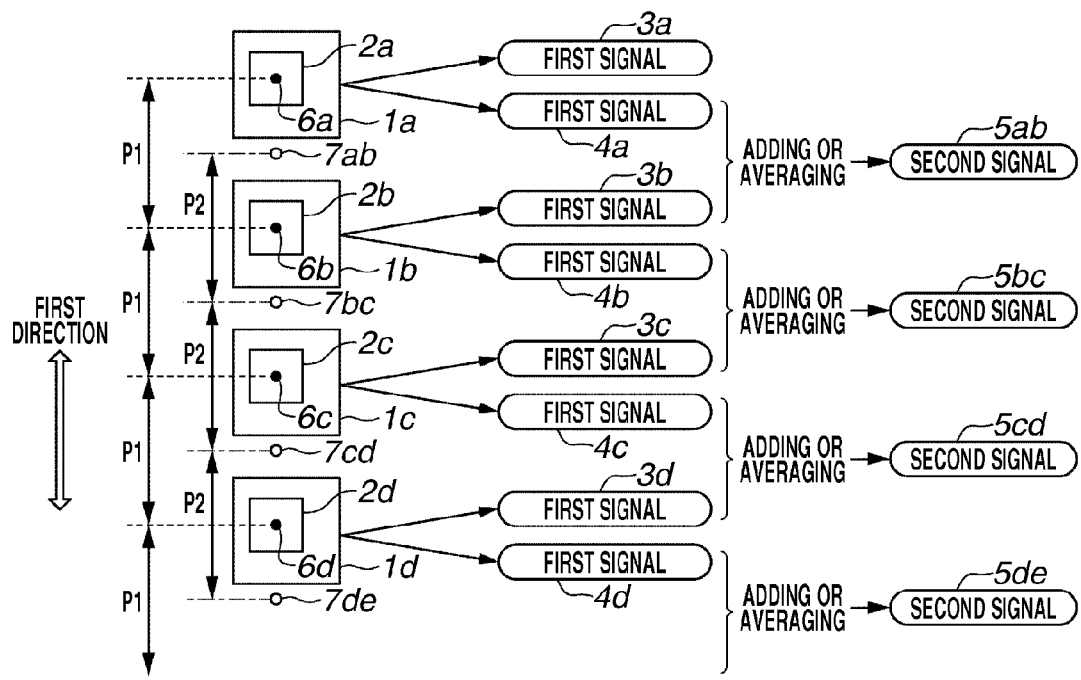
FIGS. 1A and 1B schematically illustrate an essential configuration according to an exemplary embodiment of the present invention.

FIG. 1A schematically illustrates an essential configuration according to an exemplary embodiment of the present invention. The image pickup apparatus illustrated in FIG. 1A includes a plurality of pixels, which are disposed on a semiconductor substrate. FIG. 1A illustrates a schematic layout of four pixels 1a to 1d. Although not illustrated in FIG. 1A, the image pickup apparatus can include five or more pixels. The semiconductor substrate includes at least one principal plane. A plurality of pixels can be arranged in a one-dimensional or two-dimensional pattern on the principal plane. Further, in FIG. 1A, first signals deriving from electric charge generated from each pixel through photoelectric conversion and second signals that can be generated through adding or averaging processing are respectively indicated by an arrow.

Figure 1B:
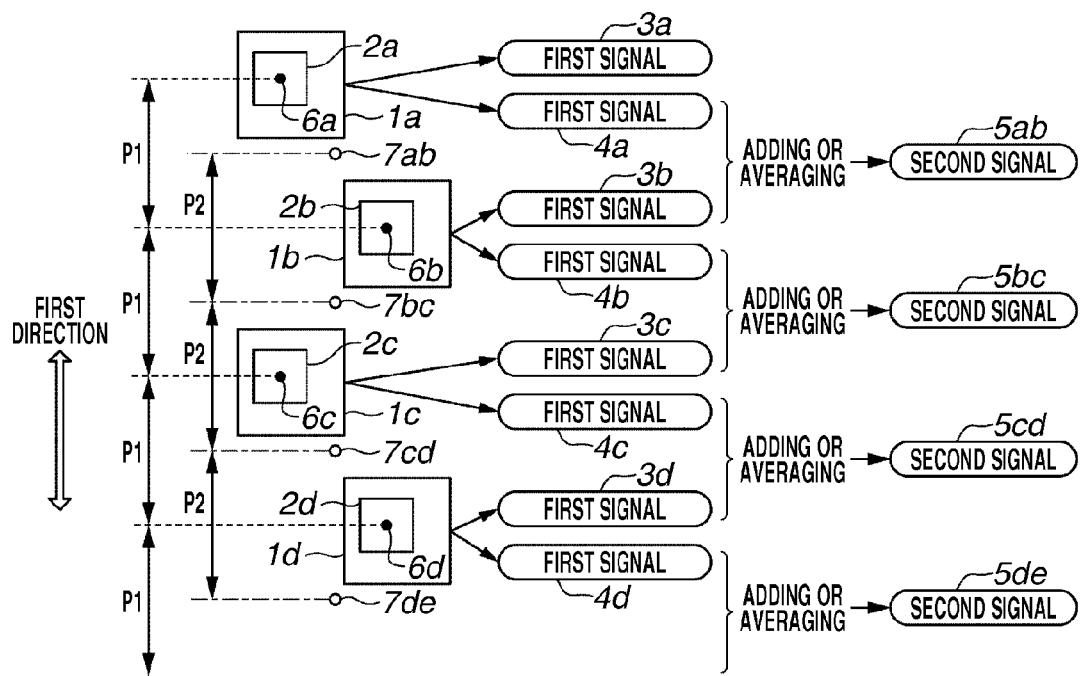

In the description of FIGS. 1A and 1B, each pixel is simply referred to as "pixel 1" when the description is commonly applied to all pixels. On the other hand, if the description is uniquely applied to an individual pixel, the pixel is suffixed with an alphabet (e.g., pixel 1c). In the following description, each generated signal and each constituent component of the pixel are sufficed with only a reference number if the description is commonly applied to other signals or components and are suffixed with a combination of a reference number and an alphabet in a case where the description is individually applied to the signal or component.

Each pixel 1 includes a photoelectric conversion portion 2. The photoelectric conversion portion 2 can photoelectrically convert incident light into electric charge. In other words, the photoelectric conversion portion 2 can generate a signal deriving from the incident light. The photoelectric conversion portion 2 is, for example, a photodiode. Further, each pixel 1 can include an amplification portion that can output an amplified signal based on electric charge generated by the photoelectric conversion portion 2.

The driving method according to the present exemplary embodiment includes a step of causing each of a plurality of photoelectric conversion portions to perform photoelectric conversion during the period from first time to second time. Further, the driving method according to the present exemplary embodiment can include a step of storing the electric charge generated through the photoelectric conversion. In this step, the generated electric charges is continuously stored after the first time until the second time. The generated electric charge can be stored in the photoelectric conversion portion 2. Alternatively, the pixel 1 can include a storage portion dedicated to store the generated electric charge.

The first time and the second time can be independently set for each pixel 1. The period from the first time to the second time can be identical to a single exposure period required when the image pickup apparatus performs exposure processing. For example, the first time can be relevant to a starting operation of the image pickup apparatus (e.g., mechanical shutter opening timing, or electrical shutter release timing). Further, the second time can be relevant to an ending operation of the image pickup apparatus (e.g., mechanical shutter closing timing, or stored charge transfer timing). Hereinafter, a relationship between the period between the first time and the second time in each pixel 1 and the exposure period of the image pickup apparatus is described below.

An exposure method of the image pickup apparatus is roughly classified into a global shutter type or a rolling shutter type. The global shutter type exposure method is characterized in that the exposure period starts and ends simultaneously in all pixels. According to the above-mentioned exposure method, for example, the period from the first time to the second time during which the photoelectric conversion portion 2a of the pixel 1a performs photoelectric conversion is identical to the period from the first time to the second time during which the photoelectric conversion portion 2b of the pixel 1b performs photoelectric conversion. More specifically, the first time having been set for the pixel 1a is equal to the first time having been set for the pixel 1b. The second time having been set for the pixel 1a is equal to the second time having been set for the pixel 1b. The period from the first time to the second time is a period during which electric charge generated by the photoelectric conversion portions 2a and 2b can be stored.

On the other hand, the rolling shutter type exposure method is characterized in that the exposure period starts and ends differently in respective pixels. For example, the period from the first time to the second time in the pixel 1a does not completely coincide with the period from the first time to the second time in the pixel 1b. More specifically, the first time having been set for the pixel 1a is different from the first time having been set for the pixel 1b. Further, the second time having been set for the pixel 1a is different from the second time having been set for the pixel 1b.

The driving method according to the present exemplary embodiment includes a step of generating, for each pixel, a plurality of first signals 3 and 4 deriving from electric charge generated through the photoelectric conversion during the period from the first time to the second time. In the present exemplary embodiment, the start time and the end time of the exposure period of the first signal 3 are substantially identical to those of the first signal 4. Therefore, the first signals 3 and 4 are signals deriving from electric charge generated through the photoelectric conversion during the same period. The first signals 3 and 4 are signals that are not yet added to or averaged with another signal deriving from electric charge generated through the photoelectric conversion in other pixel 1. More specifically, the first signal is a pre-adding or pre-averaging signal. Generating a plurality of first signals in a semiconductor substrate is desired.

As an example generation method, for example, the generated electric charge can be transferred to a plurality of transfer destinations at a predetermined ratio in a parallel fashion. Alternatively, it is useful to sample-hold a signal output from an amplification portion with two capacitors. In this case, two capacitors can be included in a column circuit provided for a plurality of pixels. As another example, two capacitors can be included in each pixel 1. The amplified signal output via the amplification portion is a first signal generated for the pixel 1.

Further, as another generation method, two digital signals can be output. For example, it is useful to perform analog/digital conversion (hereinafter, referred to as AD conversion) processing on an output analog signal and store the generated digital signal in two memories. Alternatively, a digital signal stored in one memory can be output a plurality of times to perform calculations a plurality of times. Further, as another example, using two counters is useful to perform two-series of AD conversions on one analog signal output from the pixel 1 in parallel. In this case, a plurality of signals output from a comparator as a plurality of comparison results can be a plurality of first signals generated for one pixel.

The driving method according to the present exemplary embodiment includes a moving average processing step of adding or averaging a plurality of first signals 3 and 4 of one pixel and first signals of another pixel. More specifically, the driving method includes generating a second signal 5$ab$ by adding or averaging a first signal 4$a$ of the pixel 1$a$ and a first signal 3$b$ of the pixel 1$b$. The driving method includes generating a second signal 5$bc$ by adding or averaging a first signal 4$b$ of the pixel 1$b$ and a first signal 3$c$ of the pixel 1$c$. The driving method includes generating a second signal 5$cd$ by adding or averaging a first signal 4$c$ of the pixel 1$c$ and a first signal 3$d$ of the pixel 1$d$. The driving method further includes generating a second signal 5$de$ by adding or averaging a first signal 4$d$ of the pixel 1$d$ and a first signal 3$e$ of a pixel 1$e$(not illustrated). As mentioned above, the driving method according to the present exemplary embodiment includes generating a plurality of second signals by adding or averaging first signals of two pixels 1. In this respect, each of the second signals is a post-addition or post-averaging signal. When the second signal 5 is described in the following description, a combination of alphabets suffixed to the signal represents two pixels 1 that correspond to the second signal 5.

As mentioned above, each of the first signals 3 and 4 is a pre-addition signal or a pre-averaging signal. The second signal 5 is a post-addition signal or a post-averaging signal. When it is not specifically mentioned in the following description, if one of the pre-addition signal and the pre-averaging signal is described, it should be regarded that the same description can be equally applied to the other. Therefore, the description "pre-addition signal, or pre-averaging signal" is simply referred to as "pre-addition signal" or "pre-averaging signal." The same thing is applied to the post-addition signal and the post-averaging signal.

Subsequently, a relationship between a signal centroid pitch of pre-addition signals and a signal centroid pitch of post-addition signals in the moving average processing is described below. In the moving average processing, the signal centroid pitch of pre-addition signals is equal to the signal centroid pitch of post-addition signals in the first direction. More specifically, the sampling pitch remains the same before and after the adding or averaging processing. In another viewpoint, the number of signal centroids of post-addition signals per unit length in the first direction is identical to the number of signal centroids of pre-addition signals per unit length in the first direction. In the present exemplary embodiment, the first direction is parallel to the principal plane of the semiconductor substrate.

In FIG. 1A, a plurality of black dots indicates centroids 6 of respective photoelectric conversion portions 2. The centroid 6 of each photoelectric conversion portion 2 can be geometrically determined based on an outer boundary of the photoelectric conversion portion 2 on a predetermined plane. In the present exemplary embodiment, the predetermined plane is parallel to the principal plane of the semiconductor substrate. In general, the photoelectric conversion portion 2 has a three-dimensional structure. Therefore, the outer boundary of the photoelectric conversion portion 2 can be determined by a cutting plane of the photoelectric conversion portion 2.

The outer boundary of the photoelectric conversion portion 2 is, for example, a PN-junction surface of a semiconductor area to which signal charges can be collected, which is a part of the semiconductor area that constitutes the photoelectric conversion portion 2. If the signal charges are electrons, the semiconductor area to which signal charges can be collected is an N-type semiconductor area of the photodiode. Further, in a case where the pixel 1 includes a transfer gate that controls electric charge transferred from the photoelectric conversion portion 2, an edge of the transfer gate positioned on the photoelectric conversion portion 2 side can be included as apart of the outer boundary of the photoelectric conversion portion 2.

If photolithography processes are usable in the manufacturing of an image pickup apparatus, a mask pattern used in the photolithography substantially defines the outer boundary of the photoelectric conversion portion 2. For example, a mask pattern used in a process of forming a semiconductor area where signal charges are collected substantially defines the outer boundary of the semiconductor area where signal charges are collected. Further, a mask pattern used in a process of forming a gate electrode of a transfer transistor substantially defines the edge of the gate electrode positioned on the photoelectric conversion portion 2 side.

If it is difficult to determine the centroid based on the outer boundary of the photoelectric conversion portion 2 on a predetermined plane, or in a case where the centroid cannot be uniquely determined, it is useful to determine the position of the centroid based on a structure arranged on the photoelectric conversion portion 2. For example, if the wiring defines one aperture for one photoelectric conversion portion, it is useful to determine the centroid based on the shape of the aperture in a plane view. If there is not any aperture defined for one photoelectric conversion portion, it is useful to regard the centroid of an optical element (e.g., a microlens) as the centroid of the photoelectric conversion portion.

The signal centroid of a signal deriving from electric charge stored in one photoelectric conversion portion 2, if it is not yet added to or averaged with other signal, is identical to the centroid 6 of the photoelectric conversion portion 2 in their position. More specifically, the signal centroid of the first signal is identical to the centroid 6 of the photoelectric conversion portion 2 in their position. The first signals 3 and 4 illustrated in FIG. 1A are pre-addition signals. Accordingly, the signal centroid of the pre-addition signal is identical to the centroid 6 of the photoelectric conversion portion 2 in their position. The signal centroid position does not cause any variation even when a signal deriving from electric charge of one photoelectric conversion portion 2 is amplified or AD converted. Unless it is necessary to discriminate individual signals, the reference number allocated to the signal centroids of the first signals 3 and 4 is identical to the reference number allocated to the centroid of the photoelectric conversion portion 2 in the following description.

As illustrated in FIG. 1A, the centroids 6a to 6d of four photoelectric conversion portions 2a to 2d are aligned at equal pitches P1 in the first direction. More specifically, the interval P1 represents the pitch in arranging the signal centroids of pre-addition signals. In other words, the sampling pitch of pre-addition signals is equal to P1. It is not always necessary that the distance between two neighboring pixels of the photoelectric conversion portion 2 is completely identical to the pitch P1. For example, the distance between two neighboring pixels of the photoelectric conversion portion 2 may slightly change due to an error in the process of manufacturing an image pickup apparatus.

In FIG. 1A, a plurality of white dots indicates signal centroids 7 of the second signals 5, which are generated through the moving average processing. The signal centroid 7 of the second signal 5 is a midpoint between the signal centroids 6 of two first signals to be added or averaged. For example, a signal centroid lab of the second signal 5ab is a midpoint between the signal centroid 6a of the first signal 4a of the pixel 1a and the signal centroid 6b of the first signal 3b of the pixel 1b. In the present exemplary embodiment, the first signals 3 and 4 are pre-addition signals and the second signals are post-addition signals. Accordingly, the signal centroid of a post-addition signal is positioned at a midpoint between the signal centroids of two pre-addition signals to be added.

As illustrated in FIG. 1A, four signal centroids 7ab, 7bc, 7cd, and 7de of second signals 5ab, 5bc, 5cd, and 5de are aligned at the same interval P2 in the first direction. More specifically, the interval P2 represents the pitch in arranging the signal centroids of post-addition signals. In other words, the sampling pitch of post-addition signals is equal to P2.

As illustrated in FIG. 1A, the pitch P1 is equal to the pitch P2. More specifically, the driving method according to the present exemplary embodiment includes adding or averaging a plurality of signals in such a way as to equalize the signal centroid pitch P1 of pre-addition signals with the signal centroid pitch P2 of post-addition signals. In other words, the driving method according to the present exemplary embodiment includes adding or averaging a plurality of signals in such a way as to equalize the sampling pitch of a plurality of pre-addition signals with the sampling pitch of a plurality of post-addition signals. The above-mentioned adding or averaging processing is the moving average processing. It is not necessary that the pitch P1 is completely equal to the pitch P2. For example, the pitch may slightly change due to an error in the process of manufacturing an image pickup apparatus.

FIG. 1B illustrates an example of the layout of a plurality of pixels, which is different from the layout illustrated in FIG. 1A. The same reference numeral is allocated to a component illustrated in FIG. 1B and the corresponding component illustrated in FIG. 1A if they have the same function. Further, in FIG. 1B, the first signal is a signal deriving from electric charge stored during the period from the first time to the second time, and second signal is a signal generated by adding or averaging the first signals of a plurality of pixels, as indicated by arrows.

In FIG. 1A, the centroids 6a to 6d of four photoelectric conversion portions 2a to 2d are aligned on the same line. On the other hand, in FIG. 1B, the centroids 6a to 6d of four photoelectric conversion portions 2a to 2d are disposed on a zigzag line. In other words, in FIG. 1B, four pixels are not aligned on the same line. It is feasible to perform the moving average processing on the first signals of a plurality of pixels that is not aligned on the same line as illustrated in FIG. 1B.

In this case, the pitch in arranging the centroids 6 of the photoelectric conversion portion 2 and the pitch in arranging the signal centroids 7 of the second signals 5 can be determined based on the intervals in the first direction. The first direction is parallel to the principal plane of the semiconductor substrate. For example, in FIG. 1B, the photoelectric conversion portion 2a and the photoelectric conversion portion 2b are disposed adjacent to each other. Further, the second signal 5ab and the second signal 5bc have signal centroids positioned adjacent to each other. In this case, the distance between the centroid 6a of the photoelectric conversion portion 2a and the centroid 6b of the photoelectric conversion portion 2b is different from the distance between the signal centroid 7ab of the second signal 5ab and the signal centroid 7bc of the second signal 5bc. However, the distance between the centroid 6a of the photoelectric conversion portion 2a and the centroid 6b the photoelectric conversion portion 2b in the first direction is equal to the distance between the signal centroid 7ab and the signal centroid 7bc in the first direction.

As mentioned above, if the pitch is defined as an interval in the first direction, the pitch P1 in arranging the photoelectric conversion portions 2a to 2d is equal to the pitch P2 in arranging the signal centroids 7ab to 7de. More specifically, first signals of two or more pixels that are not aligned on the same line are objects that can be subjected to the moving average processing.

In FIGS. 1A and 1B, the photoelectric conversion portions 2 of two neighboring pixels are disposed at the pitch P1. However, the driving method according to the present exemplary embodiment is not limited to an image pickup apparatus having the above-mentioned layout. The driving method according to the present exemplary embodiment is applicable to any layout if a plurality of photoelectric conversion portions 2 is periodically disposed on condition that a plurality of pixels is regarded as one repeated unit. For example, in FIG. 1A, if the distance between the centroid 6a and the centroid 6b and the distance between the centroid 6c and the centroid 6d are a first distance, the distance between the centroid 6b and the centroid 6c and the distance between the centroid 6d and the centroid 6e can be a second distance that is different from the first distance. In this case, the photoelectric conversion portions 2 are periodically disposed when two pixels are one repeated unit.

Further, for the purpose of simplifying the description, in FIGS. 1A and 1B, the signal centroid of two post-addition signals (i.e., the second signals) is identical to a midpoint between two signal centroids of respective pre-addition signals (i.e., the first signals). However, for example, in a case where the type of the averaging is a weighted averaging, the signal centroid can be disposed at a position deviating from the midpoint depending on the degree of weighting.

Further, in another exemplary embodiment of the present invention, the driving method includes adding or averaging first signals of three or more pixels. Even in a case where first signals of three or more pixels are added or averaged, the signal centroid of a post-addition signal can be determined based on the signal centroid positions of the pre-addition signals. Therefore, in each of exemplary embodiments of the present invention, the meaning of "midpoint" should be widely interpreted. More specifically, the driving method includes allocating two-dimensional coordinates (e.g., XY coordinates) on a plane parallel to the principal plane of the semiconductor substrate at each signal centroid of three or more pre-addition signals. In this case, an average X-coordinate value and an average Y-coordinate value can be an X-coordinate value and a Y-coordinate value of the signal centroid of the post-addition signal.

In a case where the moving average processing is performed, or the weighted averaging processing, is performed in an image pickup apparatus including photoelectric conversion portions 2 that are not disposed at equal intervals, there is a possibility that the signal centroid pitch of pre-addition signals does not coincide with the signal centroid pitch of post-addition signals. However, in another viewpoint, if a result of adding or averaging processing reveals that the number of signal centroids of a plurality of pre-addition signals per unit length in the first direction is equal to the number of signal centroids of a plurality of post-addition signals per unit length in the first direction, it can be regarded that the moving average processing has been performed.

As a practical example, in FIG. 1A, the distance from the centroid 6a of the photoelectric conversion portion 2a to the centroid 6d of the photoelectric conversion portion 2d is regarded as the unit length. In this case, four signal centroids 6a to 6d are positioned in a region corresponding to the unit length. On the other hand, in FIG. 1A, the distance from the signal centroid lab of the second signal 5ab to the signal centroid 7de of the second signal 5de is equal to the distance from the centroid 6a of the photoelectric conversion portion 2a to the centroid 6d of the photoelectric conversion portion 2d. More specifically, four signal centroids 1ab and 7de are positioned in a region corresponding to the unit length.

As mentioned above, performing adding or averaging processing on a plurality of signals while successively changing their combination in such a way as to equalize the number of signal centroids of pre-addition signals positioned per unit length with the number of signal centroids of post-addition signals positioned per unit length is included in the moving average processing.

Hereinafter, exemplary embodiments of the present invention are described in detail below. The following description is equally applied to exemplary embodiments described below. The present invention is not limited to the following exemplary embodiments. Any modified example that can be obtained by changing a part of the configuration described in the following exemplary embodiments within the scope of the present invention is an exemplary embodiment of the present invention. Further, any example that can be obtained by adding a part of the configuration of any one of the following exemplary embodiments to another exemplary embodiment is an exemplary embodiment of the present invention. Any example that can be obtained by replacing a part of the configuration of any one of the following exemplary embodiments by a part of the configuration of another exemplary embodiment is an exemplary embodiment of the present invention.

The First Embodiment

A first exemplary embodiment of the present invention is described below. An image pickup apparatus according to the first exemplary embodiment includes a plurality of pixels, each including a photoelectric conversion portion, an amplification portion, and two capacitors. The photoelectric conversion portion can perform photoelectric conversion processing during the period from the first time to the second time. Electric charge, if generated through the photoelectric conversion processing, can be stored in the photoelectric conversion portion. A first signal deriving from the stored electric charge can be output through the amplification portion of the pixel to each of two capacitors. Each of two capacitors stores the output first signal. The image pickup apparatus according to the present exemplary embodiment performs moving average processing based on the first signal stored in two capacitors. More specifically, the image pickup apparatus according to the present exemplary embodiment generates a plurality of second signals by averaging the first signal stored in the first capacitor and the first signal stored in the second capacitor of each pixel with signals of pixels obtained according to different combinations. In the present exemplary embodiment, the image pickup apparatus performs a global shutter type operation in which the exposure periods of respective pixels coincide with each other.

Figure 2:
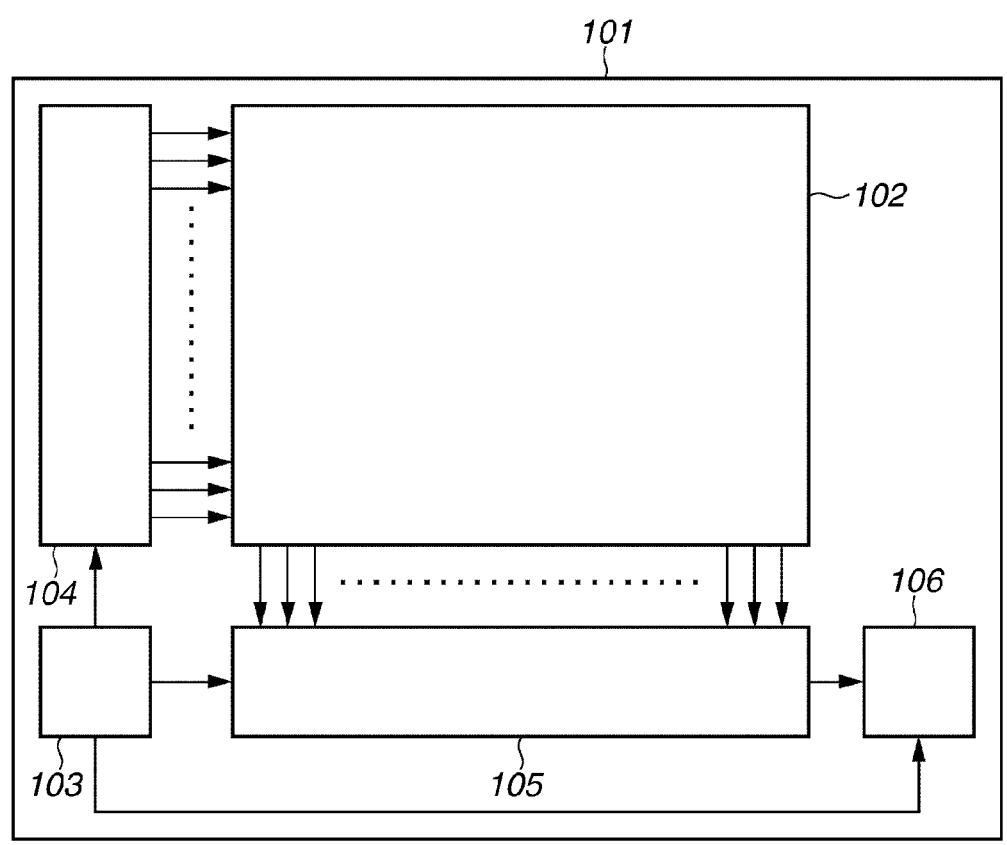
FIG. 2 schematically illustrates a configuration of an image pickup apparatus according to an exemplary embodiment.

FIG. 2 is a block diagram illustrating the overall arrangement of an image pickup apparatus 101 according to the present exemplary embodiment. The image pickup apparatus 101 can be constituted as one chip having a semiconductor substrate. The image pickup apparatus 101 includes a plurality of pixels arranged in an imaging area 102. Further, the image pickup apparatus 101 includes a control unit 103. The control unit 103 can provide control signals and can apply a power source voltage to a vertical scanning unit 104, a signal processing unit 105, and an output unit 106.

The vertical scanning unit 104 can provide driving signals to a plurality of pixels arranged in the imaging area 102. For example, the vertical scanning unit 104 provides a driving signal for each pixel row or for a plurality of pixel rows. The vertical scanning unit 104 can be constituted by a shift register or an address recorder.

The signal processing unit 105 includes column circuits, a horizontal scanning circuit, and a horizontal output line. Each of the column circuits includes a plurality of circuit blocks. The circuit block is, for example, a signal storage portion, a column amplification circuit, a noise removal unit, or an AD conversion unit. The horizontal scanning circuit can be constituted by a shift register or an address recorder. The signal to be output to the horizontal output line can be an analog signal or a digital signal.

The output unit 106 can output a signal transmitted via the horizontal output line to an external device provided outside the image pickup apparatus 101. The output unit 106 includes a buffer or an amplification circuit.

The vertical scanning unit 104, the signal processing unit 105, and the output unit 106 are disposed outside the imaging area 102. More specifically, the boundary of the imaging area 102 is located between elements included in respective pixels and elements constituting the vertical scanning unit 104, the signal processing unit 105, or the output unit 106. For example, the boundary of the imaging area 102 can be an element separation portion extending between elements included in the outermost pixels and elements constituting the vertical scanning unit 104, the signal processing unit 105, or the output unit 106.

Figures 3, 3A:
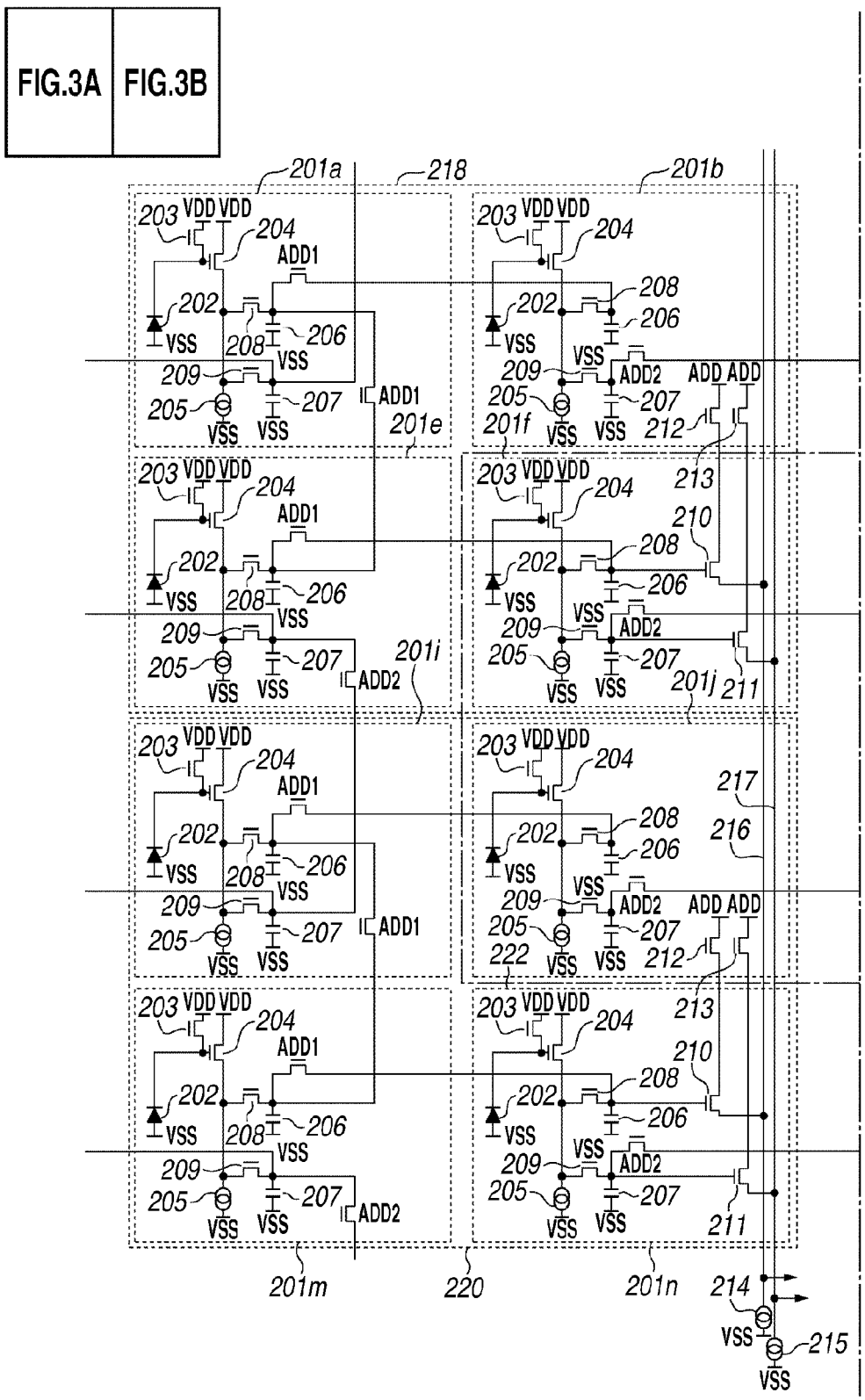
FIG. 3, which is composed of FIGS. 3A and 3B, illustrates an equivalent circuit of the image pickup apparatus according to an exemplary embodiment.
Figure 3B:
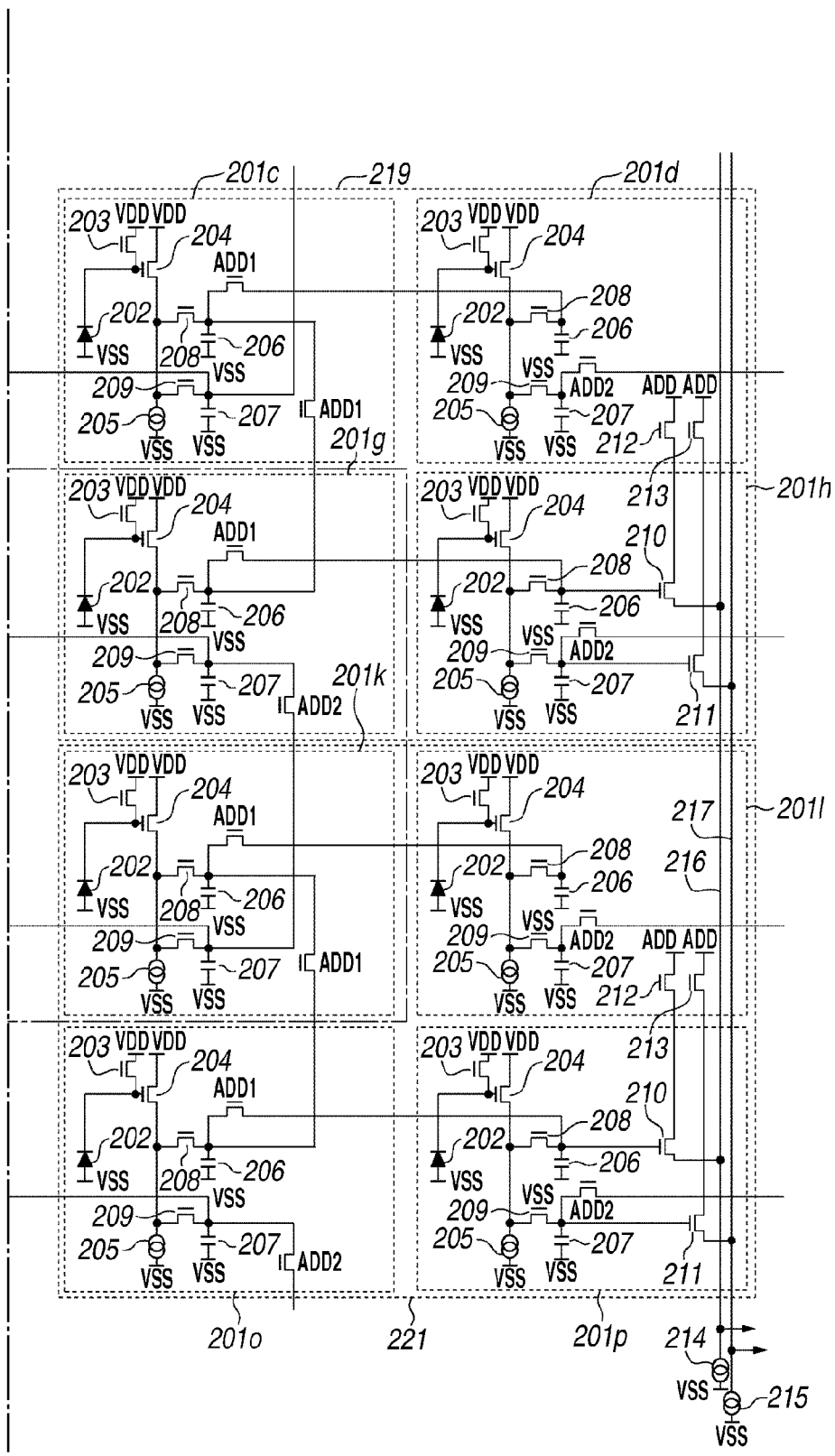

FIG. 3, which is composed of FIGS. 3A and 3B, illustrates an equivalent circuit of the image pickup apparatus according to the present exemplary embodiment. The image pickup apparatus illustrated in FIG. 3 includes sixteen pixels 201, although numerous pixels 201 can be provided in the imaging area 102. In the present exemplary embodiment, the sixteen pixels 201 are arranged in a matrix pattern. More specifically, the above-mentioned sixteen pixels 201 constitute a matrix having four rows and four columns. Each row includes a group of pixels that can be controlled in parallel by the vertical scanning unit 104. Each column includes a group of pixels disposed in a direction different from the row. The pixel group constituting each column commonly uses one or a plurality of output lines. In the present exemplary embodiment, it is not always necessary to arrange a plurality of pixels in a matrix pattern if the plurality of pixels can be disposed one-dimensionally or two-dimensionally in the imaging area 102. Further, it is unnecessary that two neighboring pixels illustrated in FIG. 3 are disposed adjacent to each other in an actual device.

In FIG. 3, elements included in the plurality of pixels 201 are allocated the same reference numerals if these elements are mutually similar in their functions. If it is necessary to describe an individual element distinctively, an alphabet corresponding to a pixel that includes the element to be discriminated is suffixed together with a reference numeral. For example, elements included in the pixel 201a are suffixed with an alphabet "a" that follows their reference numerals. This expression applies to the subsequent figures.

In FIG. 3, the uppermost four pixels 201a, 201b, 201c, and 201d are included in the first row. The following four pixels 201e, 201f, 201g, and 201h are included in the second row (i.e., a row positioned next to the first row). Similarly, four pixels 201i, 201j, 201k, and 201l are included in the third row. The lowermost four pixels 201m, 201n, 201o, and 201p are included in the fourth row. Further, the leftmost four pixels 201a, 201e, 201i, and 201m are included in the first column. The next four pixels 201b, 201f, 201j, and 201n are included in the second column (i.e., a column positioned next to the first column). Similarly, four pixels 201c, 201g, 201k, and 201o are included in the third column. The rightmost four pixels 201d, 201h, 201l, and 201p are included in the fourth column.

Next, each constituent component of the image pickup apparatus is described in detail below. Each pixel 201 includes a photoelectric conversion portion 202, a reset transistor 203, a first amplification transistor 204, a current source 205, a first capacitor 206, a second capacitor 207, a first sample-hold switch (hereinafter, referred to as SH switch) 208, and a second SH switch 209. In FIG. 3, a reference voltage (e.g., a ground voltage) is applied to a node VSS. A power source voltage is applied to a node VDD.

The photoelectric conversion portion 202 can convert incident light into signal charge (electrons or holes). The illustrated example of the photoelectric conversion portion 202 is a photodiode. The reset transistor 203 can reset the voltage applied to input nodes of the photoelectric conversion portion 202 and the first amplification transistor 204. The first amplification transistor 204 and the current source 205 cooperatively constitute a source follower circuit. The first amplification transistor 204 has an output node connected to the first capacitor 206 via the first SH switch 208. Thus, the first capacitor 206 can store the first signal output from the first amplification transistor 204. Further, the output node of the first amplification transistor 204 is connected to the second capacitor 207 via the second SH switch 209. Thus, the second capacitor 207 can store the first signal output from the first amplification transistor 204. The first and second capacitors 206 and 207 and the first and second SH switches 208 and 209 cooperatively constitute a memory portion of the pixel 201.

In the present exemplary embodiment, the pixel 201 includes the first and second capacitors 206 and 207. Therefore, the pixel 201 can concurrently output two first signals deriving from electric charge stored in the photoelectric conversion portion 202 in the same period. More specifically, a plurality of first signals can be generated from each pixel 201. An example operation is described in detail below.

In the present exemplary embodiment, a second amplification transistor 210, a third amplification transistor 211, a first selection transistor 212, and a second selection transistor 213 are provided for every four pixels 201.

The second amplification transistor 210 is connected to an output line 216. A current source 214 is connected to the output line 216. The second amplification transistor 210 and the current source 214 cooperatively constitute a source follower circuit. Further, the second amplification transistor 210 can output an amplified signal to the output line 216 based on the signal stored in the first capacitor 206. The first selection transistor 212 can select one of the second amplification transistors 210 as an output destination of the amplified signal.

The third amplification transistor 211 is connected to an output line 217. A current source 215 is connected to the output line 217. The third amplification transistor 211 and the current source 215 cooperatively constitute a source follower circuit. Further, the third amplification transistor 211 can output an amplified signal to the output line 217 based on the signal stored in the second capacitor 207. The second selection transistor 213 can select one of the third amplification transistors 211 as an output destination of the amplified signal.

In the present exemplary embodiment, the reset transistor 203, the first to third amplification transistors 204, 210, and 211, the first and second SH switches 208 and 209, and the first and second selection transistors 212 and 213 are constituted by metal oxide semiconductor (MOS) transistors. However, these transistors can be constituted by another type of transistors, such as bipolar transistors.

Control lines (not illustrated) are connected to control nodes of the reset transistor 203, the first and second SH switches 208 and 209, and the first and second selection transistors 212 and 213. The control lines are connected to the vertical scanning unit 104. The vertical scanning unit 104 can supply a driving signal to each control line to drive the above-mentioned transistors.

The image pickup apparatus according to the present exemplary embodiment includes a connection unit that includes a plurality of switches ADD1 (i.e., a first switch group) and a plurality of switches ADD2 (i.e., a second switch group). Each switch ADD1 connects the first capacitor 206 of one pixel 201 to the first capacitor 206 of another pixel 201. Each switch ADD2 connects the second capacitor of one pixel 201 to the second capacitor of another pixel 201. When the switch ADD1 or the switch ADD2 is turned on, the voltages held by two capacitors are averaged if the capacitors to be connected are identical in their size, or weighted averaged according to a capacitance ratio thereof if the capacitors to be connected are different from each other in their size. It is desired that the first capacitor 206 and the second capacitor 207 are identical to each other in their size in an OFF state of each switch connected to these capacitors. However, the first capacitor 206 and the second capacitor 207 may be slightly different in their size due to errors in manufacturing processes. It is desired that the absolute value of respective capacitors is sufficiently large to disregard the errors in the manufacturing processes.

Hereinafter, examples of the combination of a plurality of pixels 201 to be connected by the connection unit are described below. In the present exemplary embodiment, the moving average processing performed by the image pickup apparatus includes averaging the first signals of four pixels 201 that constitute a matrix having two rows and two columns. Each of dotted lines 218 to 221 indicates a combination of pixels whose signals are to be averaged. Similarly, an alternate long and short dash line 222 indicates a combination of pixels whose signals are to be averaged. In the present exemplary embodiment, each pixel 201 is included in both a first combination and a second combination. Four pixels 201 surrounded with each of the dotted lines 218, 219, 220, and 221 are a plurality of pixels that cooperatively constitute a first combination. For example, four pixels 201a, 201b, 201e, and 201f constitute a first combination. Four pixels 201 surrounded with the alternate long and short dash line 222 are a plurality of pixels constituting a second combination. In the drawing, pixels 201 not surrounded with the alternate long and short dash line 222 and other pixels (not illustrated) can constitute a second combination. For example, the pixel 201b and the pixel 201c and two other pixels (not illustrated) cooperatively constitute a second combination.

A second signal, which can be obtained by averaging the first signals of a plurality of pixels 201 constituting a first combination, is output to the output line 216. A second signal, which can be obtained by averaging the first signals of a plurality of pixels 201 constituting the second combination, is output to the output line 217. The second signals output to the output lines 216 and 217 are transmitted to the signal processing unit 105 (i.e., the subsequent unit).

Memory portions of a plurality of pixels 201 constituting a first combination are mutually connected via a switch ADD1. In the group of four pixels 201a, 201b, 201e, and 201f surrounded with the dotted line 218, a first capacitor 206a of the pixel 201a and a first capacitor 206b of the pixel 201b are connected via a switch ADD1. Further, the first capacitor 206a of the pixel 201a and a first capacitor 206e of the pixel 201e are connected via a switch ADD1. Similarly, the first capacitor 206e of the pixel 201e and a first capacitor 206f of the pixel 201f are connected via a switch ADD1. First capacitors 206 of four pixels 201 surrounded with the dotted line 219, the dotted line 220, or the dotted line 221 are mutually connected via switches ADD1.

Memory portions of a plurality of pixels 201 constituting a second combination are mutually connected via a switch ADD2. In the group of four pixels 201f, 201g, 201j, and 201k surrounded with the alternate long and short dash line 222, a second capacitor 207f of the pixel 201f and a second capacitor 207g of the pixel 201g are connected via a switch ADD2. Further, the second capacitor 207f of the pixel 201f and a second capacitor 207j of the pixel 201j are connected via a switch ADD2. Similarly, the second capacitor 207j of the pixel 201j and a second capacitor 207k of the pixel 201k are connected via a switch ADD2.

As mentioned above, in the present exemplary embodiment, a plurality of switches ADD1 and a plurality of switches ADD2 are provided to connect memory portions of a plurality of pixels 201 that constitutes different combinations. Thus, first signals generated from a plurality of pixels 201 constituting the first combination can be averaged by the switch ADD1. A second signal obtained through the averaging processing can be output to the output line 216. Further, first signals generated from a plurality of pixels 201 constituting the second combination can be averaged by the switch ADD2. A second signal generated through the averaging processing can be output to the output line 217.

Each of the switches ADD1 and the switches ADD2 can be constituted, for example, by a MOS transistor. A control line (not illustrated) is connected to a gate of each transistor. The control line is connected to the vertical scanning unit 104. The vertical scanning unit 104 can provide a driving signal to the control line so that an operational state (ON or OFF) of respective switches ADD1 and ADD2 can be controlled based on the supplied driving signal. More specifically, in the present exemplary embodiment, the vertical scanning unit 104 and the control unit 103 that controls the vertical scanning unit 104 cooperatively control the connection unit. More specifically, the control unit 103 and the vertical scanning unit 104 turn on a plurality of switches ADD1 in such a way that the memory portions of a plurality of pixels 201 constituting a first combination can be mutually connected. Further, the control unit 103 and the vertical scanning unit 104 turn on a plurality of switches ADD2 in such a way that the memory portions of a plurality of pixels 201 constituting a second combination can be mutually connected.

Figure 4:
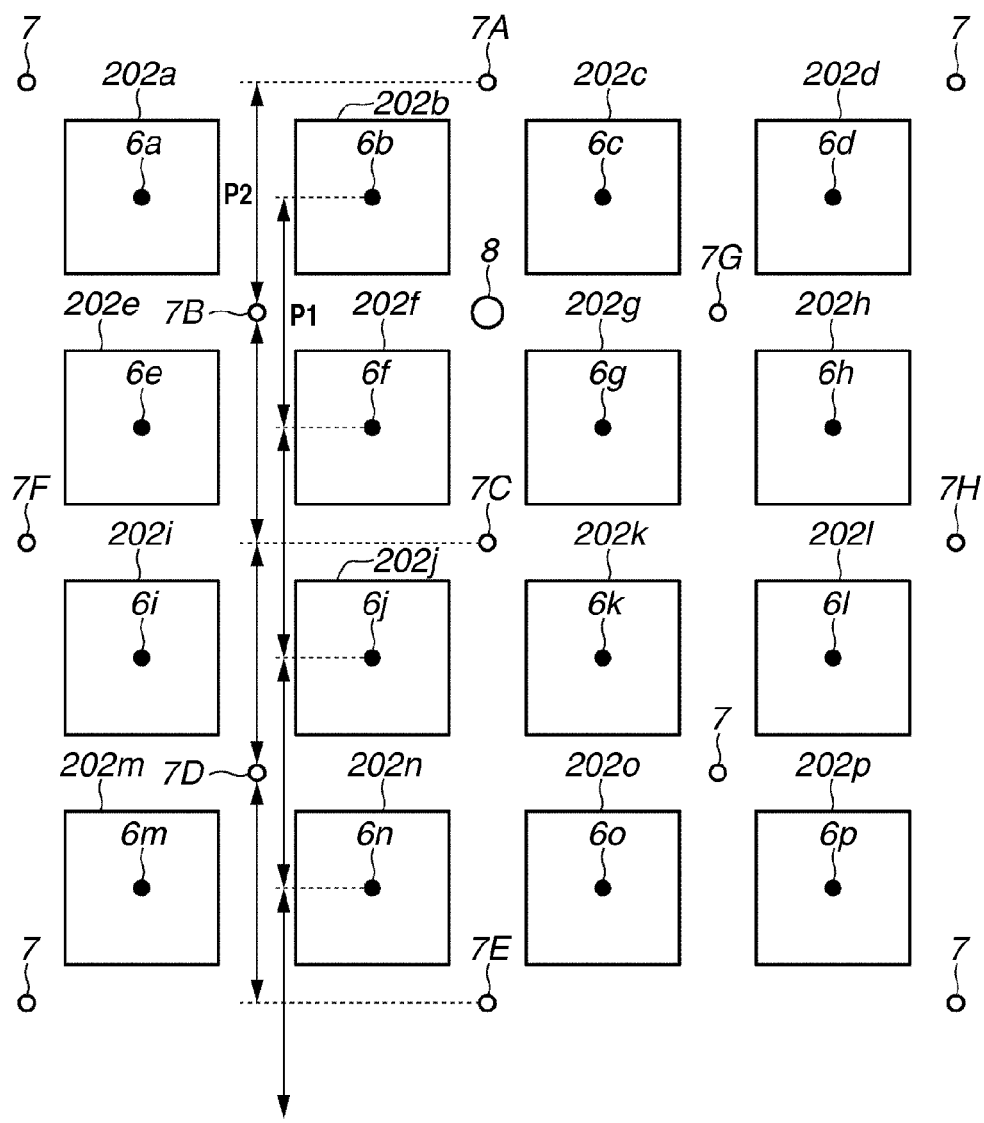
FIG. 4 illustrates a schematic layout of a plurality of pixels of the image pickup apparatus according to an exemplary embodiment.

Subsequently, in the present exemplary embodiment, the signal centroid of the first signal and the signal centroid of the second signal are described in detail below with reference to FIG. 4. FIG. 4 illustrates a schematic layout of a plurality of photoelectric conversion portions 202. In FIG. 4, black dots represent the centroids 6 of respective photoelectric conversion portions 202. The centroid 6 position of a photoelectric conversion portion 202 is identical to the signal centroid 6 position of a first signal generated by the pixel 201 that includes the photoelectric conversion portion 202. Further, in FIG. 4, white dots represent the signal centroids 7 of second signals that can be obtained by averaging the first signals of a plurality of pixels 201.

A plurality of pixels included in the second column is described below. A signal centroid of a first signal (i.e., a pre-averaging signal) generated from the pixel 201b is identical to the centroid 6b of the photoelectric conversion portion 202b. Similarly, signal centroids of first signals generated from the pixels 201f, 201j, and 201n are identical to the centroids 6f, 6j, and 6n of the photoelectric conversion portions 202f, 202j, and 202n. These photoelectric conversion portions 202b, 202f, 202j, and 202n are disposed at the predetermined pitch P1 in the column direction. Therefore, the signal centroid pitch of the pre-averaging signals is equal to P1. In the present exemplary embodiment, the column direction is the first direction.

Signal centroids 7A to 7E are signal centroids of second signals (i.e., post-averaging signals). The signal centroid 7A is a signal centroid of a second signal that can be generated by averaging the first signal of the pixel 201b, a first signal of the pixel 201c, and first signals of two other pixels (not illustrated). The signal centroid 7B is a signal centroid of a second signal that can be generated by averaging the first signals of four pixels surrounded with the dotted line 218 illustrated in FIG. 3. The signal centroid 7C is a signal centroid of a second signal that can be generated by averaging first signals of four pixels surrounded with the alternate long and short dash line 222 illustrated in FIG. 3. The signal centroid 7D is a signal centroid of a second signal that can be generated by averaging first signals of four pixels surrounded with the dotted line 220 illustrated in FIG. 3. The signal centroid 7E is a signal centroid of a second signal that can be generated by averaging a first signal of the pixel 201n, a first signal of the pixel 201o, and first signals of two other pixels (not illustrated). The signal centroids 7A to 7E are disposed at the pitch P2 in the column direction.

As illustrated in FIG. 4, the pitch P1 is equal to the pitch P2. In other words, the sampling pitch in the column direction remains the same before and after the averaging processing. As mentioned above, the driving method according to the present exemplary embodiment includes performing the moving average processing on the first signals of a plurality of pixels included in the second column. As a result, it is feasible to obtain signals each including a lesser amount of moire without greatly deteriorating the resolution in the column direction.

Further, the driving method according to the present exemplary embodiment includes performing the moving average processing on the signals generated from a plurality of pixels disposed in a row direction. For example, the alignment pitch of the centroids 6e to 6h of the photoelectric conversion portions 202e to 202h is equal to the alignment pitch of the signal centroids 7F, 7B, 7C, 7G, and 7H of a plurality of second signals in a row direction. As a result, it is feasible to obtain signals each including a lesser amount of moire without greatly deteriorating the resolution in the column direction.

A signal centroid of a second signal generated through averaging processing based on the first combination (e.g., the signal centroid 7B illustrated in FIG. 4) and a signal centroid of a second signal generated through averaging processing based on the second combination (e.g., the signal centroid 7C illustrated in FIG. 4) are mutually shifted by one pixel in each of the row direction and the column direction. Therefore, it is useful to perform interpolation processing based on these second signals. For example, it is useful to generate a third signal having a signal centroid at the position of a dot 8 indicated by a dotted line in FIG. 4, as a composite signal obtainable based on four second signals that have the signal centroids 7A, 7B, 7C, and 7G, respectively. Performing the above-mentioned interpolation processing is useful in obtaining a high-resolution image that includes a lesser amount of noises that may be caused by high-frequency components (e.g., moire).

Figure 5A:
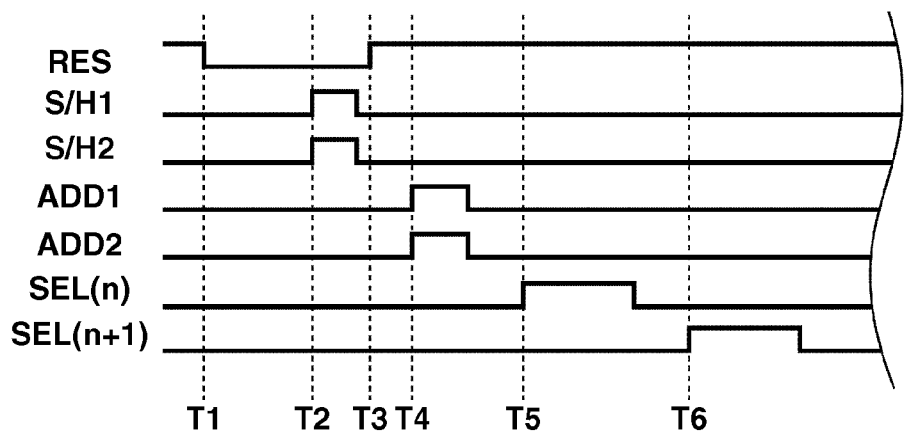
FIGS. 5A and 5B are timing charts illustrating driving signals according to an exemplary embodiment.
Figure 5B:
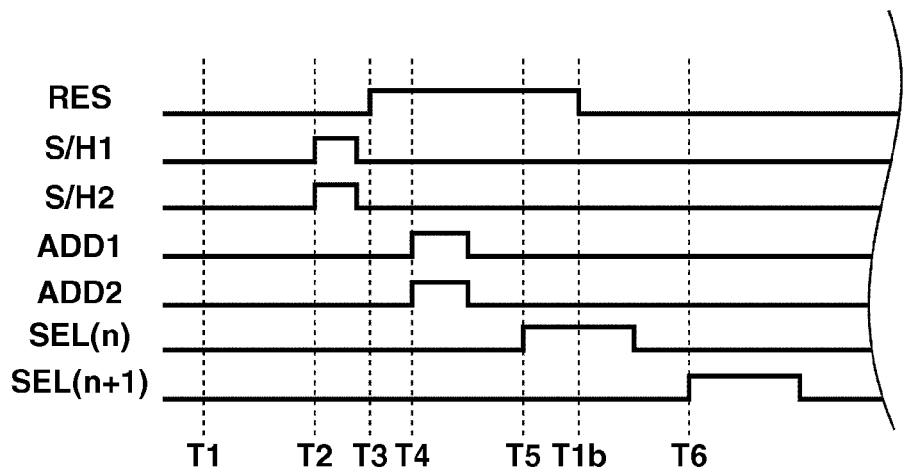

Subsequently, the driving method according to the present exemplary embodiment is described in detail below. FIGS. 5A and 5B are timing charts illustrating various driving signals. A driving signal RES is supplied to the control line connected to the reset transistor 203. A driving signal S/H1 is supplied to the control line connected to the first SH switch 208. A driving signal S/H2 is supplied to the control line connected to the second SH switch 209. A driving signal ADD1 is supplied to the control line connected to the switch ADD1. A driving signal ADD2 is supplied to the control line connected to the switch ADD2. A driving signal SEL is supplied to the control line connected to the first selection transistor 212 and to the control line connected to the second selection transistor 213.

In the present exemplary embodiment, the driving signal RES, the driving signal S/H1, the driving signal S/H2, the driving signal ADD1, and the driving signal ADD2 are synchronously supplied to all pixels. A driving signal SEL(n) and a driving signal SEL(n+1) are supplied to control lines of selection transistors of different rows. For example, the driving signal SEL(n) is supplied to first selection transistors 212b and 212d and the driving signal SEL(n+1) is supplied to second selection transistors 213b and 213d. Further, although not illustrated in FIGS. 5A and 5B, a driving signal SEL(n+2) is supplied to first selection transistors 212j and 212l and a driving signal SEL(n+3) is supplied to second selection transistors 213j and 213l.

Each driving signal can take at least two (e.g., high-level and low-level) values. If a high-level driving signal is supplied to a transistor or to a switch, the transistor or the switch turns on. If a low-level driving signal is supplied, the transistor or the switch turns off.

A first operational example is described in detail below with reference to FIG. 5A. Before time T1 illustrated in FIG. 5A, the driving signal RES has a high-level value and all of other driving signals has a low-level value. As the reset transistor 203 is in an ON state, a reset potential is applied to the photoelectric conversion portion 202. At this moment, the first amplification transistor 204 outputs a signal reflecting the reset state of the photoelectric conversion portion 202. An electronic shutter is in an operational state when the reset transistor 203 is ON.

At time T1, the signal value changes from high-level to low-level in the driving signal RES. When the reset transistor 203 is turned off, the electronic shutter is released and the photoelectric conversion begins. More specifically, the exposure period starts at time T1. In the exposure period, the first amplification transistor 204 outputs a signal that reflects the amount of electric charge generated by the photoelectric conversion portion 202. The time T1 is the first time in the present exemplary embodiment. A mechanical shutter is usable to control the start timing of the exposure period. Further, at time T1, the photoelectric conversion portion 202 starts storing electric charge.

At time T2, the signal value changes from low-level to high-level in each of the driving signal S/H1 and the driving signal S/H2. Thus, the first signal (i.e., the signal that reflects the amount of electric charge generated by the photoelectric conversion portion 202) is output to both of the first and second capacitors 206 and 207. After a predetermined time has elapsed since time T2, the signal value changes from high-level to low-level in each of the driving signal S/H1 and the driving signal S/H2. Thus, the signal that reflects the amount of electric charge generated by the photoelectric conversion portion 202 is stored in both of the first and second capacitors 206 and 207. As mentioned above, each pixel 201 outputs a plurality of first signals based on electric charge generated in the same period. The exposure period can be terminated at the time when the first SH switch 208 and the second SH switch 209 turn off. The turn-off time of the first SH switch 208 and the second SH switch 209 is the second time in the present exemplary embodiment.

At time T3, the driving signal RES changes from low-level to high-level. The electric charge stored in the photoelectric conversion portion 202 is discharged when the reset transistor 203 turns on. In this case, the turn-on time of the reset transistor 203 is not limited to time T3. It is only required that the reset transistor 203 turns on before the subsequent exposure period starts.

At time T4, the signal value changes from low-level to high-level in each of the driving signal ADD1 and the driving signal ADD2. Thus, each of the switch ADD1 and the switch ADD2 turns on. When the switch ADD1 turns on, first signals stored in the first capacitors 206 of a plurality of pixels 201 constituting a first combination are averaged. Further, when the switch ADD2 turns on, first signals stored in the second capacitors 207 of a plurality of pixels 201 constituting a second combination are averaged. The moving average processing to be performed on signals of a plurality of pixels is completed through the above-mentioned operation. In the present exemplary embodiment, the moving average processing applied to signals of all pixels is performed in a lump. More specifically, in the present exemplary embodiment, a plurality of averaging operations is concurrently performed.

Subsequently, second signals obtained through the averaging processing are successively read out. At time T5, the driving signal SEL(n) changes from low-level to high-level. Thus, a first selection transistor turns on when the driving signal SEL(n) is supplied. For example, each of the first selection transistor 212b included in the pixel 201b and the first selection transistor 212d included in the pixel 201d turns on. Then, the second amplification transistor 210 that corresponds to the turned-on selection transistor amplifies the second signal and outputs the amplified signal to the output line 216. The signal output to the output line 216 is transmitted to the signal processing unit 105, in which the signal is subjected to predetermined signal processing. After a predetermined time has elapsed since time T5, the signal value changes from high-level to low-level in the driving signal SEL(n).

At time T6, the driving signal SEL(n+1) changes from low-level to high-level. Thus, a second selection transistor turns on when the driving signal SEL(n+1) is supplied. For example, each of the second selection transistor 213*b* included in the pixel 201*b* and the second selection transistor 213*d* included in the pixel 201*d* turns on. Then, the third amplification transistor 211 that corresponds to the turned-on selection transistor amplifies the second signal and outputs the amplified signal to the output line 217. The signal output to the output line 217 is transmitted to the signal processing unit 105, in which the signal is subjected to predetermined signal processing. After a predetermined time has elapsed since time T6, the signal value changes from high-level to low-level in the driving signal SEL(n+1).

Through the above-mentioned operations, memory portions of a plurality of pixels 201 of different combinations are connected by the plurality of switches ADD1 and the plurality of switches ADD2. As a result, first signals generated by a plurality of pixels 201 constituting a first combination can be averaged by the switch ADD1. Then, a second signal obtained through the averaging processing can be output to the output line 216. Further, signals generated by a plurality of pixels 201 constituting a second combination can be averaged by the switch ADD2. Then, a second signal obtained through the averaging processing can be output to the output line 217.

As a second operation, it is useful to start the subsequent exposure period while the second signal obtained through the averaging processing is being read out. The second operation is described in detail below with reference to FIG. 5B. In FIG. 5B, the driving signal RES changes from high-level to low-level at time T1*b*. The subsequent exposure period starts at this moment. As mentioned above, the frame rate can be increased by starting the exposure period while reading a second signal.

As mentioned above, the driving method according to the present exemplary embodiment includes performing the moving average processing on first signals of a plurality of pixels. More specifically, the driving method according to the present exemplary embodiment includes averaging first signals of pixels according to four different combinations in such a way as to equalize the alignment pitch of signal centroids of second signals obtained through the averaging processing with the pitch of the pixel layout.

According to the above-mentioned configuration, it is feasible to obtain a signal that includes a lesser amount of noises that may be caused by high-frequency components (e.g., moire).

Further, in the present exemplary embodiment, a plurality of first signals is concurrently output based on electric charge generated during the same period. Therefore, signals to be used in averaging processing according to a first combination and signals to be used in averaging processing according to a second combination are signals deriving from electric charge obtained during the same storage period. It is feasible to prevent the image quality from deteriorating if the above-mentioned configuration is employed, compared to a case where the moving average processing is performed using signals whose exposure periods are different.

Further, in the present exemplary embodiment, the image pickup apparatus internally performs the moving average processing. According to the example illustrated in FIG. 2, the moving average processing is performed by all constitute components of the image pickup apparatus 101 except for the output unit 106. Therefore, it is unnecessary to perform additional processing on an image signal output from the image pickup apparatus. As a result, the image pickup apparatus can speedily complete an image capturing operation. The entire configuration of the image pickup system can be downsized.

Further, the image pickup apparatus according to the present exemplary embodiment operates in such a way as to synchronously drive all pixels. More specifically, the image pickup apparatus according to the present exemplary embodiment performs the global shutter type operation in which the exposure periods of respective pixels coincide with each other. According to the above-mentioned configuration, the image quality can be improved because it is feasible to reduce a distortion of a speedily moving subject.

The Second Embodiment

A second exemplary embodiment of the present invention is described below. The second exemplary embodiment is different from the first exemplary embodiment in that a color filter is provided for each pixel. A driving method according to the present exemplary embodiment includes performing moving average processing on first signals generated from a plurality of pixels whose color filters have the same color. In the present exemplary embodiment, portions not described below are similar to those described in the first exemplary embodiment.

FIG. 6A schematically illustrates a plurality of pixels provided in the image pickup apparatus according to the present exemplary embodiment. Each small rectangle schematically represents an area of one pixel disposed in the imaging area 102 illustrated in FIG. 2. In the circuit diagram illustrated in FIG. 3, a group of elements included in one pixel 201 is disposed in the small rectangle area illustrated in FIG. 6A.

In FIG. 6A, the shape of each pixel is rectangular. However, it is not always necessary that each pixel area is rectangular. Further, FIG. 6A illustrates an example of a plurality of pixels disposed in a square lattice. However, the layout of the pixels is not limited to the square lattice if a plurality of pixels can be periodically disposed in a two-dimensional pattern.

The circuit configuration of respective pixels illustrated in FIG. 6A is similar to that described in the first exemplary embodiment. The image pickup apparatus according to the present invention includes a connection unit including switches and wiring. Therefore, pixels disposed between the pixel 201*a* and the pixel 201*b* can be any other pixels that are not connected to the pixels 201*a* and 201*b*. More specifically, it is easy to connect memory portions of two adjacent pixels that are disposed together with another pixels intervening therebetween. Therefore, even when color filters of different colors are disposed on neighboring pixels so as to constitute a Bayer pattern array, it is feasible to connect memory portions of a plurality of pixels having the same color.

The image pickup apparatus according to the present exemplary embodiment includes color filters of three colors. FIG. 6A illustrates colors of color filters provided for respective pixels, in which R indicates a pixel where a color filter of a first wavelength band (i.e., a red color filter) is disposed. Each of Gr and Gb indicates a pixel where a color filter of a second wavelength band (e.g., a green filter) is disposed. Further, B indicates a pixel where a color filter of a third wavelength band (e.g., a blue filter) is disposed. The image pickup apparatus according to the present exemplary embodiment includes color filters constituting the Bayer pattern array, as illustrated in FIG. 6A. However, the layout of color filters is not limited to the above-mentioned example if color filters of at least two colors can be disposed according to another layout.

In FIG. 6A, solid lines 301 to 312 and alternate long and short dash lines 313 to 324 indicate combinations of a plurality of pixels whose memory portions can be connected via the connection unit. The connection unit according to the present exemplary embodiment connects memory portions of two or more pixels that are similar in the color of the color filter disposed thereon, of a plurality of pixels surrounded with a solid line or an alternate long and short dash line. More specifically, the driving method according to the present exemplary embodiment includes averaging first signals of two or more pixels that are similar in the color of the color filter disposed thereon.

The combination of sixteen pixels surrounded with the solid line 301 is described in detail below. The connection unit connects memory portions of pixel A1, pixel A3, pixel C1, and pixel C3. More specifically, the driving method according to the present exemplary embodiment includes averaging four first signals stored in the memory portions of pixel A1, pixel A3, pixel C1, and pixel C3. Thus, a second signal that corresponds to the red color (color filter R) can be obtained. The above-mentioned processing can be similarly performed for pixels having another color. In the present exemplary embodiment, the green color filter is disposed on each pixel indicated by Gr and each pixel indicated by Gb. However, as mentioned above, the averaging of first signals is performed independently for each of different combinations.

The connection unit connects memory portions of a plurality of pixels having the same color, of sixteen pixels surrounded with any one of the solid lines 302 to 312 and the alternate long and short dash lines 313 to 324. In FIG. 6A, the number of pixels surrounded with any one of the alternate long and short dash lines 316, 320, 321, 322, 323, and 324 is smaller than 16. However, the memory portions of a plurality of pixels that can be actually connected by the connection unit include memory portions of other pixels (not illustrated).

In the present exemplary embodiment, a plurality of pixels surrounded with any one of the solid lines 301 to 312 constitutes a first combination. On the other hand, a plurality of pixels surrounded with anyone of the alternate long and short dash lines 313 to 324 constitutes a second combination. The driving method according to the present exemplary embodiment includes performing moving average processing by averaging first signals of a plurality of pixels included in a first combination and averaging first signals of a plurality of pixels included in a second combination. As mentioned above, the driving method according to the present exemplary embodiment includes averaging first signals of two or more pixels that are similar in the color of the color filter disposed thereon. Therefore, the moving average processing is performed on the signals of two or more pixels that are similar in the color of the color filter disposed thereon.

As an example, averaging of signals generated in pixel C3 is described below. The driving method according to the present exemplary embodiment includes averaging four signals of pixel A1, pixel A3, pixel C1, and pixel C3 surrounded with the solid line 301. Further, the driving method includes averaging four signals of pixel C3, pixel C5, pixel E3, and pixel E5 surrounded with the alternate long and short dash line 313.

FIG. 6B illustrates signal centroids of a plurality of second signals obtained through the averaging processing. In FIG. 6B, each pixel on which the signal centroid of a second signal obtained through the averaging processing is positioned is indicated by R, Gb, Gr, or B. For example, the signal centroid of a second signal that can be obtained by averaging the first signals of pixel A1, pixel A3, pixel C1, and pixel C3 illustrated in FIG. 6A is positioned in the area of the pixel B2.

A relationship between the signal centroid pitch of pre-averaging signals and the signal centroid pitch of post-averaging signals is described below with reference to FIGS. 6A and 6B. For example, in FIG. 6A, the green color filter Gr is disposed on pixels A6, C6, E6, G6, I6, and K6 included in the sixth column. These pixels A6, C6, E6, G6, I6, and K6 are disposed at a pitch equivalent to two pixels. More specifically, the signal centroids of the first signals generated from the pixels A6, C6, E6, G6, I6, and K6 are aligned at a pitch equivalent to two pixels in the column direction. In the present exemplary embodiment, the column direction is the first direction.

As the moving average processing performed on signals of the pixels A6, C6, E6, G6, I6, and K6, the driving method according to the present exemplary embodiment includes averaging first signals of the pixels on which the green color filter Gr is disposed in each of the combinations indicated by the solid lines 302, 306, and 310, and the alternate long and short dash lines 313, 317, and 321. In FIG. 6B, signal centroids of second signals obtained through the averaging processing based on the above-mentioned combinations are positioned at pixels B7, D5, F7, H5, J7, and L5, respectively. More specifically, signal centroids of second signals that correspond to the green color filter Gr are aligned at the pitch equivalent to two pixels in the column direction. As mentioned above, the driving method according to the present exemplary embodiment includes performing moving average processing on signals of a plurality of pixels having the same color.

As mentioned above, the driving method according to the present exemplary embodiment includes performing the moving average processing for each color in an image pickup apparatus that includes a plurality types of color filters. The above-mentioned configuration brings an effect of reducing multi-colors in addition to the effects described in the first exemplary embodiment.

The Third Embodiment

A third exemplary embodiment of the present invention is described below. In the third exemplary embodiment, combinations to be subjected to the moving average processing pixel are different from those described in the first exemplary embodiment and the second exemplary embodiment. More specifically, the image pickup apparatus performs averaging on first signals generated from one pixel according to four types of combinations. Therefore, the processing for outputting a first signal deriving from electric charge stored during the period from the first time to the second time is repeated four times in each pixel. More specifically, four first signals are output from one pixel. In the present exemplary embodiment, portions not described below are similar to those described in the first exemplary embodiment or the second exemplary embodiment.

FIG. 7A schematically illustrates a plurality of pixels provided in the image pickup apparatus according to the present exemplary embodiment. The expression of each pixel position is similar to that illustrated in FIG. 6A. Further, color filters are provided for the pixels according to the present exemplary embodiment.

The driving method according to the present exemplary embodiment includes averaging first signals for each of four different combinations that include a concerned pixel. For example, a first combination of pixels surrounded with a solid line 401, a second combination of pixels surrounded with a dotted line 402, a third combination of pixels surrounded with an alternate long and short dash line 403, and a fourth combination of pixels surrounded with an alternate long and two short dashes line 404 are four combinations that include the same pixel C3.

More specifically, four pixel memory portions of pixel A1, pixel A3, pixel C1, and pixel C3 are connected as the first combination. Four pixel memory portions of pixel A3, pixel A5, pixel C3, and pixel C5 are connected as the second combination. Four pixel memory portions of pixel C1, pixel C3, pixel E1, and pixel E3 are connected as the third combination. Four pixel memory portions of pixel C3, pixel C5, pixel E3, and pixel E5 are connected as the fourth combination. Regarding pixels for which a color filter of a different color is disposed, the image pickup apparatus performs similar averaging processing on first signals generated in each of four different combinations that include a concerned pixel.

To perform the above-mentioned moving average processing, it is useful to provide four capacitors in the memory portion of each pixel. More specifically, each pixel can be configured to output four first signals in parallel. In this case, each capacitor is connected to memory portions of a plurality of pixels that belongs to any one of different combinations. For example, the memory portion of pixel C3 includes four (i.e., first to fourth) capacitors, as described below. The connection unit includes a group of switches ADD1 (i.e., a first switch group) that can connect the first capacitor to the memory portions of pixel A1, pixel A3, and pixel C1. Further, the connection unit includes a group of switches ADD2 (i.e., a second switch group) that can connect the second capacitor to the memory portions of pixel A3, pixel A5, and pixel C5. Further, the connection unit includes a group of switches ADD3 (i.e., a third switch group) that can connect the third capacitor to the memory portions of pixel C1, pixel E1, and pixel E3. The connection unit includes a group of switches ADD4 (i.e., a fourth switch group) that can connect the fourth capacitor to the memory portions of pixel C5, pixel E3, and pixel E5.

FIG. 7B illustrates signal centroids of a plurality of second signals obtained through the averaging processing. In FIG. 7B, each pixel on which the signal centroid of a second signal is positioned is indicated by R, Gb, Gr, or B. For example, the signal centroid of a second signal that can be obtained by averaging the first signals of pixel A1, pixel A3, pixel C1, and pixel C3 illustrated in FIG. 7A is positioned in the area of pixel B2.

The driving method according to the present exemplary embodiment includes averaging first signals of one pixel according to four different combinations. Therefore, it is feasible to obtain a larger number of second signals through the averaging processing. From the comparison between FIG. 6A and FIG. 7A, it is understood that the pixel layout according to the second exemplary embodiment is identical to the pixel layout according to the third exemplary embodiment. However, in the second exemplary embodiment, no signal centroid of a post-averaging signal is positioned on inner-side pixels (e.g., pixels B4, B5, C4, and C5 illustrated in FIG. 6B). On the other hand, in the present exemplary embodiment, as illustrated in FIG. 7B, the signal centroid of a post-averaging signal is disposed on each pixel except for the pixel positioned on the outer periphery. More specifically, it is feasible to obtain a larger number of second signals (i.e., post-averaging signals). As a result, it is feasible to obtain a high-resolution image.

The driving method according to the first exemplary embodiment or the second exemplary embodiment includes performing interpolation processing based on a plurality of second signals obtained through the averaging processing performed on a plurality of first signals to obtain a high-resolution image. On the other hand, the driving method according to the present exemplary embodiment does not require the above-mentioned interpolation processing.

As mentioned above, the present exemplary embodiment brings an effect of obtaining a high-resolution image in addition to the effects described in the first exemplary embodiment or the second exemplary embodiment.

The Fourth Embodiment

A fourth exemplary embodiment of the present invention is described below. An image pickup apparatus according to the fourth exemplary embodiment has a plurality of pixels, each including a photoelectric conversion portion and a transfer portion. The transfer portion is configured to transfer electric charge generated from one photoelectric conversion portion to two transfer destinations in parallel. In another viewpoint, the transfer portion can distribute electric charge stored in one photoelectric conversion portion to two transfer destinations. Transferring electric charge to two transfer destinations in parallel or distributing electric charge to two transfer destinations can realize outputting two first signals based on electric charge generated through the photoelectric conversion during the period from the first time to the second time. Then, addition of electric charge is performed at a node serving as a transfer destination of electric charge in such a way as to realize the moving average processing. The image pickup apparatus according to the present exemplary embodiment performs the global shutter type operation in which the exposure periods of respective pixels coincide with each other.

FIG. 2 is a block diagram illustrating the overall arrangement of an image pickup apparatus 101 according to the present exemplary embodiment. The image pickup apparatus 101 can be constituted as one chip having a semiconductor substrate. The image pickup apparatus 101 includes a plurality of pixels arranged in an imaging area 102. In the present exemplary embodiment, the configuration of pixels arranged in the imaging area 102 is different from that described in the first exemplary embodiment. Further, the image pickup apparatus 101 includes a control unit 103, a vertical scanning unit 104, a signal processing unit 105, and an output unit 106, whose configurations are similar to those described in the first exemplary embodiment and, therefore, redundant description thereof will be avoided.

Figure 8:
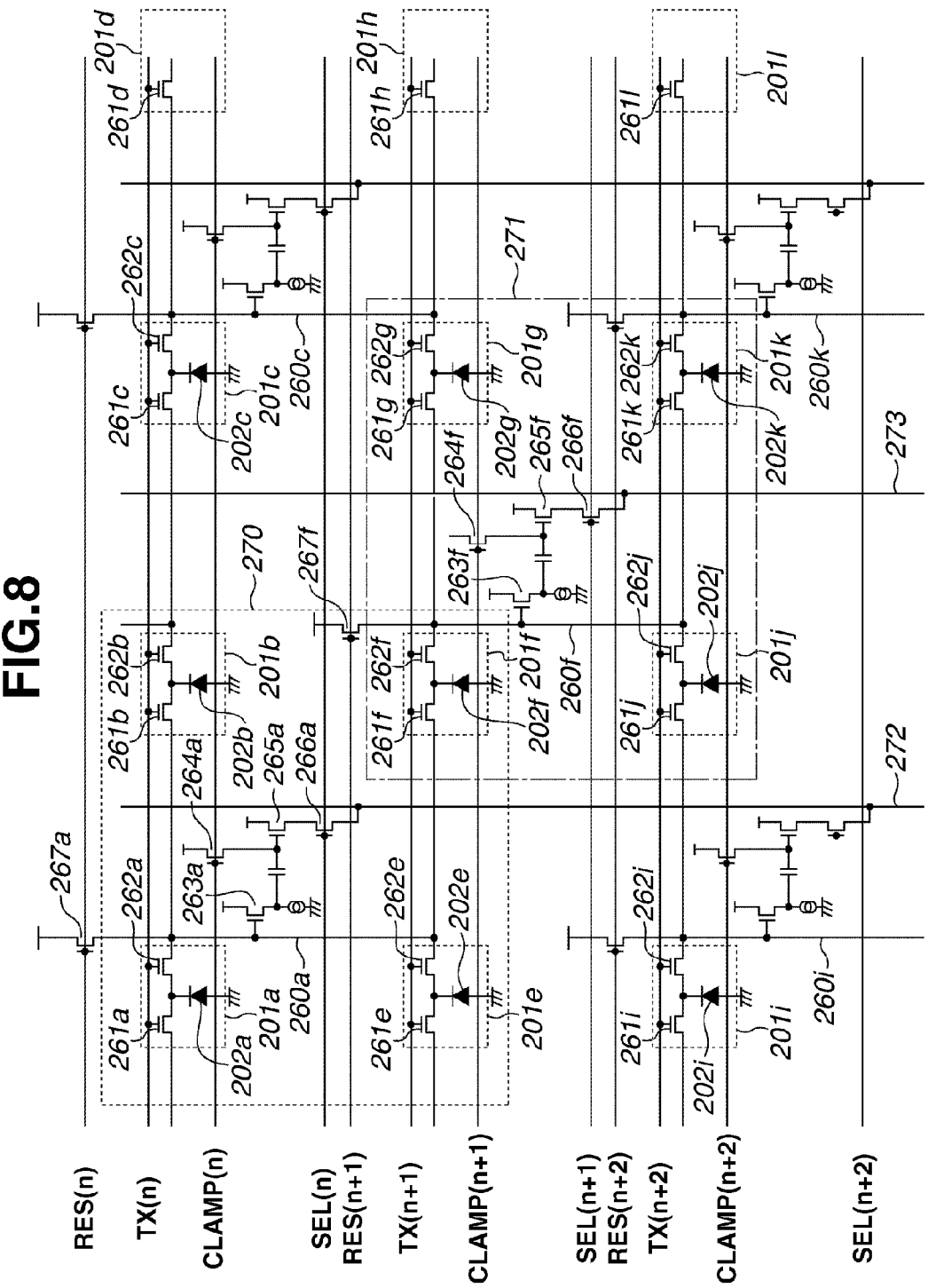
FIG. 8 illustrates an equivalent circuit of the image pickup apparatus according to an exemplary embodiment.

FIG. 8 illustrates an equivalent circuit of the image pickup apparatus according to the present exemplary embodiment. The image pickup apparatus illustrated in FIG. 8 includes twelve pixels 201, although numerous pixels 201 can be provided in the imaging area 102. In the present exemplary embodiment, the twelve pixels 201 are arranged in a matrix pattern. More specifically, the above-mentioned twelve pixels 201 constitute a matrix having three rows and four columns. Each row includes a group of pixels that can be controlled in parallel by the vertical scanning unit 104. Each column includes a group of pixels disposed in a direction different from the row. The pixel group constituting each column commonly uses one or a plurality of output lines. In the present exemplary embodiment, it is not always necessary to arrange a plurality of pixels in a matrix pattern if the plurality of pixels can be disposed one-dimensionally or two-dimensionally in the imaging area 102.

In FIG. 8, the uppermost four pixels 201a, 201b, 201c, and 201d are included in the first row. The following four pixels 201e, 201f, 201g, and 201h are included in the second row (i.e., a row positioned next to the first row). Similarly, the lowermost four pixels 201i, 201j, 201k, and 201l are included in the third row. Further, the leftmost three pixels 201a, 201e, and 201*i* are included in the first column. The next three pixels 201*b*, 201*f*, and 201*j* are included in the second column (i.e., a column positioned next to the first column). Similarly, three pixels 201*c*, 201*g*, and 201*k* are included in the third column. The rightmost three pixels 201*d*, 201*h*, and 201*l* are included in the fourth column.

Next, each constituent component of the image pickup apparatus is described in detail below. Each pixel 201 includes a photoelectric conversion portion 202, a first transfer transistor 261, and a second transfer transistor 262. Further, the image pickup apparatus includes a first amplification transistor 263, a reset transistor 267, a clamp transistor 264, a second amplification transistor 265, and a selection transistor 266, which are provided in the imaging area 102. The first amplification transistor 263, the reset transistor 267, the clamp transistor 264, the second amplification transistor 265, and the selection transistor 266 can be commonly used by a plurality of pixels. The elements commonly used by the plurality of pixels are elements included in each of the plurality of pixels. More specifically, the image pickup apparatus according to the present exemplary embodiment can be configured as a pixel-amplification image pickup apparatus.

The photoelectric conversion portion 202 can convert incident light into signal charges (electrons or holes). The illustrated example of the photoelectric conversion portion 202 is a photodiode. Each of the first transfer transistor 261 and the second transfer transistor 262 can transfer electric charge of the photoelectric conversion portion 202. The transfer of electric charge from the photoelectric conversion portion 202 can be controlled by applying a voltage to respective control nodes (i.e., transfer gates) of the first transfer transistor 261 and the second transfer transistor 262. The first transfer transistor 261 and the second transfer transistor 262 cooperatively constitute a transfer portion.

The first amplification transistor 263 and a current source cooperatively constitute a source follower circuit. The first amplification transistor 263 has an input node 260.

The first amplification transistor 263 has an output node that is electrically connected to an input node of the second amplification transistor 265 via a clamp capacitor. The clamp capacitor can clamp a signal output from the first amplification transistor 263. Reset noises are removable when the clamp capacitor clamps the voltage to be output when the input node 260 of the first amplification transistor 263 is reset.

The second amplification transistor 265 has an output node that is electrically connected to output lines 272 and 273 via the selection transistor 266. A current source (not illustrated) is connected to each of the output lines 272 and 273. The second amplification transistor 265 and the current source connected to the output line 272 or 273 cooperatively constitute a source follower circuit.

The reset transistor 267 can reset the voltage of the input node 260 of the first amplification transistor 263. The clamp transistor 264 can apply a predetermined voltage to the input node of the second amplification transistor 265. The selection transistor 266 can select a second amplification transistor as an output destination of the amplified signal.

In the present exemplary embodiment, each of the reset transistor 267, the first amplification transistor 263, the second amplification transistor 265, the clamp transistor 264, and the selection transistor 266 can be constituted, for example, by a MOS transistor. However, these transistors can be constituted by another type of transistors, such as bipolar transistors.

Control lines are connected to control nodes of the first and second transfer transistors 261 and 262, the reset transistor 267, the clamp transistor 264, and the selection transistor 266.

The control lines are electrically connected to the vertical scanning unit 104. The vertical scanning unit 104 can supply a driving signal to each control line to drive the above-mentioned transistors.

In the present exemplary embodiment, electric charge stored in the photoelectric conversion portion 202 during the period from the first time to the second time is transferred to two transfer destinations. For example, in the pixel 201*f*, a first transfer transistor 261*f* transfers electric charge stored in the photoelectric conversion portion 202*f* to an input node 260*a* of a first amplification transistor 263*a*. A second transfer transistor 262*f* transfers electric charge stored in the photoelectric conversion portion 202*f* to an input node 260*f* of a first amplification transistor 263*f*. More specifically, the transfer portion of each pixel transfers electric charge stored in the photoelectric conversion portion 202 to two nodes.

A signal deriving from electric charge transferred by the first transfer transistor 261 and a signal deriving from electric charge transferred by the second transfer transistor 262 are first signals deriving from electric charge stored during the period from the first time to the second time. For example, a signal deriving from electric charge transferred from the photoelectric conversion portion 202*f* to the input node 260*a* is one of a plurality of first signals generated from the pixel 201*f*. Further, a signal deriving from electric charge transferred from the photoelectric conversion portion 202*f* to the input node 260*f* is another one of the plurality of first signals generated from the pixel 201*f*.

In the present exemplary embodiment, the control node of the first transfer transistor 261 and the control node of the second transfer transistor 262*f* are mutually connected. Therefore, the first and second transfer transistors 261 and 262 turn on in parallel when a driving signal is supplied to their transfer gates to transfer electric charge. Thus, electric charge stored in the photoelectric conversion portion 202 during the period from the first time to the second time can be equally transferred to two transfer destinations. In other words, electric charge stored in the photoelectric conversion portion 202 during the period from the first time to the second time can be distributed to two transfer destinations. For example, for the pixel 201*f*, the input node 260*a* and the input node 260*f* are two transfer destinations.

As mentioned above, in the present exemplary embodiment, the transfer portion outputs two first signals deriving from electric charge stored during the period from the first time to the second time. An electric charge transfer operation performed in the present exemplary embodiment is comparable to a signal output operation.

In the present exemplary embodiment, electric charges transferred from a plurality of photoelectric conversion portions 202 are added at the input node 260 of the first amplification transistor 263. Electric charges transferred from respective photoelectric conversion portions can be added by simultaneously transferring electric charges from a plurality of photoelectric conversion portions. Alternatively, it is feasible to add electric charges transferred from respective photoelectric conversion portions by causing one photoelectric conversion portion to transfer electric charge in advance and then causing the other photoelectric conversion portion to transfer electric charge in a state where the electric charge transferred in advance is stored.

For example, electric charges are transferred from four photoelectric conversion portions 202*a*, 202*b*, 202*e*, and 202*f* to the input node 260*a* of the first amplification transistor 263*a*. Then, the electric charges transferred from the above-mentioned photoelectric conversion portions are added at the input node 260*a*. Therefore, the first amplification transistor 263a outputs a signal that reflects the total amount of electric charges transferred from four photoelectric conversion portions 202a, 202b, 202e, and 202f to the input node 260a. Further, electric charges are transferred from four photoelectric conversion portions 202f, 202g, 202j, and 202k to the input node 260f of the first amplification transistor 263f. Then, the electric charges transferred from the above-mentioned photoelectric conversion portions are added at the input node 260f. Therefore, the first amplification transistor 263f outputs a signal that reflects the total amount of electric charges transferred from four photoelectric conversion portions 202f, 202g, 202j, and 202k to the input node 260f. As mentioned above, the first amplification transistor 263 can output a second signal that can be obtained by adding a plurality of first signals.

In FIG. 8, each of a dotted line 270 and an alternate long and short dash line 271 indicates a combination of pixels whose electric charges are to be added. Electric charges of four photoelectric conversion portions are added at each input node 260 of the first amplification transistor 263.

The input node 260 includes a floating diffusion area (hereinafter, referred to as an FD area). Electric charges of the photoelectric conversion portion 202 are transferred to the FD area via the transfer transistor. The input node 260 can be configured to include only one FD area. In this case, improvement in the sensitivity and saturation can be expected because of an increase in the area ratio of the photoelectric conversion portion to the entire pixel. Alternatively, the input node 260 can include a plurality of FD areas that are electrically connected to each other via a wiring. In this case, a color image pickup apparatus can employ the present invention because arbitrary FD areas can be electrically connected via a wiring. Further, the input node 260 can be configured to include a wiring that constitutes an electric path connecting an FD area to a gate electrode of the above-mentioned first amplification transistor.

As mentioned above, the driving method according to the present exemplary embodiment is characterized in that electric charges distributed from one photoelectric conversion portion are added to electric charges distributed from another photoelectric conversion portion. In other words, the image pickup apparatus according to the present exemplary embodiment performs moving average processing based on addition of the distributed electric charges.

Figure 9:
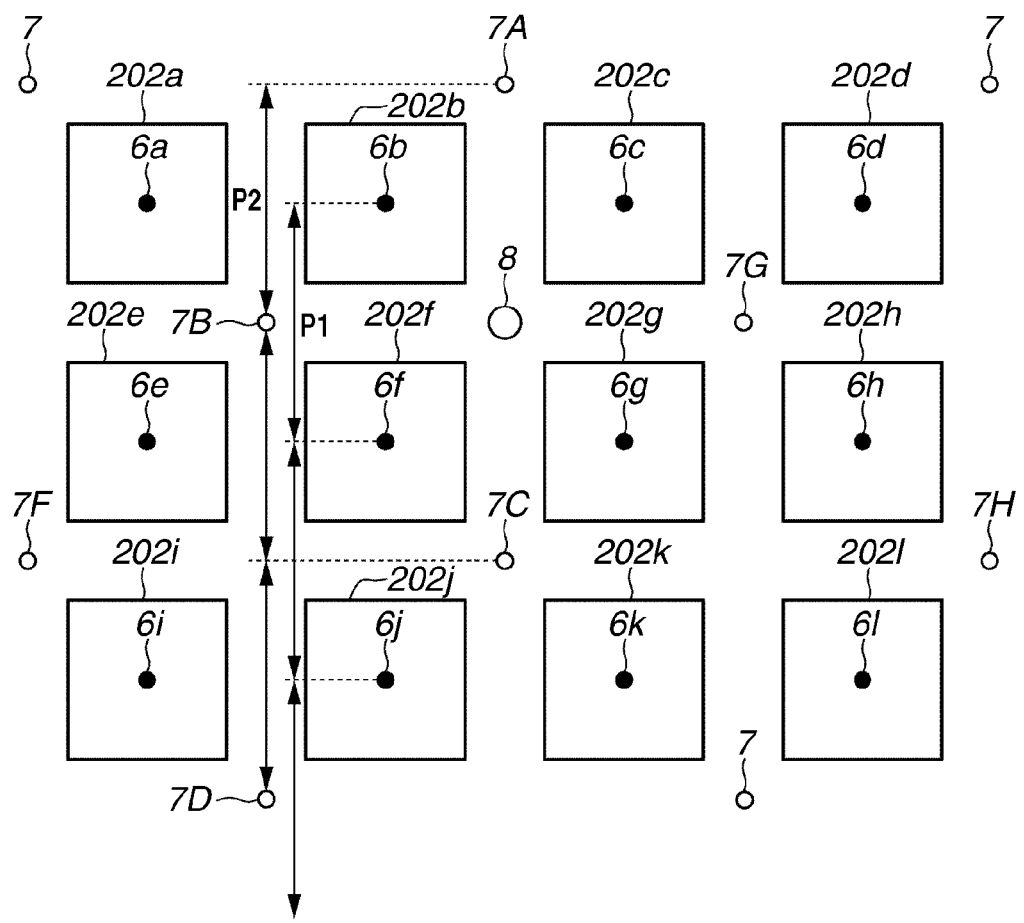
FIG. 9 illustrates a schematic layout of a plurality of pixels of the image pickup apparatus according to an exemplary embodiment.

Subsequently, the signal centroid of a second signal obtained through the moving average processing is described in detail below with reference to FIG. 9. FIG. 9 illustrates a schematic layout of a plurality of photoelectric conversion portions 202. Further, in FIG. 9, each black dot represents the centroid 6 of the photoelectric conversion portion 202. The centroid 6 of the photoelectric conversion portion 202 and the signal centroid 6 of a first signal generated from the pixel 201 that includes the photoelectric conversion portion 202 are identical in their position. The first signal generated from the pixel 201 is a signal deriving from electric charge stored in the photoelectric conversion portion 202 of the pixel 201 during the period from the first time to the second time and then transferred from the photoelectric conversion portion 202. The first signal of the pixel 201 is a pre-addition signal.

Further, in FIG. 9, each white dot represents the signal centroid 7 of a second signal that can be obtained by adding first signals of a plurality of pixels 201. The second signal is an amplified signal output from the first amplification transistor 263 based on the total amount of electric charge added at the input node 260 or a signal amplified at a following stage that amplifies the output signal (i.e., the amplified signal) of the first amplification transistor 263.

Hereinafter, pixels included in the second column are described in detail below. The signal centroid of a first signal generated from the pixel 201b (i.e., a pre-addition signal) and the centroid 6b of the photoelectric conversion portion 202b are identical in their position. Similarly, signal centroids of first signals generated from the pixels 201f and 201j and the centroids 6f and 6j of the photoelectric conversion portions 202f and 202j are identical in their position. These photoelectric conversion portions 202b, 202f, and 202j are disposed at the predetermined pitch P1 in the column direction. More specifically, the signal centroid pitch of pre-addition signals is equal to P1. In the present exemplary embodiment, the column direction is the first direction.

Signal centroids 7A to 7D of second signals (i.e., post-addition signals) can be obtained by adding first signals of a plurality of photoelectric conversion portions. The signal centroid 7A is a signal centroid of a second signal that can be obtained by adding first signals of the pixels 201b and 201c and first signals of two other pixels (not illustrated). The signal centroid 7B is a signal centroid of a second signal that can be obtained by adding first signals of four pixels surrounded with the dotted line 270 illustrated in FIG. 8. The signal centroid 7C is a signal centroid of a second signal that can be obtained by adding first signals of four pixels surrounded with the alternate long and short dash line 271 illustrated in FIG. 8. The signal centroid 7D is a signal centroid of a second signal that can be obtained by adding first signals of the pixels 201i and 201j and first signals of two other pixels (not illustrated). These signal centroids 7A to 7D are disposed at the pitch P2 in the column direction.

As illustrated in FIG. 9, the pitch P1 is equal to the pitch P2. In other words, the sampling pitch remains the same before and after the addition processing. More specifically, the signals of pixels included in the second column are subjected to the moving average processing. Therefore, it is feasible to obtain a signal including a lesser amount of moire without greatly deteriorating the resolution in the column direction.

Further, the driving method according to the present exemplary embodiment includes performing moving average processing on first signals of a plurality of pixels aligned in the row direction. For example, the alignment pitch of the centroids 6a to 6d of the photoelectric conversion portions 202e to 202h is equal to the pitch of the signal centroids 7F, 7B, 7C, 7G, and 7H of post-addition signals in the row direction. Therefore, it is feasible to obtain a signal including a lesser amount of moire without greatly deteriorating the resolution in the column direction.

The signal centroids of a plurality of second signals obtained through the moving average processing according to the present exemplary embodiment are mutually shifted by one pixel in each of the row direction and the column direction. Therefore, it is useful to perform interpolation processing based on these second signals. For example, it is useful to generate a third signal having a signal centroid at the position of a dot 8 indicated by a dotted line in FIG. 9, as a composite signal obtainable based on four second signals that have the signal centroids 7A, 7B, 7C, and 7G, respectively. Performing the above-mentioned interpolation processing is useful in obtaining a high-resolution image that includes a lesser amount of noises that may be caused by high-frequency components (e.g., moire).

Alternatively, it is useful to perform the moving average processing on post-addition signals (i.e., second signals). For example, it is feasible to obtain four fourth signals having signal centroids positioned at the black dots 6a, 6b, 6e, and 6f by adding or averaging a second signal having the signal centroid 7B to or with four neighboring second signals.

Repetitively performing the moving average processing as mentioned above is effective in further reducing the noises that may be caused by high-frequency components (e.g., moire).

The column circuits included in the signal processing unit 105 can perform the above-mentioned interpolation processing, or the moving average processing applied to the post-addition signals. A method described in the fourth exemplary embodiment is usable to perform the moving average processing applied to the post-addition signals.

A driving method according to the present exemplary embodiment is described in detail below. FIGS. 10A and 10B are timing charts illustrating driving signals. A driving signal RES is supplied to a control line connected to the reset transistor 267. A driving signal TX is supplied to a control line connected to the control node of the first transfer transistor 261 and the control node of the second transfer transistor 262. A driving signal CLAMP is supplied to a control line connected to the control node of the clamp transistor 264. A driving signal SEL is supplied to a control line connected to the control node of the selection transistor 266.

In the present exemplary embodiment, the driving signal RES, the driving signal TX, and the driving signal CLAMP are synchronously supplied to all pixels. The driving signal SEL(n), the driving signal SEL(n+1), and the driving signal SEL(n+2) are supplied to control lines of selection transistors located in different rows.

Each driving signal can take at least two (e.g., high-level and low-level) values. If a high-level driving signal is supplied to a transistor or to a switch, the transistor or the switch turns on. If a low-level driving signal is supplied, the transistor or the switch turns off.

An operation performed based on the driving signals illustrated in FIG. 10A is described below. Before time T1 illustrated in FIG. 10A, each driving signal has a low-level value. At time T1, the signal value changes from low-level to high-level in each of the driving signal RES and the driving signal TX. Thus, the photoelectric conversion portion 202 is reset. Subsequently, the signal value changes from high-level to low-level in each of the driving signal RES and the driving signal TX. At this moment, the photoelectric conversion portion 2 starts storing electric charge. More specifically, the exposure period begins. In the present exemplary embodiment, the first time is the timing when the first transfer transistor 261 and the second transfer transistor 262 turn off after the time T1.

At time T2, the signal value changes from low-level to high-level in each of the driving signal RES and the driving signal CLAMP. Thus, the voltage applied to the input node 260 of the first amplification transistor 263 and the input node of the second amplification transistor 265 is reset. After a predetermined time has elapsed since time T2, the signal value changes from high-level to low-level in each of the driving signal RES and the driving signal CLAMP. Thus, reset noises can be removed.

At time T3, the driving signal TX changes from low-level to high-level. In this case, electric charge stored in the photoelectric conversion portion 202 of each pixel can be transferred to two input nodes 260 in parallel. In another viewpoint, electric charge stored in the photoelectric conversion portion 202 of each pixel can be distributed to two input nodes 260. Further, in this case, electric charges are transferred from a plurality of photoelectric conversion portions 202 to the input node 260 and added at the input node 260. Then, the voltage of the output node of the first amplification transistor 263 changes according to the total amount of transferred electric charges. After a predetermined time has elapsed since time T3, the signal value changes from high-level to low-level in the driving signal TX. In the present exemplary embodiment, the second time is the timing when the first transfer transistor 261 and the second transfer transistor 262 turn on.

As mentioned above, in the present exemplary embodiment, the first signal deriving from electric charge stored during the period from the first time to the second time is output twice by the transfer portion. Further, the transferred electric charges are added at the input node 260. Therefore, the moving average processing can be concurrently performed when the first and second transfer transistors 261 and 262 turn on. The driving signal TX is synchronously supplied to all pixels. Therefore, the image pickup apparatus according to the present exemplary embodiment can perform moving average processing on signals of all pixels in a lump. More specifically, the image pickup apparatus can concurrently perform a plurality of addition operations.

After time T4, the driving pulses SEL(n) and SEL(n+1), and SEL(n+2) successively change from low-level to high-level. Thus, a plurality of second signals can be successively output to the output lines 272 and 273. The second signals are then transmitted from the output lines 272 and 273 to the signal processing unit 105, in which the second signals are subjected to predetermined signal processing.

A selection transistor 266a and a selection transistor 266f are connected to different output lines. Therefore, in FIG. 10A, the driving signal SEL(n) and the driving signal SEL(n+1) are synchronous with each other. The above-mentioned driving method is useful in increasing the signal reading speed.

As illustrated in FIG. 10B, the driving signal SEL(n) and the driving signal SEL(n+1) can successively change from low-level to high-level. According to an operation that can be performed based on driving signals illustrated in FIG. 10B, the second signal is output to one of two output lines 272 and 273. Therefore, it is feasible to input the same second signal to two column circuits. Accordingly, it is easy for the signal processing unit 105 to perform the moving average processing.

As mentioned above, the image pickup apparatus according to the present exemplary embodiment performs moving average processing on first signals of a plurality of pixels. More specifically, the image pickup apparatus averages the signals of pixels in such a way as to dispose signal centroids of a plurality of second signals obtained through addition processing at a pitch similar to the alignment pixel of the pixels. According to the above-mentioned configuration, it is feasible to obtain a signal including a lesser amount of noises that may be caused by high-frequency components (e.g., moire).

Further, the image pickup apparatus according to the present exemplary embodiment concurrently outputs a plurality of first signals deriving from electric charges stored in the same exposure period. More specifically, the image pickup apparatus distributes electric charge stored in one photoelectric conversion portion during the period from the first time to the second time to two input nodes. Then, the image pickup apparatus adds electric charge distributed from a plurality of pixels. Therefore, the signal to be used in the moving average processing is the signal deriving from electric charges obtained in the same storage period. The above-mentioned configuration is useful in effectively preventing the image quality from deteriorating, compared to a case where the moving average processing is performed using signals that are different in exposure period.

Further, the image pickup apparatus according to the present exemplary embodiment performs the moving average processing (more specifically, addition of electric charges) in each pixel. Therefore, it is unnecessary to perform additional processing on an image signal output from the image pickup apparatus. As a result, the image pickup apparatus can speedily complete an image capturing operation. The entire configuration of the image pickup system can be downsized.

Further, the image pickup apparatus according to the present exemplary embodiment operates in such a way as to synchronously drive all pixels. More specifically, the image pickup apparatus according to the present exemplary embodiment performs a global electronic shutter operation in which the exposure periods of respective pixels coincide with each other. According to the above-mentioned configuration, the image quality can be improved because it is feasible to reduce a distortion of a speedily moving subject. As a modified example of the present exemplary embodiment, the image pickup apparatus can perform a rolling shutter type exposure operation.

The Fifth Embodiment

A fifth exemplary embodiment of the present invention is described below. The fifth exemplary embodiment is characterized in that the signal processing unit performs moving average processing on a plurality of second signals obtained through the moving average processing in the first to fourth exemplary embodiments. The signal processing unit has the following configuration and performs the following signal processing. The rest of the image pickup apparatus according to the present exemplary embodiment is similar to those described in the first to fourth exemplary embodiments.

FIG. 2 is a block diagram illustrating the overall arrangement of an image pickup apparatus 101 according to the present exemplary embodiment. The image pickup apparatus 101 can be constituted as one chip having a semiconductor substrate. The image pickup apparatus 101 includes a plurality of pixels arranged in an imaging area 102. In addition to the imaging area 102, the image pickup apparatus 101 includes a control unit 103, a vertical scanning unit 104, and an output unit 106, whose configurations are similar to those described in the first to fourth exemplary embodiments and, therefore, redundant description thereof will be avoided.

Figure 11:
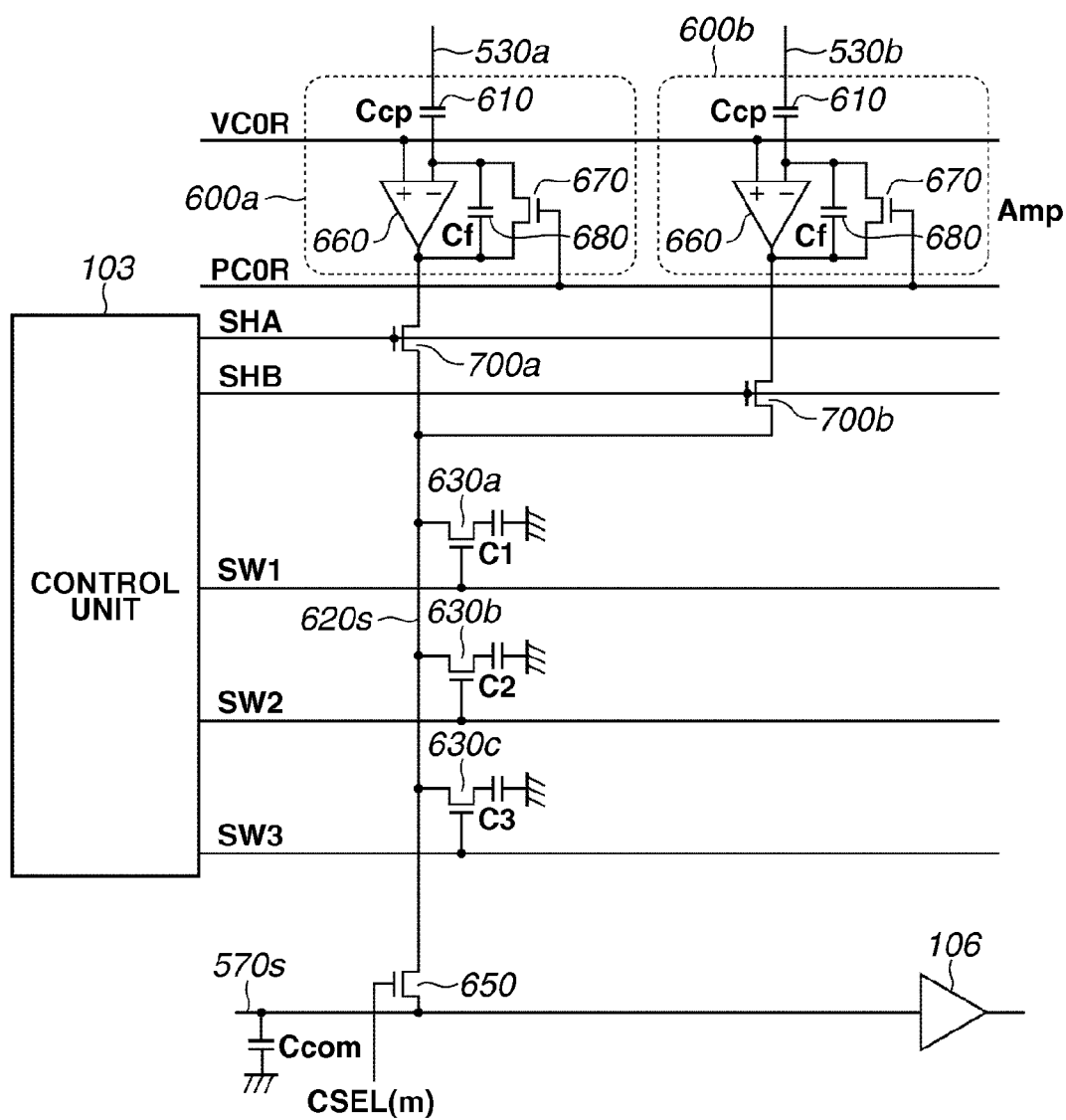
FIG. 11 illustrates an equivalent circuit of a signal processing unit of the image pickup apparatus according to an exemplary embodiment.

FIG. 11 illustrates an equivalent circuit of a part of the signal processing unit 105. The circuit illustrated in FIG. 11 includes column circuits and a horizontal output line included in the signal processing unit 105. FIG. 11 illustrates column circuits of only two columns, although numerous column circuits can be disposed for a plurality of pixel columns arranged in the imaging area 102.

Second signals obtained through the moving average processing in the imaging area 102 are output to the output lines 530a and 530b. If the imaging area 102 has the configuration illustrated in FIG. 3, the output lines 530a and 530b are the output lines 216 and 217 illustrated in FIG. 3, respectively. Alternatively, if the imaging area 102 has the configuration illustrated in FIG. 8, the output lines 530a and 503b are the output lines 272 and 273, respectively.

Column amplification circuits 600a and 600b amplify the signals input via the output lines 530a and 530b and output amplified signals, respectively. Each of the column amplification circuits 600a and 600b includes an operational amplifier 660, a capacitor 610, a capacitor 680, and a feedback switch 670.

Each output line 530 is electrically connected to an inverting input terminal of the operational amplifier 660 via the capacitor 610. A predetermined voltage VC0R is applied to a non-inverting input terminal of the operational amplifier 660.

The feedback switch 670 and the capacitor 680 are disposed, as a parallel electric path, between the inverting input terminal and an output terminal of the operational amplifier 660. A control line is connected to a control node of the feedback switch 670. A driving signal PC0R is supplied to the control node of the feedback switch 670.

The column amplification circuits 600a and 600b have output nodes that are electrically connected to a node 620s via sample-hold switches (hereinafter, referred to as SH switches) 700a and 700b, respectively. The node 620s is electrically connected to a capacitor C1 via a first selection switch 630a, to a capacitor C2 via a second selection switch 630b, and to a capacitor C3 via a third memory selection switch 630c.

The node 620s is electrically connected to a horizontal output line 570s via a horizontal transfer switch 650. The horizontal transfer switch 650 can be controlled by a driving signal CSEL supplied from a horizontal scanning circuit (not illustrated). The horizontal output line 570s is electrically connected to the output unit 106.

Figure 12:
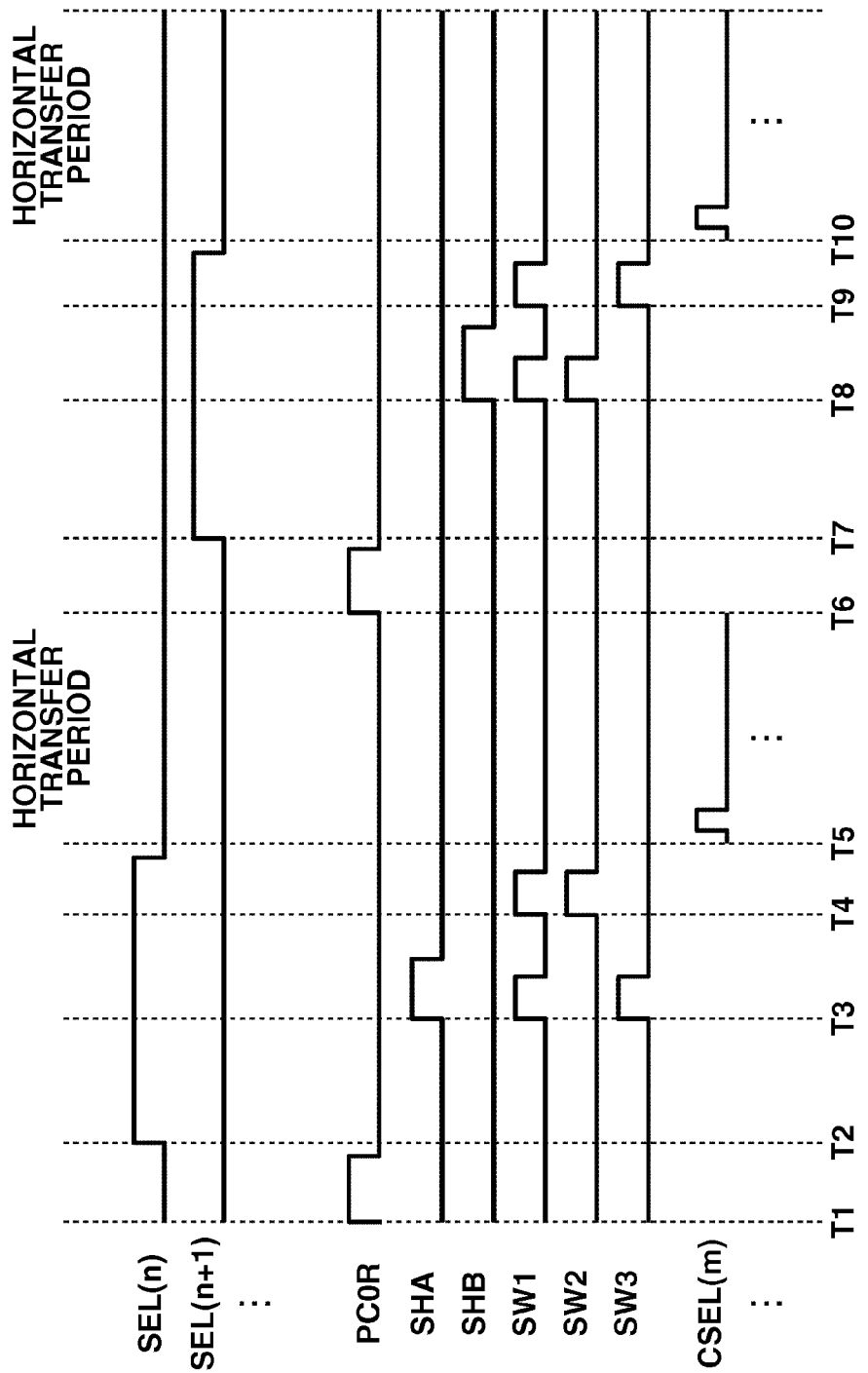
FIG. 12 is a timing chart illustrating driving signals according to an exemplary embodiment.

A driving method according to the present exemplary embodiment is described in detail below. FIG. 12 is a timing chart illustrating driving signals. Two driving signals SEL(n) and SEL(n+1) illustrated in FIG. 12 are the driving signals SEL(n) and SEL(n+1) illustrated in FIGS. 5A and 5B and FIGS. 10A and 10B. More specifically, the driving signals SEL(n) and SEL(n+1) illustrated in FIG. 12 are respectively supplied to selection transistors of the imaging area 102. The timing chart illustrated in FIG. 12 corresponds to the period before and after the driving signals SEL(n) and SEL(n+1) change from low-level to high-level in FIGS. 5A and 5B and in FIGS. 10A and 10B.

In FIG. 12, the driving signal PC0R is supplied to the control line connected to the feedback switch 670. Driving signals SHA and SHB are supplied to control lines connected to the control nodes of the SH switches 700a and 700b, respectively. Driving signals SW1 to SW3 are supplied to control lines connected to the control nodes of the memory selection switches 630a, 630b, and 630c, respectively. The driving signal CSEL(m) is supplied to a control line connected to the control node of the horizontal transfer switch 650.

In the present exemplary embodiment, the control unit 103 provides the driving signal PC0R, the driving signal SHA, the driving signal SHB, and the driving signal SW1 to SW3. Further, the horizontal scanning circuit provides the driving signal CSEL(m).

Each driving signal can take at least two (e.g., high-level and low-level) values. If a high-level driving signal is supplied to a transistor or to a switch, the transistor or the switch turns on. If a low-level driving signal is supplied, the transistor or the switch turns off.

It is now assumed that the moving average processing has been performed before time T1. More specifically, before time T1, the image pickup apparatus has completed the operation to be performed during the period from time T1 to time T5 illustrated in FIGS. 5A and 5B or the operation to be performed during the period from time T1 to time T4 illustrated in FIG. 10B. Further, the signal generated from the (n−1)th row, i.e., the preceding reading row, has been stored in the capacitor C1 and the capacitor C2.

At time T1, the driving signal PC0R changes from low-level to high-level. Other driving signals have low-level values. Thus, the column amplification circuits 600a and 600b are reset. In this case, a predetermined voltage is applied to the output lines 530a and 530b. After a predetermined time has elapsed since time T1, the signal value changes from high-level to low-level in the driving signal PC0R.

At time T2, the driving signal SEL(n) changes from low-level to high-level. Thus, the second signal obtained through the moving average processing in the imaging area 102 is output to the output line 530a.

Subsequently, at time T3, the signal value changes from low-level to high-level in each of the driving signal SHA, the driving signal SW1, and the driving signal SW3. Thus, the column amplification circuit 600a amplifies the second signal received from the output line 530a, and outputs an amplified signal to the node 620s. The amplified signal output from the column amplification circuit 600a is stored in the capacitor C1 and the capacitor C3. After a predetermined time has elapsed since time T3, the signal value changes from high-level to low-level in each of the driving signal SHA, the driving signal SW1, and the driving signal SW3.

At time T4, the signal value changes from low-level to high-level in each of the driving signal SW1 and the driving signal SW2. Thus, the signal stored in the capacitor C1 (i.e., the amplified signal based on second signal) and the signal stored in the capacitor C2 (i.e., the amplified signal based on the second signal) are averaged at the node 620s. In this case, the signal read out at the time T3 is stored in the capacitor C1. On the other hand, the signal generated from the (n−1)th row, i.e., the preceding reading row, is stored in the capacitor C2. More specifically, at time T4, the second signal generated from the (n−1)th row and the second signal generated from the n-th row are averaged. After a predetermined time has elapsed since time T4, the signal value changes from high-level to low-level in each of the driving signal SW1 and the driving signal SW2.

The horizontal transfer period starts at time T5. More specifically, the horizontal scanning circuit successively outputs the driving signal CSEL. Thus, the signal of the node 620s is capacitively divided and output to the horizontal output line 570s. The output unit 106 outputs the signal, which is output to the horizontal output line 570s, to an external device provided outside the image pickup apparatus.

Next, at time T6, the driving signal PC0R changes from low-level to high-level. Thus, the feedback switch 670 turns on and the column amplification circuits 600a and 600b are reset. In this case, the predetermined voltage is applied to the output lines 530a and 530b. After a predetermined time has elapsed since time T6, the signal value changes from high-level to low-level in the driving signal PC0R.

At time T7, the driving signal SEL (n+1) changes from low-level to high-level. Thus, the signal obtained through the moving average processing in the imaging area 102 is output to the output line 530b.

Subsequently, at time T8, the signal value changes from low-level to high-level in each of the driving signal SHB, the driving signal SW1, and the driving signal SW2. Thus, the column amplification circuit 600b amplifies the second signal of the output line 530b and outputs the amplified signal to the node 620s. Then, the amplified signal output from the column amplification circuit 600b is stored in the capacitor C1 and the capacitor C2. After a predetermined time has elapsed since time T8, the signal value changes from high-level to low-level in each of the driving signal SHB, the driving signal SW1, and the driving signal SW2.

At time T9, the signal value changes from low-level to high-level in each of the driving signal SW1 and the driving signal SW3. Thus, the signal stored in the capacitor C1 (i.e., the amplified signal based on the second signal) and the signal stored in the capacitor C3 (i.e., the amplified signal based on the second signal) are averaged at the node 620s. In this case, the signal read out at time T8 is stored in the capacitor C1. On the other hand, the signal read out at time T3 (i.e., the signal generated from the (n−1)th row, i.e., the preceding reading row) is stored in the capacitor C2. More specifically, at time T4, the second signal generated from the n-th row and the second signal generated from the (n+1)th row are averaged. After a predetermined time has elapsed since the time T4, the signal value changes from high-level to low-level in each of the driving signal SW1 and the driving signal SW2.

The horizontal transfer period starts at time T10. More specifically, the horizontal scanning circuit successively outputs the driving signal CSEL. Thus, the signal of the node 620s is capacitively divided and output to the horizontal output line 570s. The output unit 106 outputs the signal, which is output to the horizontal output line 570s, to an external device provided outside the image pickup apparatus.

In the present exemplary embodiment, second signals Sn−1, Sn, S+1, Sn+2 . . . are successively output from the imaging area 102 when the driving signals SEL(n−1), SEL(n), SEL(n+1), SEL(n+2) . . . change from low-level to high-level. In the present exemplary embodiment, the signal processing unit successively outputs a third signal obtained by averaging the second signals Sn-1 and Sn, a third signal obtained by averaging the second signals Sn and Sn+1, a third signal obtained by averaging the second signals Sn+1 and Sn+2, . . . . In other words, the signal processing unit performs the moving average processing.

As mentioned above, in the present exemplary embodiment, a plurality of second signals obtained from the imaging area 102 through the moving average processing is further subjected to the moving average processing to be performed by the signal processing unit 105. The above-mentioned configuration brings an effect of reducing noises that may be caused by high-frequency components (e.g., moire) in addition to the effects of any one of the first to fourth exemplary embodiments.

The Sixth Embodiment

A sixth exemplary embodiment of the present invention is described below. The sixth exemplary embodiment is characterized in that first signals that are not yet subjected to the addition or averaging processing are output from the imaging area to the signal processing unit and the signal processing unit performs moving average processing on the received first signals. In the present exemplary embodiment, each column circuit includes at least two capacitors. Then, a first signal deriving from electric charges stored during the period from the first time to the second time is output from a pixel to two capacitors in parallel. In the present exemplary embodiment, the image pickup apparatus performs a rolling shutter type operation characterized in that the exposure period starts and end differently in respective rows. Therefore, the signal processing unit performs moving average processing sequentially for respective rows without performing the moving average processing in a lump for signals of all pixels.

Figure 13:
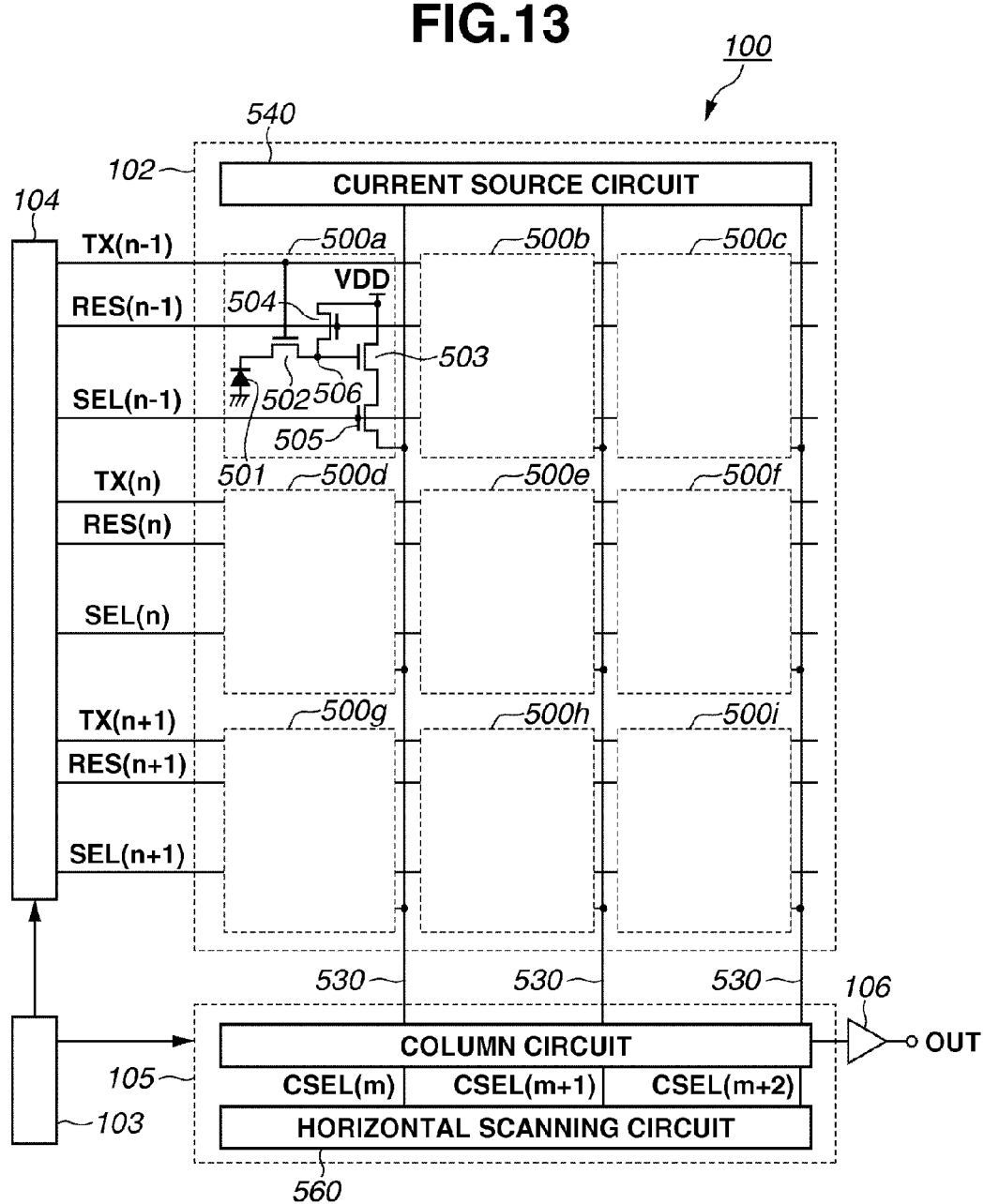
FIG. 13 illustrates a schematic configuration of an image pickup apparatus and an equivalent circuit of a pixel according to an exemplary embodiment.

FIG. 13 is a block diagram illustrating the overall arrangement of an image pickup apparatus 101 according to the present exemplary embodiment. The image pickup apparatus 101 can be constituted as one chip having a semiconductor substrate. The image pickup apparatus 101 includes a plurality of pixels arranged in an imaging area 102. Further, the image pickup apparatus 101 includes a control unit 103. The control unit 103 can provide control signals and can apply a power source voltage to a vertical scanning unit 104, a signal processing unit 105, and an output unit 106.

FIG. 13 illustrates nine pixels 500a to 500i disposed in the imaging area 102, although numerous pixels 500 can be provided in the imaging area 102. In the present exemplary embodiment, these pixels 500 are arranged in a matrix pattern. More specifically, the above-mentioned nine pixels 500a to 500i constitute a matrix having three rows and three columns. Each row includes a group of pixels that can be controlled in parallel by the vertical scanning unit 104. Each column includes a group of pixels disposed in a direction different from the row. The pixel group constituting each column commonly uses one or a plurality of output lines. In the present exemplary embodiment, it is not always necessary to arrange a plurality of pixels in a matrix pattern if the plurality of pixels can be disposed one-dimensionally or two-dimensionally in the imaging area 102.

The vertical scanning unit 104 can provide driving signals to a plurality of pixels arranged in the imaging area 102. For example, the vertical scanning unit 104 provides a driving signal for each pixel row or for a plurality of pixel rows. The vertical scanning unit 104 can be constituted by a shift register or an address recorder.

The signal processing unit 105 includes column circuits, a horizontal scanning circuit 560, and a horizontal output line. Each of the column circuits includes one or a plurality of circuit blocks. The circuit block is, for example, a signal storage portion, a column amplification circuit, a noise removal unit, or an AD conversion unit. The horizontal scanning circuit 560 can be constituted by a shift register or an address recorder. The signal to be output to the horizontal output line can be an analog signal or a digital signal.

The output unit 106 can output a signal transmitted via the horizontal output line to an external device provided outside the image pickup apparatus 101. The output unit 106 includes a buffer or an amplification circuit.

The vertical scanning unit 104, the signal processing unit 105, and the output unit 106 are disposed outside the imaging area 102. More specifically, the boundary of the imaging area 102 is located between elements included in respective pixels and elements constituting the vertical scanning unit 104, the signal processing unit 105, or the output unit 106. For example, the boundary of the imaging area 102 can be an element separation portion extending between elements included in the outermost pixels and elements constituting the vertical scanning unit 104, the signal processing unit 105, or the output unit 106.

In FIG. 13, if it is necessary to describe an individual pixel distinctively, a combination of an alphabet illustrated in the drawing and a reference numeral is used to express each pixel (e.g., pixel 500a). If it is unnecessary to discriminate individual pixels, only the reference numeral (e.g., pixel 500) is simply used to express each pixel. Further, elements included in each of the plurality of pixels 500 are allocated the same reference numerals if these elements are mutually similar in their functions. If it is necessary to describe an individual element distinctively, an alphabet corresponding to a pixel that includes the element to be discriminated is suffixed together with a reference numeral. For example, elements included in the pixel 500a are suffixed with an alphabet "a" that follows their reference numerals.

FIG. 13 illustrates an equivalent circuit of the pixel 500 (more specifically, the pixel 500a). An equivalent circuit of another pixel is identical to that of the pixel 500a.

The pixel 500 includes a photoelectric conversion portion 501, a transfer transistor 502, an amplification transistor 503, a reset transistor 504, and a selection transistor 505. In FIG. 13, a power source voltage is applied to the node VDD.

The photoelectric conversion portion 501 converts incident light into signal charges (electrons or holes). The illustrated example of the photoelectric conversion portion 501 is a photodiode. The transfer transistor 502 can transfer electric charges of the photoelectric conversion portion 501 to an input node 506 of the amplification transistor 503. The amplification transistor 503 and a current source included in a current source circuit 540 cooperatively constitute a source follower circuit. The reset transistor 504 can reset the voltage applied to the input node 506 of the amplification transistor 503. The selection transistor 505 can select a pixel as an output destination of the first signal. The input node 506 of the amplification transistor 503 includes a floating diffusion area (hereinafter, referred to as "FD area"). Electric charges of the photoelectric conversion portion 501 can be transferred to the FD area via the transfer transistor. Further, as a modified embodiment, the input node 506 can include a wiring connected to the FD area.

In the present exemplary embodiment, the transfer transistor 502, the amplification transistor 503, the reset transistor 504, and the selection transistor 505 are MOS transistors. These transistors can be constituted by another type of transistors, such as bipolar transistors.

Control lines are connected to respective control nodes of the transfer transistor 502, the reset transistor 504, and the selection transistor 505. The vertical scanning unit 104 supplies the driving signal TX, the driving signal RES, and the driving signal SEL to respective control lines. In FIG. 13, a suffix (n) indicates that the driving signal is supplied to a pixel in the n-th row and a suffix (n+1) indicates that the driving signal is supplied to a pixel in the (n+1)th row.

A plurality of output lines 530 is disposed in the imaging area 102 in such a way that first signals are time-divisionally output from a plurality of pixels 500 to respective output lines 530. Further, the current source included in the current source circuit 540 is electrically connected to the output line 530. Further, the output line 530 is electrically connected to the signal processing unit 105 (i.e., a following stage).

Figure 14:
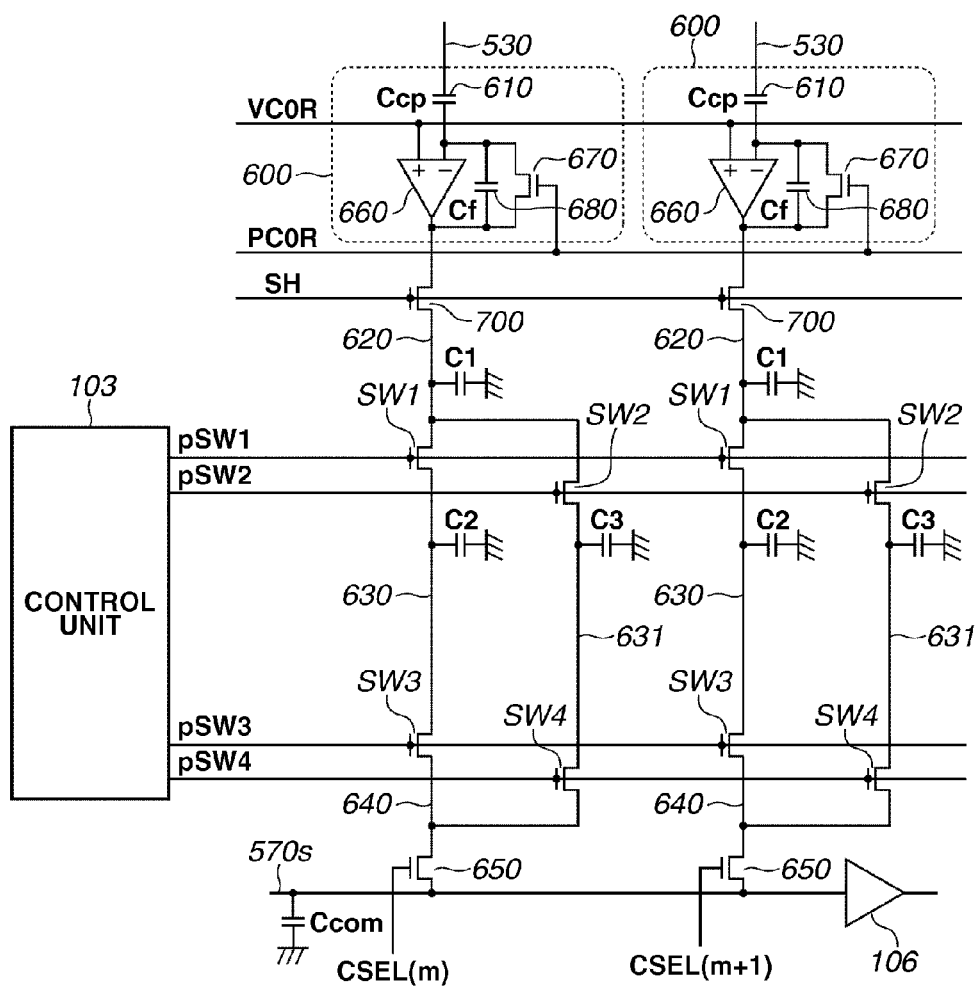
FIG. 14 illustrates an equivalent circuit of a signal processing unit of the image pickup apparatus according to an exemplary embodiment.

Next, a detailed configuration of the column circuit is described below. FIG. 14 illustrates an equivalent circuit of the column circuit. Although FIG. 14 illustrates column circuits of only two columns, numerous column circuits can be disposed for a plurality of pixel columns arranged in the imaging area 102. In FIG. 14, constituent components similar to those illustrated in FIG. 13 are denoted by the same reference numerals.

The first signal generated from each pixel 500 in the imaging area 102 is output to an associated output line 530. Each column amplification circuit 600 amplifies the first signal of a corresponding output line 530, and outputs the amplified signal to the subsequent circuit. The amplified signal output from the column amplification circuit 600 is a first signal. The column amplification circuit 600 includes an operational amplifier 660, a capacitor 610, a capacitor 680, and a feedback switch 670.

The output line 530 is electrically connected to an inverting input terminal of the operational amplifier 660 via the capacitor 610. A predetermined voltage VC0R is applied to a non-inverting input terminal of the operational amplifier 660. The feedback switch 670 and the capacitor 680 are disposed, as a parallel electric path, between the inverting input terminal and an output terminal of the operational amplifier 660. A control line is connected to a control node of the feedback switch 670. A driving signal PC0R is supplied to the control node of the feedback switch 670. The output node of the column amplification circuit 600 is electrically connected, via the sample-hold switch (hereinafter, referred to as SH switch) 700, to a signal storage portion.

The signal storage portion includes anode 620, anode 630, a node 631, a node 640, three capacitors C1 to C3, and four (first to fourth) switches SW1 to SW4. The output node of the column amplification circuit 600 is electrically connected to the node 620 via the SH switch 700. One terminal of the capacitor C1 is electrically connected to the node 620. The ground voltage is applied to the other terminal of the capacitor C1.

A first switch SW1 is disposed in an electric path between the node 620 and the node 630. Further, a second switch SW2 is disposed in an electric path between the node 620 and the node 631. The node 630 is electrically connected to one terminal of the capacitor C2. The ground voltage is applied to the other terminal of the capacitor C2. One terminal of the capacitor C3 is electrically connected to the node 631. The ground voltage is applied to the other terminal of the capacitor C3. Further, the node 630 is electrically connected to the node 640 via the third switch SW3. The node 631 is electrically connected to the node 640 via the fourth switch SW4.

The node 640 is electrically connected to the horizontal output line 570s via the horizontal transfer switch 650. The horizontal transfer switch 650 can be controlled by the driving signal CSEL supplied from the horizontal scanning circuit 560 illustrated in FIG. 13. The horizontal output line 570s is electrically connected to the output unit 106.

Figure 15:
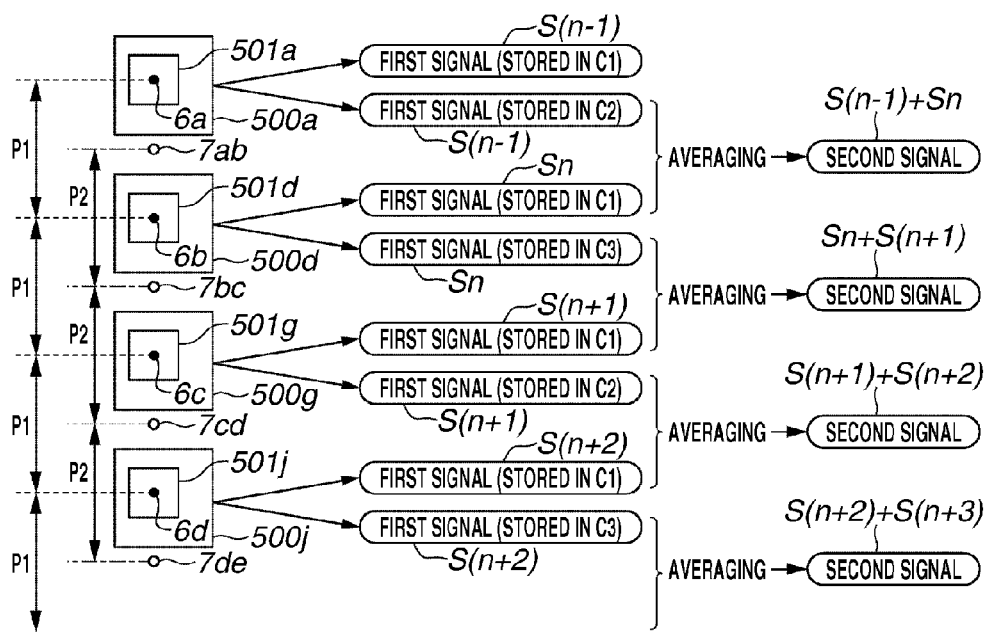
FIG. 15 illustrates a moving average processing method according to an exemplary embodiment.

Subsequently, a moving average processing method according to the present exemplary embodiment is described in detail below with reference to FIG. 15. FIG. 15 illustrates a schematic layout of the pixels 500a, 500d, and 500g illustrated in FIG. 13 and a pixel 500j not illustrated in FIG. 13. The pixels 500a, 500d, and 500g and the pixel 500j are a plurality of pixels that are included in the same column. The pixel 500a is included in the (n−1)th row. The pixel 500d is included in the n-th row. The pixel 500g is included in the (n+1)th row. Then, the pixel 500j is included in the (n+2)th row.

In the present exemplary embodiment, a plurality of first signals S(n−1) deriving from electric charges stored in the pixel 500a during the period from the first time to the second time is output from the pixel 500a. The first signal S(n−1) is stored in the capacitor C1 and the capacitor C2 of the column circuit. More specifically, the first signal S(n−1) deriving from electric charges stored during the same period is output two times.

Next, a plurality of first signals Sn deriving from electric charges stored in the pixel 500d during the period from the first time to the second time is output from the pixel 500d. The first signal Sn is stored in the capacitor C1 and the capacitor C3. In this manner, the first signal Sn generated from the pixel 500d is output two times.

In this case, the first signal S(n−1) generated from the pixel in the (n−1)th row, i.e., the immediately preceding row, is stored in the capacitor C2. Therefore, the first signal S(n−1) stored in the capacitor C2 and the first signal Sn stored in the capacitor C1 are averaged. Thus, a second signal S(n−1)+Sn can be obtained.

Next, a plurality of first signals S(n+1) deriving from electric charges stored the pixel 500g during the period from the first time to the second time is output from the pixel 500g. The first signal S(n+1) is stored in the capacitor C1 and the capacitor C2. As mentioned above, the first signal S(n+1) generated from the pixel 500g is output two times.

In this case, the first signal Sn generated from the pixel in the n-th row, i.e., the immediately preceding row, is stored in the capacitor C3. Therefore, the first signal Sn stored in the capacitor C3 and the first signal S(n+1) stored in the capacitor C1 are averaged. Thus, a second signal Sn+S(n+1) can be obtained.

As mentioned above, in the signal reading operation, the first signal being read from each pixel is output to two of three capacitors. Then, the moving average processing is performed by averaging the first signal read from the immediately preceding row and the first signal read from the new row. As a result, a plurality of second signals can be obtained.

In FIG. 15, each of black dots 6 and white dots 7 represents the signal centroid of a signal. The first signals S(n−1), Sn, S(n+1), and S(n+2) are pre-averaging signals that have signal centroids 6a, 6b, 6c, and 6d, respectively. The second signals S(n−1)+Sn, Sn+S(n+1), and S(n+1)+S(n+2) are post-averaging signals that have signal centroids 7ab, 7bc, and 7cd, respectively. As illustrated in FIG. 15, the pitch P1 of signal centroids 6 of the pre-averaging signals is equal to the pitch P2 of the signal centroid 7 of the post-averaging signals. In other words, the sampling pitch remains the same before and after the averaging processing. In another viewpoint, the signal centroids 6 of the pre-averaging signals are similar to the signal centroids 7 of the post-averaging signals with respect to the number of signal centroids included per unit length in the column direction.

Figure 16:
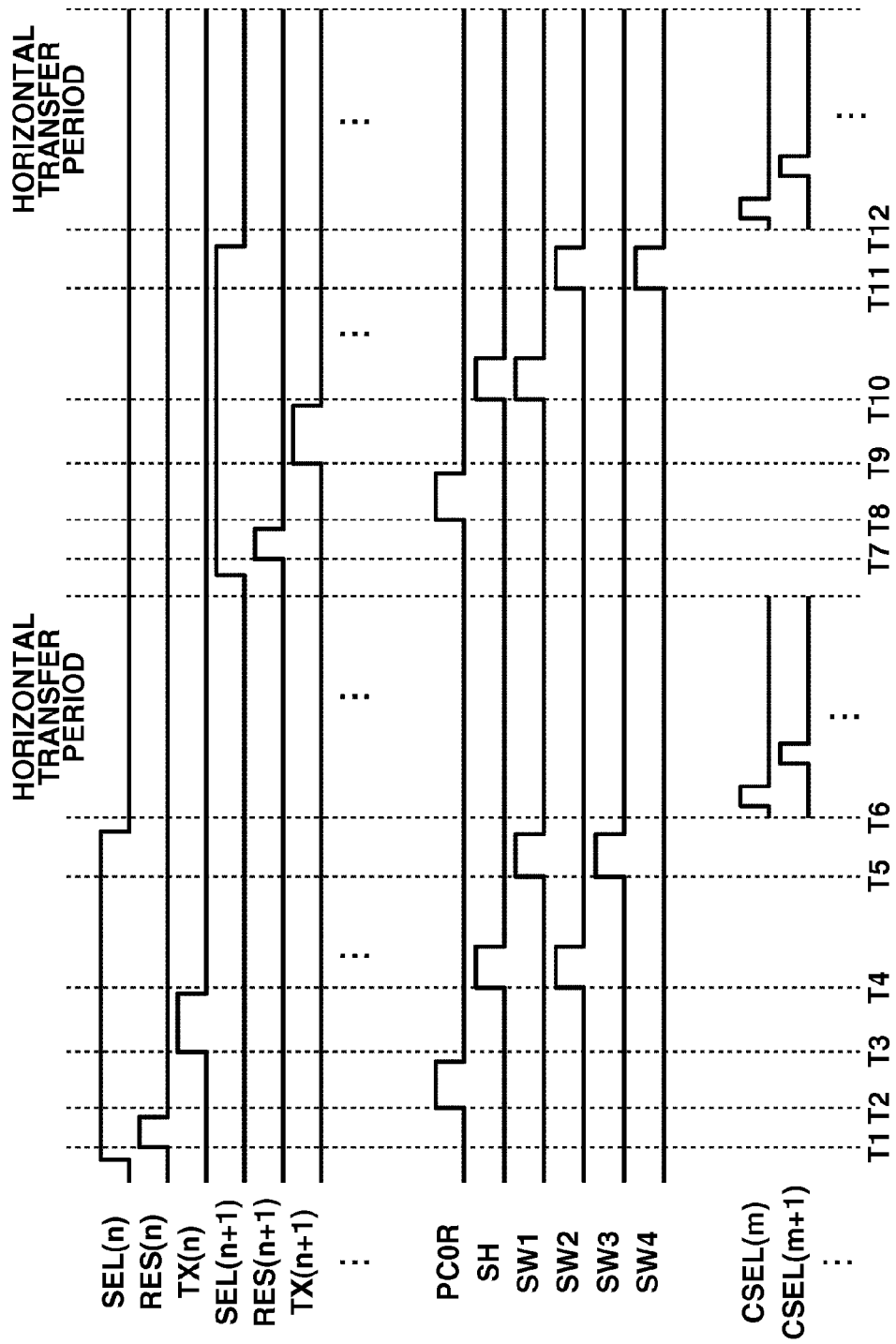
FIG. 16 is a timing chart illustrating driving pulses according to an exemplary embodiment.

A driving method for performing moving average processing according to the present exemplary embodiment is described in detail below with reference to FIG. 16. FIG. 16 is a timing chart illustrating driving signals according to the present exemplary embodiment. The driving signal SEL is supplied to the control line connected to the control node of the selection transistor 505. The driving signal RES is supplied to the control line connected to the control node of the reset transistor 504. The driving signal TX is supplied to the control line connected to the control node of the transfer transistor 502. The driving signal CLAMP is supplied to the control line connected to the control node of the clamp transistor 264.

The driving signal PC0R is supplied to the control line connected to the feedback switch 670. The driving signal SH is supplied to the control line connected to the control node of the SH switch 700. The driving signals SW1 to SW4 are supplied to control lines connected to the control nodes of the first to fourth switches SW1 to SW4, respectively. The driving signal CSEL is supplied to the control line connected to the control node of the horizontal transfer switch 650.

In the present exemplary embodiment, the vertical scanning unit 104 supplies the driving signal SEL, the driving signal RES, and the driving signal TX. The control unit 103 supplies the driving signal PC0R, the driving signal SH, and the driving signals SW1 to SW4. Further, the horizontal scanning circuit supplies the driving signal CSEL.

Each driving signal can take at least two (e.g., high-level and low-level) values. If a high-level driving signal is supplied to a transistor or to a switch, the transistor or the switch turns on. If a low-level driving signal is supplied, the transistor or the switch turns off.

Before time T1, electric charges are stored in the photoelectric conversion portion 501 of each pixel in the n-th row (i.e., the pixels 500d to 500f illustrated in FIG. 13) and in the (n+1)th row (i.e., the pixels 500g to 500i illustrated in FIG. 13). The time when the storage of electric charges starts in respective pixels is the first time. Further, the first signal S(n−1) of the pixel in the (n−1)th row (i.e., the preceding row) is stored in the capacitor C3. Then, the driving signal SEL(n) changes from low-level to high-level to read the first signal Sn of the pixel in the n-th row. Other driving signals are held at the low-level.

During the period from time T1 to time T6, the first signal of each pixel in the n-th row is read out by the corresponding column circuit. At time T1, the driving signal RES(n) changes from low-level to high-level. Thus, each of reset transistors 504d to 504f turns on, and the voltage of respective input nodes 506d to 506f of the amplification transistors 503d to 503f are reset. After a predetermined time has elapsed since time T1, the signal value changes from high-level to low-level in the driving signal RES(n).

At time T2, the signal value changes from low-level to high-level in the driving signal PC0R. Thus, the feedback switch 670 turns on and the column amplification circuit 600 is reset. After a predetermined time has elapsed since time T2, the signal value changes from high-level to low-level in the driving signal PC0R. In this case, a reset level signal (i.e., a signal of a pixel being in a reset state) is output to the output line 530. The reset level signal is clamped by the capacitor 610 when the feedback switch 670 turns off.

At time T3, the signal value changes from low-level to high-level in the driving signal TX(n). Thus, electric charges stored in respective photoelectric conversion portions 501d to 501f are transferred. Then, the amplification transistors 503d to 503f output signals deriving from the transferred electric charges to the output line 530. More specifically, the first signals are output to the output line 530. After a predetermined time has elapsed since time T3, the signal value changes from high-level to low-level in the driving signal TX(n). The time when the transfer transistors 502d to 502f turn off is the second time having been set for the pixels 500d to 500f.

At time T4, the signal value changes from low-level to high-level in each of the driving signal SH and the driving signal SW2. Thus, each of the SH switch 700 and the second switch SW2 turns on. Then, the column amplification circuit 600 outputs the first signal Sn generated from the pixel in the n-th row to the capacitor C1 and the capacitor C3. In this case, the first signal S(n−1) of the preceding row is stored in the capacitor C2. After a predetermined time has elapsed since time T4, the signal value changes from high-level to low-level in each of the driving signal SH and the driving signal SW2.

At time T5, the signal value changes from low-level to high-level in each of the driving signal SW1 and the driving signal SW3. Thus, each of the first switch SW1 and the third switch SW3 turns on. Therefore, the first signal S(n−1) of the preceding row stored in the capacitor C2 and the first signal Sn generated from the pixel in the n-th row stored in the capacitor C1 at time T4 are capacitively divided and averaged at the node 640. Thus, a second signal can be obtained. After a predetermined time has elapsed since time T5, the signal value changes from high-level to low-level in each of the driving signal SW1 and the driving signal SW3.

Subsequently, the horizontal transfer period starts at time T6. When the driving signals CSEL successively change from low-level to high-level, a plurality of second signals can be output to the horizontal output line 570s. In this case, before the horizontal transfer period starts, the signal value changes from high-level to low-level in the driving signal SEL(n).

Subsequently, during the period from time T7 to time T12, the first signal of each pixel in the (n+1)th row is read out by the corresponding column circuit. At time T7, the driving signal RES(n+1) changes from low-level to high-level. Thus, each of reset transistors 504g to 504i turns on, and the voltage of respective input nodes 506g to 506i the amplification transistors 503g to 503i are reset. After a predetermined time has elapsed since time T7, the signal value changes from high-level to low-level in the driving signal RES(n+1).

At time T8, the signal value changes from low-level to high-level in the driving signal PC0R. Thus, the feedback switch 670 turns on and the column amplification circuit 600 is reset. After a predetermined time has elapsed since time T8, the signal value changes from high-level to low-level in the driving signal PC0R. In this case, a reset level signal (i.e., a signal of a pixel being in a reset state) is output to the output line 530. The reset level signal is clamped by the capacitor 610 when the feedback switch 670 turns off.

At time T9, the signal value changes from low-level to high-level in the driving signal TX(n+1). Thus, electric charges stored in respective photoelectric conversion portions 501g to 501i are transferred. Then, the amplification transistors 503g to 503i output signals deriving from the transferred electric charges to the output line 530. More specifically, the first signals are output to the output line 530. After a predetermined time has elapsed since time T9, the signal value changes from high-level to low-level in the driving signal TX(n+1). The time when the transfer transistors 502g to 502i turn off is the second time having been set for the pixels 500g to 500i.

At time T10, the signal value changes from low-level to high-level in each of the driving signal SH and the driving signal SW1. Thus, each of the SH switch 700 and the first switch SW1 turns on. The column amplification circuit 600 outputs the first signal S(n+1) generated from the pixel in the (n+1) th row to the capacitor C1 and the capacitor C2. In this case, the first signal Sn of the preceding row is stored in the capacitor C3. After a predetermined time has elapsed since time T10, the signal value changes from high-level to low-level in each of the driving signal SH and the driving signal SW1.

At time T11, the signal value changes from low-level to high-level in each of the driving signal SW2 and the driving signal SW4. Thus, each of the second switch SW2 and the fourth switch SW4 turns on. Therefore, the first signal Sn of the preceding row stored in the capacitor C3 and the first signal S(n+1) generated from the pixel in the (n+1) th row stored in the capacitor C1 at time T10 are capacitively divided and averaged at the node 640. Thus, a second signal can be obtained. After a predetermined time has elapsed since time T11, the signal value changes from high-level to low-level in each of the driving signal SW2 and the driving signal SW4.

Subsequently, the horizontal transfer period starts at time T12. When the driving signals CSEL successively change from low-level to high-level, a plurality of second signals can be output to the horizontal output line 570s. In this case, before the horizontal transfer period starts, the signal value changes from high-level to low-level in the driving signal SEL(n+1). The above-mentioned operation performed during the period from time T1 to time T12 is repeated for the subsequent rows.

As mentioned above, the image pickup apparatus according to the present exemplary embodiment operates in such a way as to perform the moving average processing on the first signals of a plurality of pixels. More specifically, the image pickup apparatus according to the present exemplary embodiment averages signals of two pixels in such a way as to equalize the signal centroid pitch of second signals obtained through the averaging processing with the alignment pitch of the pixels. According to the above-mentioned configuration, it is feasible to obtain a signal including a lesser amount of noises that may be caused by high-frequency components (e.g., moire)

Further, the image pickup apparatus according to the present exemplary embodiment operates in such a way as to output a plurality of first signals deriving from electric charges stored during the same exposure period. Therefore, the plurality of first signals to be used in the averaging processing are the signals deriving from electric charges obtained during the same storage period. The above-mentioned configuration is useful in effectively preventing the image quality from deteriorating, compared to a case where the adding or averaging processing is performed using signals that are different in exposure period.

Further, in the present exemplary embodiment, the image pickup apparatus internally performs the moving average processing. According to the example illustrated in FIG. 13, the moving average processing is performed by all constituent components of the image pickup apparatus except for the output unit 106. Therefore, it is unnecessary to perform additional processing on an image signal output from the image pickup apparatus. As a result, the image pickup apparatus can speedily complete an image capturing operation. The overall configuration of the image pickup system can be downsized.

Further, in the present exemplary embodiment, the signal processing unit is configured to perform the moving average processing. Such a configuration is useful in that the moving average processing can be performed without being adversely influenced by the configuration of pixels. In other words, improvement in the sensitivity and saturation can be expected because of an increased degree of freedom in designing the layout of pixels.

In the present exemplary embodiment, a driving operation to be applied to the (n−1)th to (n+2)th rows is described, in which "n" is an arbitrary integer. Further, the averaging processing performed in the present exemplary embodiment is applied to two neighboring rows. As described in the second and third exemplary embodiments, it is useful to perform the averaging processing for every m rows. In particular, performing the averaging processing for every m rows is employable in color image pickup apparatuses, in which "m" is an arbitrary natural number.

The Seventh Embodiment

A seventh exemplary embodiment of the present invention is described below. The seventh exemplary embodiment is characterized in that signals that are not yet subjected to the addition or averaging processing are output from the imaging area to the signal processing unit and the signal processing unit performs moving average processing on the received signals. In the present exemplary embodiment, the signal processing unit includes at least two capacitors. Then, a signal deriving from electric charges stored during the period from the first time to the second time is output for a pixel to two capacitors in parallel. In the present exemplary embodiment, the image pickup apparatus performs a rolling shutter type operation characterized in that the exposure period starts and ends differently in respective rows. Therefore, the signal processing unit performs moving average processing sequentially for respective rows without performing the moving average processing in a lump for signals of all pixels.

Further, in the present exemplary embodiment, a signal storage portion included in the signal processing unit is different from the configuration described in the sixth exemplary embodiment. More specifically, to remove the deviation of the column amplification circuit, the signal storage portion is configured to store the output when the column amplification circuit is reset. To this end, features in the present exemplary embodiment are described in detail below if they are not described in the sixth exemplary embodiment, and redundant description thereof will be avoided when the features are already described in the sixth exemplary embodiment.

An overall configuration of the image pickup apparatus according to the present exemplary embodiment is similar to that described in the sixth exemplary embodiment. More specifically, FIG. 13 is a block diagram illustrating the image pickup apparatus according to the present exemplary embodiment. The image pickup apparatus according to the present exemplary embodiment has an imaging area 102 and pixels 500 that similar to those described in the sixth exemplary embodiment.

Figure 17:
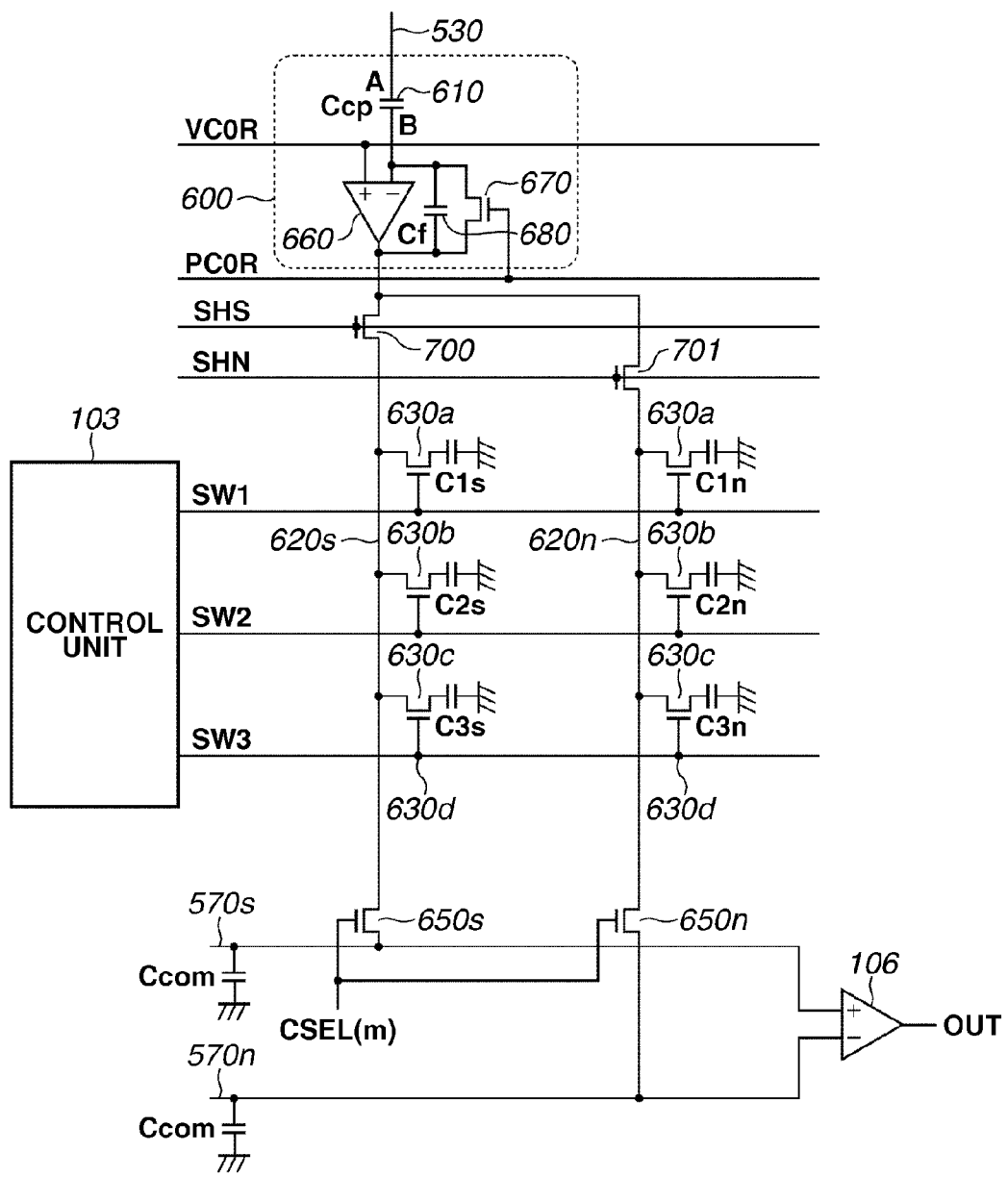
FIG. 17 illustrates an equivalent circuit of a signal processing unit of the image pickup apparatus according to an exemplary embodiment.

Next, a detailed configuration of the column circuit is described below. FIG. 17 illustrates an equivalent circuit of the column circuit. Although FIG. 17 illustrates a column circuit of only one column, numerous column circuits can be disposed for a plurality of pixel columns arranged in the imaging area 102. In FIG. 17, constituent components similar to those illustrated in FIG. 14 are denoted by the same reference numerals.

The signal generated from each pixel 500 in the imaging area 102 is output to an associated output line 530. Each column amplification circuit 600 amplifies the signal of a corresponding output line 530, and outputs the amplified signal to the subsequent circuit. The column amplification circuit 600 includes an operational amplifier 660, a capacitor 610, a capacitor 680, and a feedback switch 670. The column amplification circuit 600 has a configuration similar to that illustrated in FIG. 14 and therefore redundant description thereof will be avoided.

In the present exemplary embodiment, the signal storage portion includes a node 620s, a node 620n, six capacitors C1s, C2s, C3s, C1n, C2n, and C3n, and memory selection switches 630a to 630c.

The output node of the column amplification circuit 600 is electrically connected to the node 620s via the SH switch 700. Further, the output node of the column amplification circuit 600 is electrically connected to the node 620n via the SH switch 701.

The node 620s is electrically connected to the capacitors C1s, C2s, and C3s via the memory selection switches 630a to 630c, respectively. The node 620n is electrically connected to the capacitors C1n, C2n, and C3n via the memory selection switches 630a to 630c, respectively.

The node 620s is electrically connected to a horizontal output line 570s via a horizontal transfer switch 650s. The node 620n is electrically connected to a horizontal output line 570n via a horizontal transfer switch 650n. The horizontal transfer switches 650s and 650n can be controlled by the driving signal CSEL supplied from the horizontal scanning circuit 560 illustrated in FIG. 13. The horizontal output line 570s and the horizontal output line 570n are electrically connected to an output unit 106. The output unit 106 performs differential processing on the signal received via the horizontal output line 570s and the signal received via the horizontal output line 570n.

In the present exemplary embodiment, two SH switches 700 and 701 are controlled in such a way that the offset signal (i.e., the signal indicating a reset state of the column amplification circuit) and the amplified signal output by the column amplification circuit based on the signal generated from the pixel can be stored in the signal storage portion. When the output unit 106 performs differential processing on the amplified signal and the offset signal, an offset component of the column amplification circuit can be removed from the output signal. As a result, noises can be reduced.

Subsequently, a moving average processing method according to the present exemplary embodiment is similar to that described in the sixth exemplary embodiment. More specifically, FIG. 15 illustrates a moving average processing method according to the present exemplary embodiment. Although detailed redundant description thereof will be avoided, the signal of each pixel is output to two of three capacitors in the moving average processing illustrated in FIG. 15. Then, in the moving average processing, the signal of the immediately preceding reading row and the signal of the new reading row are averaged.

In the present exemplary embodiment, the memory selection switches SW1 to SW3 are controlled in such a way as to select two capacitors, which store the signal output from the column amplification circuit 600, of three capacitors C1 to C3 included in the signal processing unit. Further, the memory selection switches SW1 to SW3 are controlled to select two signals to be subjected to the averaging processing. The control unit 103 supplies the driving signals SW1 to SW3 to the control nodes of the memory selection switches SW1 to SW3 in such a way as to realize the above-mentioned operations.

In FIG. 15, each of black dots 6 and white dots 7 represents the signal centroid of a signal. The first signals S(n−1), Sn, S(n+1), and S(n+2) are pre-averaging signals that have signal centroids 6a, 6b, 6c, and 6d, respectively. The second signals S(n−1)+Sn, Sn+S(n+1), and S(n+1)+S(n+2) are post-averaging signals that have signal centroids 7ab, 7bc, and 7cd, respectively. As illustrated in FIG. 15, the pitch P1 of signal centroids 6 of the pre-averaging signals is equal to the pitch P2 of the signal centroids 7 of the post-averaging signals. In another viewpoint, the signal centroids 6 of the pre-averaging signals are similar to the signal centroids 7 of the post-averaging signals with respect to the number of signal centroids included per unit length in the column direction.

As mentioned above, in the present exemplary embodiment, the signal storage portion is configured to store the output indicating the reset state of the column amplification circuit to remove the deviation of the column amplification circuit. Therefore, the present exemplary embodiment brings an effect of reducing noises in addition to the effects described in the sixth exemplary embodiment.

The Eighth Embodiment

An eighth exemplary embodiment of the present invention is described below. In the eighth exemplary embodiment, the signal processing unit includes an analog/digital conversion unit (hereinafter, referred to as AD conversion unit). The AD conversion unit converts the first signal into a digital signal and outputs the converted signal two times. The moving average processing includes adding digital signals.

An image pickup apparatus according to the present exemplary embodiment is similar to the image pickup apparatus described in the first to seventh exemplary embodiments in the overall configuration. For example, FIG. 13 is a block diagram illustrating the overall configuration of the image pickup apparatus. The image pickup apparatus according to the present exemplary embodiment is different from the image pickup apparatus described in the first to seventh exemplary embodiments in the configuration of the signal processing unit 105. The signal processing unit 105 has the following configuration and performs the following operations. Redundant description of other configuration will be avoided.

Figure 18A:
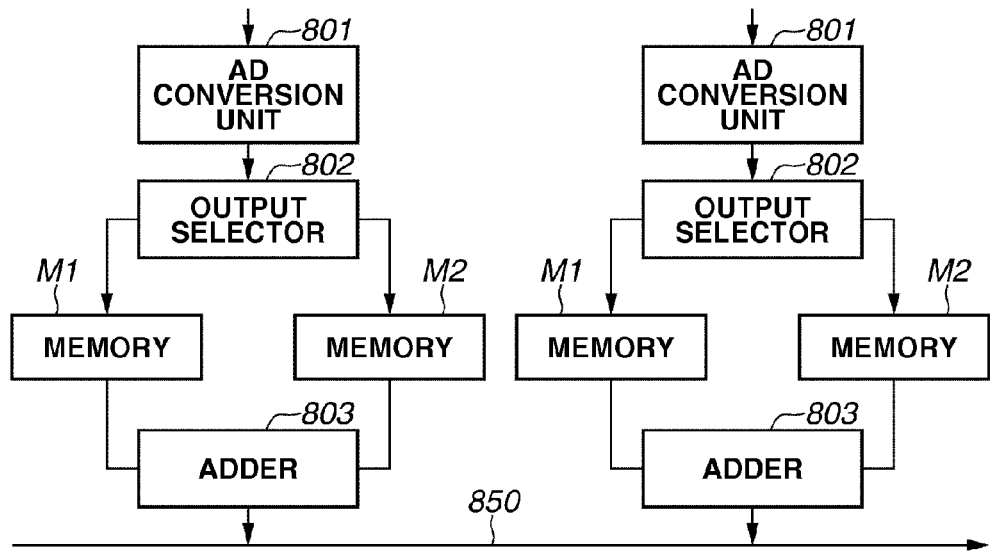
FIGS. 18A and 18B schematically illustrate signal processing units of the image pickup apparatus according to an exemplary embodiment.

FIG. 18A is a block diagram illustrating column circuits of two columns, which can be provided in the signal processing unit 105 of the image pickup apparatus according to the present exemplary embodiment. The number of the column circuits is not limited to the illustrated example. In practice, numerous column circuits can be provided for a plurality of columns arranged in the imaging area 102.

Each column circuit includes an AD conversion unit 801, an output selector 802, a pair of memories M1 and M2, an adder 803, and a horizontal output bus 850. The AD conversion unit 801 can convert an analog signal output from a pixel into a digital signal. The output selector 802 can selectively output the digital signal of the AD conversion unit 801 to the memory M1 or to the memory M2. Each of the memories M1 and M2 can store a digital signal. The adder 803 can add the digital signals stored in respective memories M1 and M2. The digital signal added in the adder 803 can be output to the horizontal output bus 850.

A driving method according to the present exemplary embodiment is described below. First, the AD conversion unit 801 of each column converts an analog signal Sn from a pixel in the n-th row (e.g., one of the pixels 500d to 500f in FIG. 13) into a digital signal SDn.

The output selector 802 outputs the digital signal SDn to the memory M1. The memory M1 stores the digital signal SDn. In this case, a digital signal SD(n−1) of a pixel in the preceding row is stored in the other memory M2.

Then, the adder 803 adds the digital signal SDn to the digital signal SD(n−1). To this end, the digital signal SDn is output from the memory M1 to the adder 803. The digital signal SD(n−1) is output from the memory M2 to the adder 803. Thus, a summed-up digital signal SD(n−1)+SDn is output to the horizontal output bus 850.

Subsequently, the AD conversion unit 801 of each column converts an analog signal S(n+1) from a pixel in the (n+1)th row (e.g., one of the pixels 500g to 500i in FIG. 13) into a digital signal SD(n+1).

The output selector 802 outputs the digital signal SD(n+1) to the memory M2. The memory M2 stores the digital signal SD(n+1). In this case, the digital signal SDn of a pixel in the preceding row is stored in the other memory M1.

Then, the adder 803 adds the digital signal SDn to the digital signal SD(n+1). To this end, the digital signal SDn is output from the memory M1 to the adder 803. Then, the digital signal SD (n+1) is output from the memory M2 to the adder 803. Thus, a summed-up digital signal SDn+SD(n+1) is output to the horizontal output bus 850.

As mentioned above, the digital signal SDn stored in the memory M1 is output to the adder 803 two times. The digital signal SDn is the first signal. As mentioned above, in the present exemplary embodiment, the first signal deriving from electric charges stored in each pixel during the period from the first time to the second time is output twice from the memory to the adder. Then, the adder performs the moving average processing.

Figure 18B:
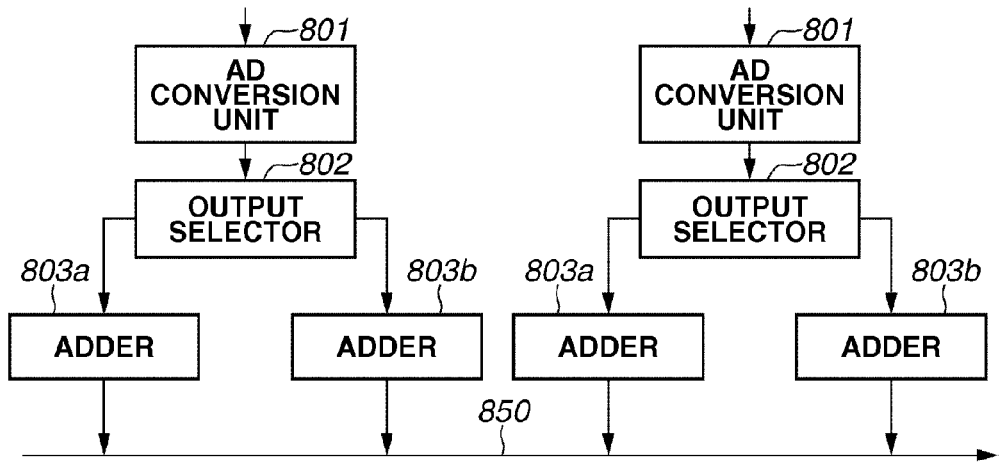

FIG. 18B illustrates a modified example of the image pickup apparatus according to the exemplary embodiment. Each column circuit includes the AD conversion unit 801, the output selector 802, and a pair of adders 803a and 803b. According to the example illustrated in FIG. 18B, the output selector 802 outputs the first signal (i.e., the digital signal converted by the AD conversion unit 801) to both of the adders 803a and 803b. Then, the image pickup apparatus performs moving average processing at the reset timing of respective adders 803a and 803b.

A driving method according to the modified example illustrated in FIG. 18B is simply described below. The output selector 802 resets one of the adders 803a and 803b before outputting the digital signal SDn of a pixel in the n-th row. For example, the output selector 802 resets the adder 803a. In this case, the digital signal SD (n−1) from a pixel in the preceding row is stored in the adder 803b.

Subsequently, the output selector 802 outputs the AD converted digital signal SDn to both of two adders 803a and

803b. As a result, the digital signal SDn is stored in the reset adder 803a. On the other hand, the digital signal SDn and the digital signal SD (n−1) are added in the adder 803b. Thus, a summed-up digital signal SD (n−1)+SDn can be obtained. The digital signal SD (n−1)+SDn is output to the horizontal output bus 850.

Next, the output selector 802 resets the adder 803b. Then, the output selector 802 outputs the AD converted digital signal SD (n+1) to both of two adders 803a and 803b. As a result, the digital signal SD (n+1) is stored in the reset adder 803b. On the other hand, the digital signal SDn+SD (n+1) that can be obtained by adding the digital signal SDn and the digital signal SD (n+1) is stored in the adder 803a.

As mentioned above, in the present exemplary embodiment, the output selector 802 outputs the AD converted digital signal to both of two adders 803a and 803b, to generate a plurality of first signals deriving from electric charges stored during the period from the first time to the second time. Then, each of the adders 803a and 803b performs the moving average processing.

Further, another modified example of the present exemplary embodiment is described in detail below with reference to FIG. 19. The modified example illustrated in FIG. 19 is characterized in that the first signal of a pixel is subjected to two-series of AD conversion processing to output two digital signals as the first signal.

Figure 19:
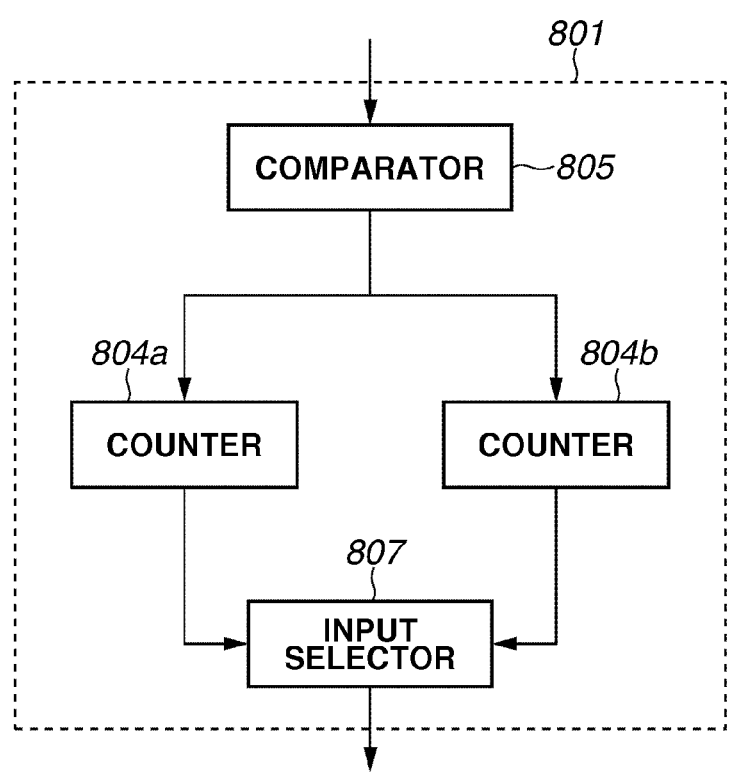
FIG. 19 schematically illustrates a signal processing unit of the image pickup apparatus according to an exemplary embodiment.

FIG. 19 is a block diagram illustrating a configuration of the AD conversion unit 801. The AD conversion unit 801 includes a comparator 805, a pair of counters 804a and 804b, and an input selector 807.

The comparator 805 compares an analog signal of a pixel with a reference signal. The comparator 805 generates a latch pulse based on a comparison result, to latch the counters 804a and 804b. The counters 804a and 804b hold their count values at the input timing of the latch pulse. The input selector 807 selects either the count value of the counter 804a or the count value of the counter 804b and outputs the selected count value to the subsequent circuit.

According to the example illustrated in FIG. 19, the image pickup apparatus performs the moving average processing at reset timing of the counters 804a and 804b. For example, the image pickup apparatus resets the counter 804a before performing AD conversion processing on an analog signal of a pixel in the n-th row. In this case, a digital signal of the preceding row is stored in the counter 804b. Then, each of two counters 804a and 804b starts counting. At the time when the latch pulse is output from the comparator 805, a count value corresponding to the digital signal SDn is stored in the counter 804a and a count value corresponding to a summed-up digital signal SDn+SD(n−1) is stored in the counter 804b. Then, the image pickup apparatus resets only the counter 804b before performing AD conversion processing on an analog signal of a pixel in the next (n+1)th row. Thus, if the image pickup apparatus performs AD conversion processing on an analog signal of a pixel in the (n+1)th row, a count value corresponding to the summed-up digital signal SDn+SD(n+1) can be stored in the counter 804a. On the other hand, a count value corresponding to the digital signal SD(n+1) can be stored in the counter 804b.

As mentioned above, the driving operation performed by the image pickup apparatus illustrated in FIG. 19 includes performing two-series of AD conversion processing on one analog signal to output a plurality of first signals deriving from electric charges stored during the period from the first time to the second time. Further, the image pickup apparatus illustrated in FIG. 19 causes the counters to continue counting without resetting any counter during the AD conversion period for two pixels. Thus, the image pickup apparatus illustrated in FIG. 19 can perform both the AD conversion processing and the digital signal addition processing in parallel.

As mentioned above, in the present exemplary embodiment, the image pickup apparatus performs moving average processing on a plurality of digital signals. Therefore, it is feasible to realize a high-speed driving operation of the image pickup apparatus. Further, performing the moving average processing on digital signals is effective in reducing the influence of analog noises. Therefore, it is feasible to improve the image quality.

The Ninth Embodiment

Figure 20:
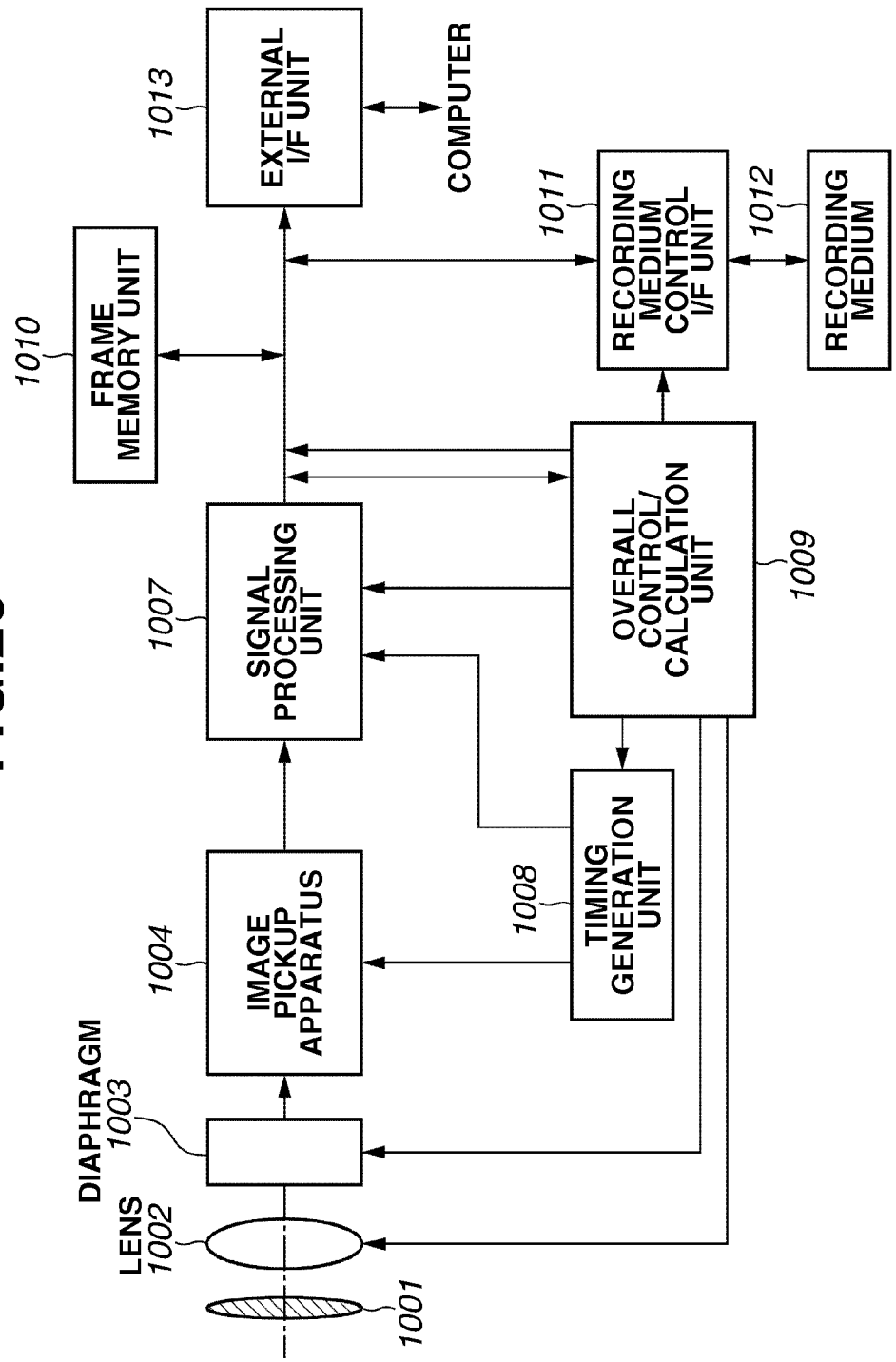
FIG. 20 is a block diagram illustrating an image pickup system according to an exemplary embodiment of the present invention.

An image pickup system according to an exemplary embodiment of the present invention is described below. The image pickup system can be a digital still camera, a digital camcorder, a copying machine, a facsimile machine, a mobile phone, an on-vehicle camera, or an observation satellite. FIG. 20 is a block diagram illustrating a digital still camera, as an example of the image pickup system.

The digital still camera illustrated in FIG. 20 includes a lens protection barrier 1001, a lens 1002 that can form an optical image of a subject on an image pickup apparatus 1004, and a diaphragm 1003 that can adjust the quantity of light having passed through the lens 1002. The image pickup apparatus 1004, which has been described in the above-mentioned exemplary embodiments, converts the optical image formed by the lens 1002 into image data. The image pickup apparatus 1004 includes a semiconductor substrate on which the AD conversion unit is formed. The digital still camera includes a signal processing unit 1007 that can perform various processing, including correction and data compression, on the captured image data output from the image pickup apparatus 1004. Further, the digital still camera illustrated in FIG. 20 includes a timing generation unit 1008 that can output various timing signals to the image pickup apparatus 1004 and the signal processing unit 1007. An overall control unit 1009 controls various operations to be performed by the digital still camera. A frame memory portion 1010 temporarily stores image data. An interface unit 1011 performs recording or reading on a recording medium. A recording medium 1012 is a detachable medium (e.g., a semiconductor memory) that performs recording or reading of captured image data. Further, an interface unit 1013 can communicate with an external computer. In the present exemplary embodiment, the timing signals can be input from an external device provided outside the image pickup system. The image pickup apparatus 1004 and the signal processing unit 1007 that processes captured image signals output from the image pickup apparatus 1004 are essential devices to be provided in the image pickup system.

In the present exemplary embodiment, the image pickup apparatus 1004 and the AD conversion unit are formed on the same semiconductor substrate. However, the image pickup apparatus 1004 and the AD conversion unit can be provided on different semiconductor substrates. Further, the image pickup apparatus 1004 and the signal processing unit 1007 can be formed on the same substrate.

In the present exemplary embodiment, the image pickup apparatus 1004 can be driven according to the driving method described in any one of the first to eighth exemplary embodiments. As mentioned above, the driving method according to any one of the first to eighth exemplary embodiments is applicable to an image pickup system. Applying the exemplary embodiment of the present invention to an image pickup system brings an effect of improving the image quality in addition to the effect of reducing noises that may be caused by high-frequency components (e.g., moire).

The Second Group of the Embodiments

The image quality can be enhanced according to several exemplary embodiments of the present invention by increasing the freedom in selecting a photoelectric conversion unit that is used to reduce noises caused by a high-frequency component.

It is difficult, in a method of mixing an electric charge as disclosed in Japanese Patent Application Laid-Open No. 2006-270658, to reduce aliasing distortion by using a signal transmitted from a plurality of photoelectric conversion units disposed at a distance from one another. For example, multiple CCDs can be employed to mix the electric charge generated in the plurality of photoelectric conversion units disposed at a distance from one another. The use of the multiple CCDs, however, increases a drive voltage. Alternatively, a plurality of semiconductor regions to which the electric charge from the photoelectric conversion unit is transferred can be connected to one another. Such configuration, however, decreases electric charge-voltage conversion efficiency.

The aforementioned technical constraints may be a cause of an insufficient enhancement of the image quality. For example, the aliasing distortion may be reduced insufficiently because the aliasing distortion can be reduced more effectively by using a plurality of photoelectric conversion units disposed over a wider range.

In some cases, a color filter for a different color is disposed in adjacent photoelectric conversion units in an image pickup apparatus. It is preferred in such color image pickup apparatus that the moire be reduced by using a signal from a plurality of photoelectric conversion units of the same color. The photoelectric conversion units of the same color are, however, disposed at a distance from one another, whereby it is required to mix the electric charge generated in the plurality of photoelectric conversion units of the same color that is disposed at a distance from one another. That is, it is difficult in the related art to reduce the moire by using the signal from the plurality of photoelectric conversion units of the same color.

Although making reference to switching between non-addition and addition, Japanese Patent Application Laid-Open No. 2003-009003 discloses the addition performed with a combination of fixed pixels, whereby the image quality may be enhanced insufficiently as described above.

Several exemplary embodiments according to the present invention provides an image pickup apparatus which attains the enhanced image quality by increasing the freedom in selecting the photoelectric conversion unit used to reduce the noises caused by the high-frequency component.

Figure 21A:
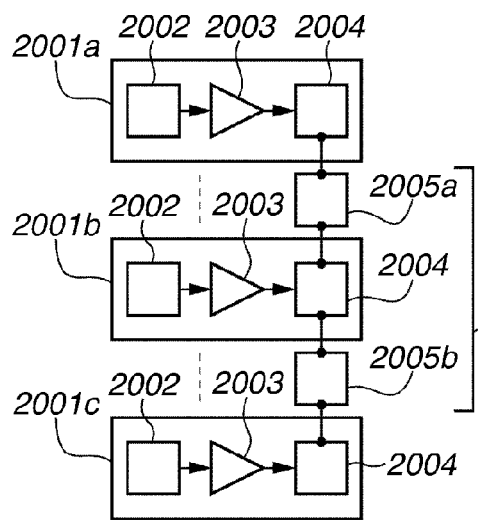
FIGS. 21A to 21D are a set of conceptual diagrams illustrating an exemplary embodiment of the present invention.

A principal part of the present disclosure will be described with reference to FIG. 21A. FIG. 21A is a conceptual diagram illustrating a characteristic portion of the present disclosure. An image pickup apparatus in an exemplary embodiment according to the present invention has a plurality of pixels. Each pixel includes a photoelectric conversion unit 2002, an amplification unit 2003 which outputs a signal that is based on an electric charge generated in the photoelectric conversion unit 2002, and a memory unit 2004 which holds the signal output from the amplification unit. Three pixels 2001a, 2001b, and 2001c are illustrated in FIG. 21A. One or a plurality of pixels may be disposed between the pixel 1a and the pixel 2001b, or the pixel 2001a and the pixel 2001b may adjoin each other. Likewise, one or a plurality of pixels may be disposed between the pixel 2001b and the pixel 2001c, or the pixel 2001b and the pixel 2001c may adjoin each other.

The image pickup apparatus in the exemplary embodiment according to the present invention includes a connecting unit 2005 which connects the memory units 2004 included in the plurality of pixels, with each other. The connecting unit 2005 includes a switch. FIG. 21A illustrates a case where the connecting unit 2005 includes a switch 2005a which connects the memory units 2004 included in the pixel 2001a and the pixel 2001b and a switch 2005b which connects the memory units 2004 included in the pixel 2001b and the pixel 2001c. The memory units 2004 in the plurality of pixels are electrically connected to one another when the switch is turned on. On the other hand, the memory units 2004 in the plurality of pixels are electrically cut off or become non-conductive when the switch is turned off. The switch includes a transistor, for example. Signals held in the plurality of memory units 2004 are added or averaged when the plurality of memory units 2004 are connected to one another.

Figure 21B:
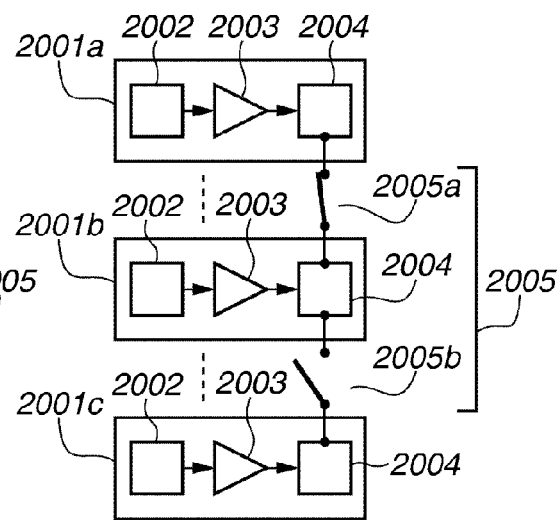
Figure 21C:
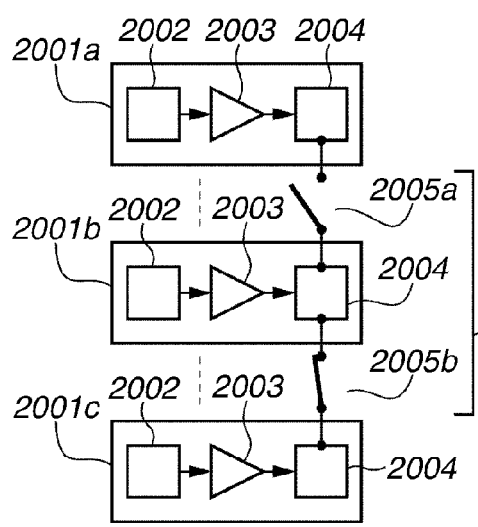

The connecting unit 2005 connects the memory units 2004 included in a different combination of the plurality of pixels, with each other, which will be described with reference to FIGS. 21B and 21C. In FIGS. 21B and 21C, an identical reference numeral is assigned to a member identical to that in FIG. 21A. FIGS. 21B and 21C schematically illustrate a state (on or off) of the switch 2005a and the switch 2005b.

The pixel 2001a and the pixel 2001b make up a first combination of the plurality of pixels. The pixel 2001b and the pixel 2001c make up a second combination of the plurality of pixels different from the first combination. FIG. 21B illustrates a state where the memory units 2004 included in the first combination of the plurality of pixels are connected to each other. Specifically, the switch 2005a is turned on while the switch 2005b is turned off in FIG. 21B so that the memory unit 2004 in the pixel 2001a is electrically connected to the memory unit 2004 in the pixel 2001b. On the other hand, the memory unit 2004 in the pixel 2001c is not connected to the memory units 2004 in the pixel 2001a and the pixel 2001b. FIG. 21C illustrates a state where the memory units 4 included in the second combination of the plurality of pixels are connected to each other. Specifically, the switch 2005a is turned off while the switch 2005b is turn on in FIG. 21C so that the memory unit 2004 in the pixel 2001b is electrically connected to the memory unit 2004 in the pixel 2001c. On the other hand, the memory unit 2004 in the pixel 2001a is not connected to the memory units 2004 in the pixel 2001b and the pixel 2001c.

Here, the pixel 2001a included in the first combination is not included in the second combination, while the pixel 2001c included in the second combination is not included in the first combination. The pixel 2001b is included in both the first and second combinations. In other words, the first combination includes both the pixel included in the second combination and the pixel not included therein, while the second combination includes both the pixel included in the first combination and the pixel not included therein. The connecting unit 2005 mutually connects the memory units 2004 included in the plurality of pixels in these two different combinations.

As heretofore described, the connecting unit 2005 mutually connects the memory units 2004 included in the plurality of pixels in the image pickup apparatus of the exemplary embodiment according to the present invention. The memory units 2004 in the plurality of pixels disposed at a distance from one another can thus be connected easily by providing the switch and wiring at a predetermined position. For example, the connecting unit 2005 can easily connect two pixels of the same color that interpose therebetween a pixel of a different color. The capacitance of the memory unit 2004 is also considered to increase due to the long wiring connecting the pixels at a distance. The memory unit 2004 is, however, disposed in a following stage of the amplification unit 2003 and therefore holds a signal that is amplified by the amplification unit 2003. As a result, a decrease in the signal amplitude can be suppressed, thereby achieving a high signal-to-noise ratio.

The amplification unit 2003 outputs a voltage signal or a current signal that is based on the amount of electric charge generated in the photoelectric conversion unit 2002. The amplification unit 2003 includes a transistor. Specifically, the amplification unit 2003 can be a source follower circuit, a common source circuit, or a differential amplifier circuit. The amplification unit 2003 may also be configured such that a plurality of circuits is in cascade connection.

The memory unit 2004 includes a capacitance, for example. The memory unit 2004 may include one or a plurality of capacitances. The photoelectric conversion unit 2002 can have an increased aperture ratio when the memory unit 2004 includes one capacitance because the scale of the circuit in the pixel is reduced. A combination of the pixels to be connected can be changed in this case as well by selectively turning on the switch as illustrated in FIGS. 21B and 21C.

Figure 21D:
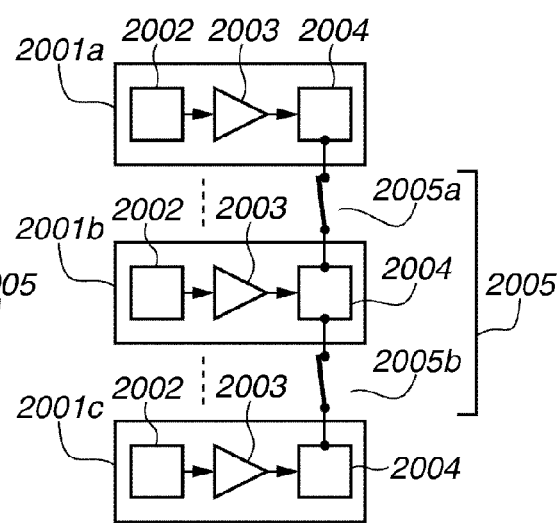

The image pickup apparatus can provide high performance and high image quality when the memory unit 2004 includes a plurality of capacitances because a signal having the same accumulating period can be held in the plurality of capacitances. For example, as illustrated in FIG. 21D, the memory unit 2004 in the pixel 2001b can include two capacitances 2004a and 2004b, in which case both of the capacitances 2004a and 2004b hold a signal that is output from the amplification unit 2003. The capacitance 2004a is connected to the memory unit 2004 in the pixel 2001a via the switch 2005a. The capacitance 2004b is connected to the memory unit 2004 in the pixel 2001c via the switch 2005b. Accordingly, a signal that is the outcome of averaging or adding a signal in the pixel 2001a and a signal in the pixel 2001b obtained in a accumulating period, as well as a signal that is the outcome of averaging or adding a signal in the pixel 2001b and a signal in the pixel 2001c obtained in the same accumulating period can both be obtained. A high-quality image can be obtained as a result compared to when a signal that is the averaged or added outcome of a different combination of signals having a different accumulation time is obtained.

The switch 2005a and the switch 2005b may be turned on simultaneously as illustrated in FIG. 21D, so that the memory unit 2004 in the pixel 2001a is connected to the memory unit 2004 in the pixel 2001b at the same time the memory unit 2004 in the pixel 2001b is connected to the memory unit 2004 in the pixel 2001c. The memory unit 2004 in the pixel 1a is not connected to the memory unit 2004 in the pixel 2001c even when the two switches are turned on simultaneously, because the memory unit 2004 in the pixel 2001b includes the two capacitances 2004a and 2004b where the capacitance 2004a is connected to the switch 2005a and the capacitance 2004b is connected to the switch 2005b. This means that the memory units included in two different combinations of pixels can be connected simultaneously.

Exemplary embodiments of the present invention will now be described. Note that the present invention is not to be limited to the exemplary embodiments described hereinafter. Modified embodiments including modified configuration without departing from the spirit of the present invention are to be included in the present invention as well. Moreover, an example where each element in any of the following exemplary embodiments is added to another exemplary embodiment or replaced by an element in another exemplary embodiment is regarded as a part of the present invention.

The Tenth Embodiment

An exemplary embodiment of an image pickup apparatus according to the present invention will be described. A memory unit in each pixel in the present exemplary embodiment includes a first capacitance and a second capacitance. Within one pixel, the first capacitance is connected to the memory unit in a plurality of pixels included in a first combination, while the second capacitance is connected to the memory unit in a plurality of pixels included in a second combination.

Figure 22:
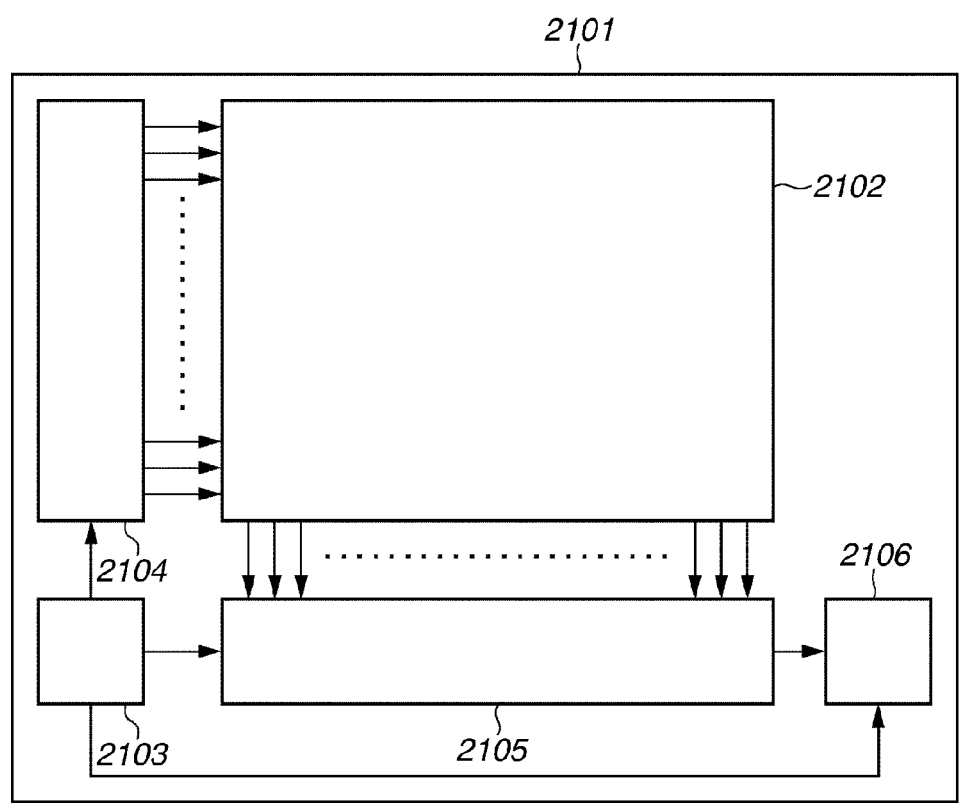
FIG. 22 is a schematic view illustrating a configuration of an image pickup apparatus according to the present invention.

FIG. 22 is an overall block diagram illustrating the image pickup apparatus of the present exemplary embodiment. An image pickup apparatus 2101 can be formed of a single chip while using a semiconductor substrate. The image pickup apparatus 2101 includes a plurality of pixels disposed in an image pickup region 2102. The image pickup apparatus 2101 further includes a control unit 2103. The control unit 2103 supplies a control signal, a power supply voltage and the like to a vertical scanning unit 2104, a signal processing unit 2105, and an output unit 2106.

The vertical scanning unit 104 supplies a drive signal to the plurality of pixels disposed in the image pickup region 2102. The drive signal is typically supplied for every pixel row or a plurality of pixel rows. The vertical scanning unit 2104 can be formed of a shift register or an address decoder.

The signal processing unit 2105 includes a column circuit, a horizontal scanning circuit, and a horizontal output line. The each column circuit includes a plurality of circuit blocks which receives signals from a plurality of pixels included in a pixel row selected by the vertical scanning unit 2104. The each circuit block can be formed of any, all, or a combination of a signal holding unit, an amplification circuit, a noise reduction circuit, and an analog-digital conversion circuit. These circuits may serve to process a digital signal or an analog signal. The horizontal scanning circuit can be formed of a shift register or an address decoder.

The output unit 2106 outputs a signal transmitted through a horizontal output line to the outside of the image pickup apparatus 2101. The output unit 2106 includes a buffer or an amplification circuit.

The vertical scanning unit 2104, the signal processing unit 2105, and the output unit 2106 are disposed outside the image pickup region 2102. That is, a boundary of the image pickup region 2102 is formed between an element included in the pixel and an element included in the vertical scanning unit 2104, the signal processing unit 2105, or the output unit 2106. Alternatively, the boundary of the image pickup region 2102 may be set by a line connecting a photoelectric conversion unit in a pixel disposed on the outermost periphery when the plurality of pixels is disposed in two dimensions.

Figures 23, 23A:
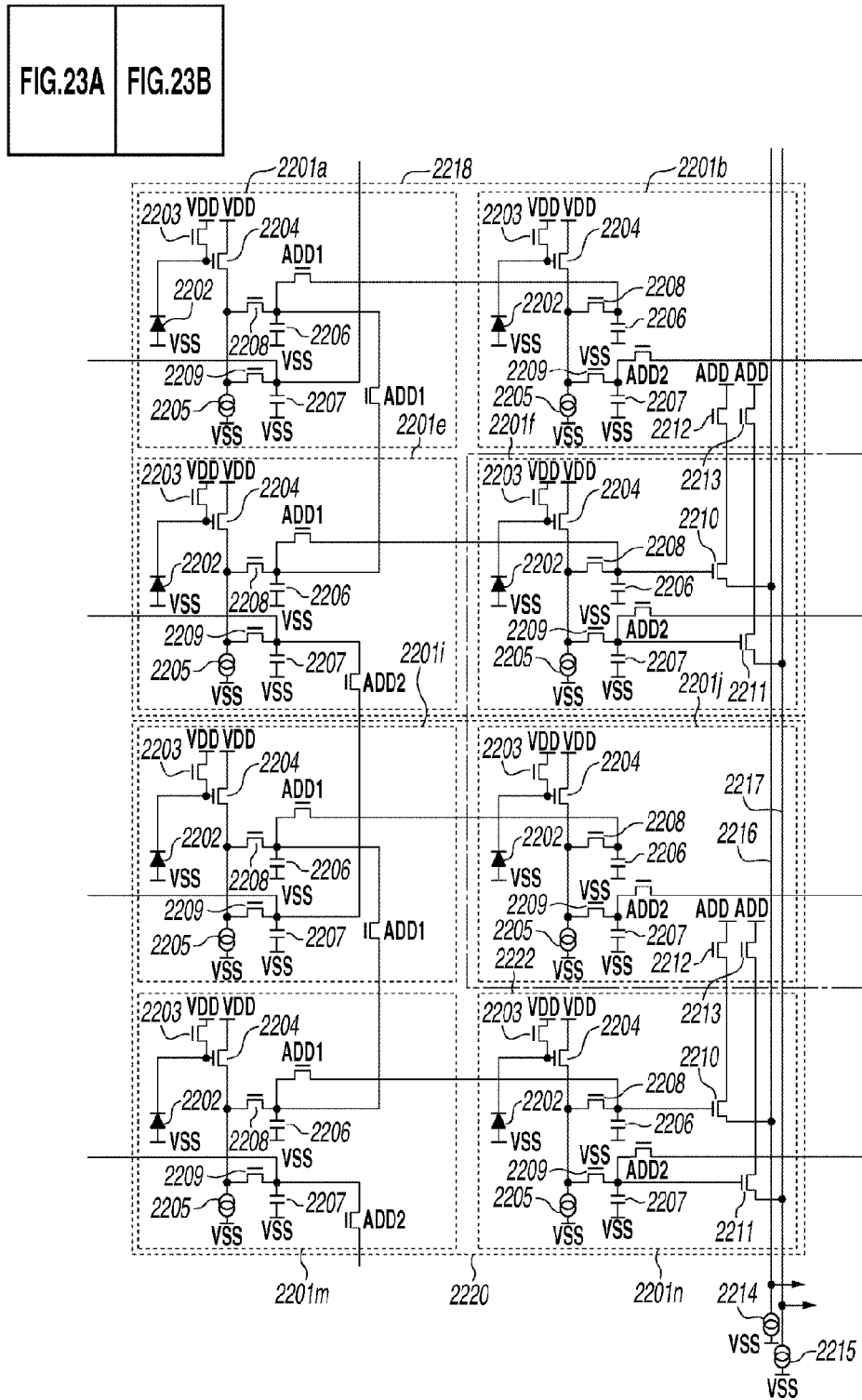
FIG. 23, which is composed of FIGS. 23A and 23B, is an equivalent circuit diagram illustrating an exemplary embodiment of an image pickup apparatus according to the present invention.
Figure 23B:
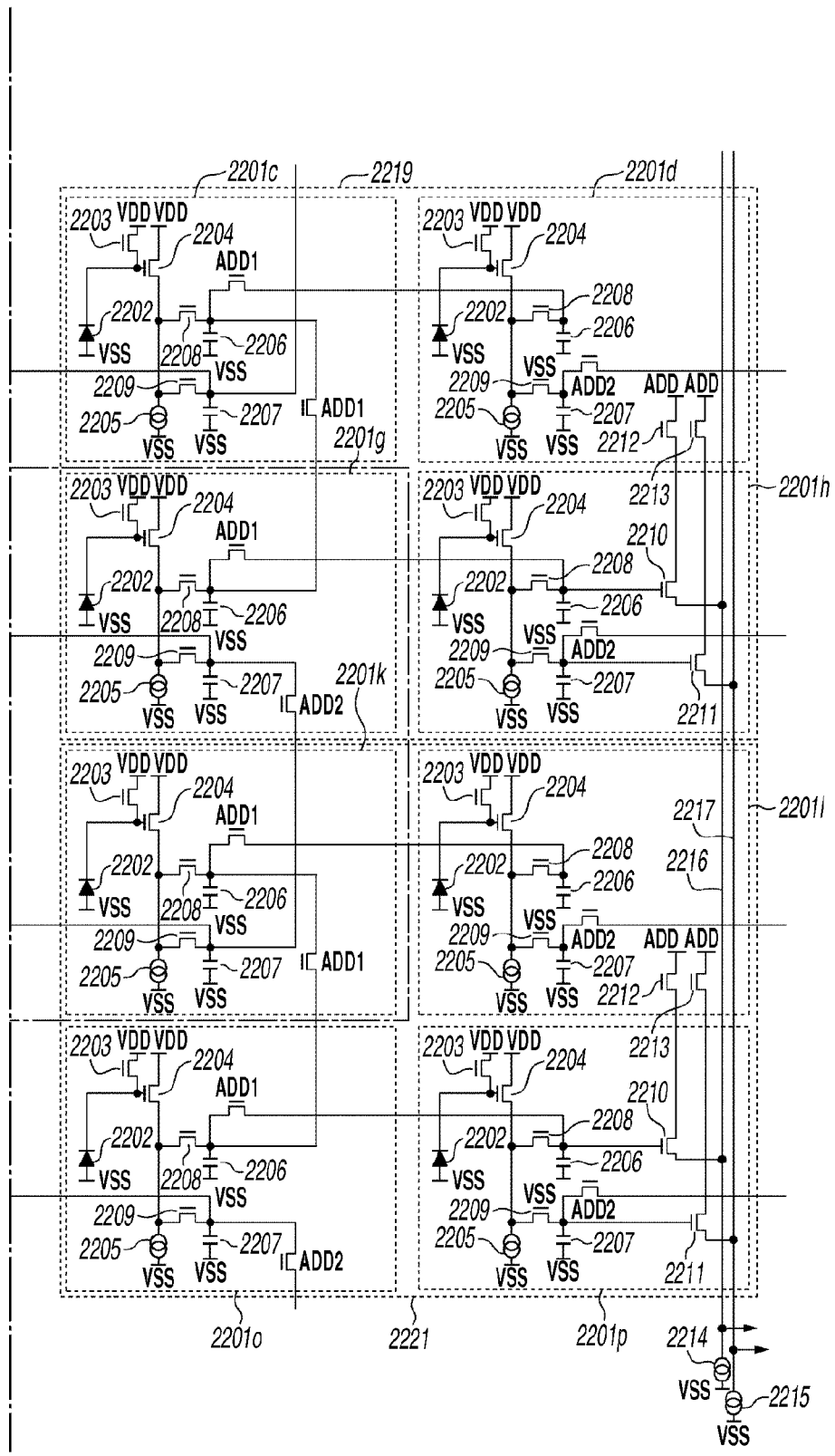

FIG. 23, which is composed of FIGS. 23A and 23B, is an equivalent circuit diagram of the image pickup apparatus according to the present exemplary embodiment. While sixteen pixels 2201 are illustrated in FIG. 23, the image pickup region 2102 may also include a greater number of the pixels 2201. These pixels 2201 are disposed in a matrix in the present exemplary embodiment where the aforementioned sixteen pixels 2201 are disposed in a matrix of four rows and four columns. Note that the plurality of pixels need not be disposed in a matrix but may be disposed one- or two-dimensionally within the image pickup region 2102. The memory units in the plurality of pixels are connected to one another by a connecting unit as illustrated in FIG. 23. Therefore, two pixels adjoining each other in FIG. 23 need not adjoin in the actual device.

As in pixel 2201a, a reference numeral and an alphabet as shown in the figure are combined to distinguish the individual pixel for description. The pixel is simply expressed with a reference numeral as in pixel 2201 when there is no need to particularly distinguish the individual pixel. The same reference numeral is assigned to an element that is included in each of the plurality of pixels 2201 and has a similar function. When the individual element is to be distinguished for description, the individual element is expressed with the reference numeral followed by an alphabet corresponding to the pixel including the element. For example, the element included in the pixel 2201a is expressed with the reference numeral and the alphabet "a" added thereafter.

Pixels 2201a, 2201b, 2201c, and 2201d are included in a first row as illustrated in FIG. 23. Pixels 2201e, 2201f, 2201g, and 2201h are included in a second row next to the first row. Pixels 2201i, 2201j, 2201k, and 2201l are included in a third row, and pixels 2201m, 2201n, 2201o, and 2201p are included in a fourth row. Moreover, the pixels 2201a, 2201e, 2201i, and 2201m are included in a first column. The pixels 2201b, 2201f, 2201j, and 2201n are included in a second column next to the first column. The pixels 2201c, 2201g, 2201k, and 201o are included in a third column, and the pixels 2201d, 2201h, 2201l, and 2201p are included in a fourth column.

In the present exemplary embodiment, signals from four of the pixels 2201 disposed in every two rows and two columns are averaged by the connecting unit. The four pixels 2201 enclosed with each of dashed lines 2218, 2219, 2220, and 2221 correspond to the first combination of the plurality of pixels. The pixels 2201a, 2201b, 2201e, and 2201f form the first combination, for example. The four pixels 2201 enclosed with a dot-dashed line 2222 correspond to the second combination of the plurality of pixels. Note that the pixel 2201 not enclosed with the dot-dashed line 2222 is also included in the second combination together with the pixel not shown. For example, the pixels 2201b and 2201c form the second combination together with two other pixels that are not shown.

In the image pickup apparatus according to the present exemplary embodiment, a signal obtained by averaging the signals from the first combination of the plurality of pixels 2201 and a signal obtained by averaging the signals from the second combination of the plurality of pixels 201 are output to output lines 2216 and 2217, respectively. The signals output to the output lines 2216 and 2217 are then transmitted to the signal processing unit 2105 disposed in the following stage. A centroid of the first combination of the four pixels 2201 and a centroid of the second combination of the four pixels 2201 are shifted by one pixel in both a row direction and a column direction. An image with reduced noises such as a moire caused by a high-frequency component can be obtained as a result by synthesizing these signals by a known method.

Each part of the image pickup apparatus will now be described in detail. The pixel 2201 includes a photoelectric conversion unit 2202, a reset transistor 2203, a first amplification transistor 2204, a current source 2205, a first capacitance 2206, a second capacitance 2207, a first sampling and holding switch (hereinafter referred to as an SH switch) 2208, and a second SH switch 2209. A reference voltage (such as a ground voltage) is supplied to a node VSS while a power supply voltage is supplied to a node VDD as illustrated in FIG. 23.

The photoelectric conversion unit 2202 converts incident light into a signal electric charge (an electron or an electron hole). A photodiode is illustrated as an example of the photoelectric conversion unit 2202. The reset transistor 2203 resets the voltage across the photoelectric conversion unit 2202 and an input node of the first amplification transistor 2204. The first amplification transistor 2204 together with the current source 2205 configures a source follower circuit. A control node of the first amplification transistor 2204 corresponds to an input node of the amplification unit. One of two main nodes of the first amplification transistor 2204 corresponds to an output node of the amplification unit. The amplification unit in the pixel 2201 thus includes the first amplification transistor 204. The output node of the first amplification transistor 204 is connected to the first capacitance 2206 via the first SH switch 2208 so that a signal output from the first amplification transistor 2204 is held in the first capacitance 2206. The output node of the first amplification transistor 2204 is also connected to the second capacitance 2207 via the second SH switch 2209 so that a signal output from the first amplification transistor 2204 is held in the second capacitance 2207. The memory unit in the pixel 2201 includes the first and second capacitances 2206 and 2207 and the first and second SH switches 2208 and 2209.

In the present exemplary embodiment, a second amplification transistor 2210, a third amplification transistor 2211, a first selection transistor 2212, and a second selection transistor 2213 are disposed in one in four of the pixels 2201.

The second amplification transistor 2210 is connected to the output line 2216. The output line 216 is connected to a current source 2214. The second amplification transistor 2210 together with the current source 2214 configures a source follower circuit. The second amplification transistor 2210 outputs an amplified signal to the output line 2216, the amplified signal being based on the signal held in the first capacitance 2206. From among the plurality of second amplification transistors 2210 connected to the single output line 2216, the first selection transistor 2212 selects one that outputs the amplified signal.

The third amplification transistor 2211 is connected to the output line 2217. The output line 2217 is connected to a current source 2215. The third amplification transistor 2211 together with the current source 2215 configures a source follower circuit. The third amplification transistor 2211 outputs an amplified signal to the output line 2217, the amplified signal being based on the signal held in the second capacitance 2207. From among the plurality of third amplification transistors 2211 connected to the single output line 2217, the second selection transistor 2213 selects one that outputs the amplified signal.

Each of the reset transistor 2203, the first to third amplification transistors 2204, 2210, and 2211, the first and second SH switches 2208 and 2209, and the first and second selection transistors 2212 and 2213 in the present exemplary embodiment is a MOS transistor. That is, the control node of the transistor is a gate while the two main nodes of the transistor are a source and a drain. Note that these transistors may be replaced by another type of transistor such as a bipolar transistor.

The current sources 2205, 2214, and 2215 are a part of a current mirror circuit. The current mirror circuit may be adapted such that the three current sources 2205, 2214, and 2215 mirror the current through the same reference transistor.

A control line that is not shown is connected to the control node of each of the reset transistor 2203, the first and second SH switches 2208 and 2209, and the first and second selection transistors 2212 and 2213. The control line is connected to the vertical scanning unit 2104. The vertical scanning unit 2104 supplies, to the control line, a drive signal that drives each of the aforementioned transistors.

The image pickup apparatus according to the present exemplary embodiment includes the connecting unit including a plurality of switches ADD1 (a first switch group) and a plurality of switches ADD2 (a second switch group). The switch ADD1 mutually connects the first capacitances 2206 in two of the pixels 2201, whereas the switch ADD2 mutually connects the second capacitances 2207 in two of the pixels 2201. The voltage held in the two connected capacitances is averaged upon turning on the switch ADD1 or the switch ADD2 when the two capacitances have the same size. When the two capacitances differ in size, on the other hand, the weighted average of the voltage is obtained according to a capacitance ratio. It is preferable that the size of the first capacitance 2206 and the second capacitance 2207 be equal when the switches connected to these capacitances are all turned off. The size of the capacitance may, however, vary according to the variation caused by a manufacturing process. It is preferable that the absolute value of the individual capacitance be large enough so that the variation caused by the manufacturing process can be sufficiently ignored.

A combination of the plurality of pixels 2201 connected by the connecting unit will now be described. The combination of the plurality of pixels 2201, the memory units of which are mutually connected by the connecting unit, is enclosed with a dashed line and a dot-dashed line in FIG. 23. The switch ADD1 mutually connects the memory units included in the first combination of the plurality of pixels 2201. For example, the four pixels 2201a, 2201b, 2201e, and 2201f enclosed with the dashed line 2218 form the first combination of the plurality of pixels. Specifically, the switch ADD1 connects a first capacitance 2206a of the pixel 2201a with a first capacitance 2206b of the pixel 2201b, the first capacitance 2206a of the pixel 2201a with a first capacitance 2206e of the pixel 2201e, and the first capacitance 2206e of the pixel 2201e with a first capacitance 2206f of the pixel 2201f. Note that the switch ADD1 likewise connects the first capacitances 2206 of the four pixels 2201 enclosed with each of the dashed lines 2219, 2220, and 2221.

The switch ADD2 mutually connects the memory units included in the second combination of the plurality of pixels 2201. The four pixels 2201f, 2201g, 2201j, and 2201k enclosed with the dot-dashed line 2222 in FIG. 23 form the second combination of the plurality of pixels. Specifically, the switch ADD2 connects a second capacitance 2207f of the pixel 2201f with a second capacitance 2207g of the pixel 2201g, the second capacitance 2207f of the pixel 2201f with a second capacitance 2207j of the pixel 2201j, and the second capacitance 2207j of the pixel 2201j with a second capacitance 2207k of the pixel 2201k.

As described above, the memory units included in the different combinations of the plurality of pixels 2201 are connected by the plurality of switches ADD1 and the plurality of switches ADD2 in the present exemplary embodiment. The signals from the first combination of the plurality of pixels 2201 are thus averaged by the switch ADD1 to be output to the output line 2216, while the signals from the second combination of the plurality of pixels 2201 are averaged by the switch ADD2 to be output to the output line 2217.

The switches ADD1 and ADD2 are MOS transistors, for example. The control line is connected to a gate of each of the transistors. The control line is connected to the vertical scanning unit 2104. The vertical scanning unit 2104 supplies, to the control line, a drive signal which controls a state (on or off) of the switches ADD1 and ADD2. That is, in the present exemplary embodiment, the vertical scanning unit 2104 and the control unit 2103 which controls the vertical scanning unit 2104 control the connecting unit. Specifically, the control unit 2103 and the vertical scanning unit 2104 perform control to turn on the plurality of switches ADD1 in order to mutually connect the memory units included in the first combination of the plurality of pixels 2201. Likewise, the control unit 2103 and the vertical scanning unit 2104 perform control to turn on the plurality of switches ADD2 in order to mutually connect the memory units included in the second combination of the plurality of pixels 2201.

The control unit controlling the connecting unit may be disposed in a separate chip from the chip on which the plurality of pixels 2201 is disposed. The control unit disposed in the separate chip outputs a first control signal which controls the connecting unit such that the memory units included in the first combination of the plurality of pixels 2201 are connected to one another. Moreover, the control unit disposed in the separate chip outputs a second control signal which controls the connecting unit such that the memory units included in the second combination of the plurality of pixels 2201 are connected to one another.

Figure 24A:
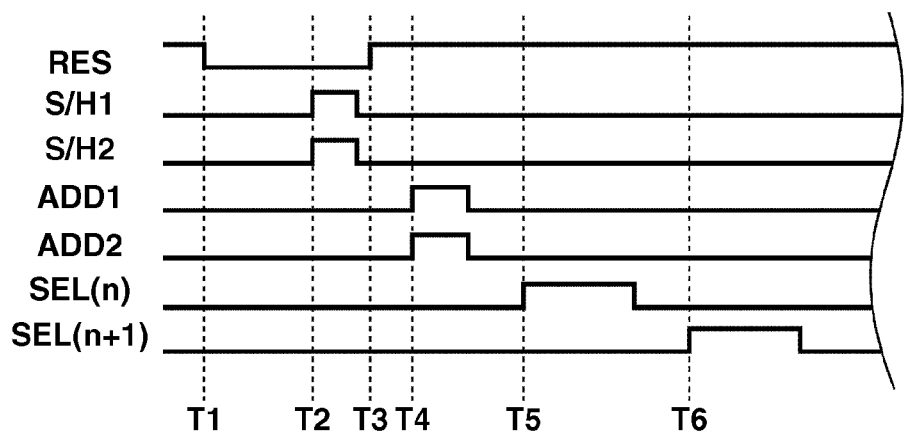
FIGS. 24A and 24B are a set of diagrams illustrating a drive pulse in an exemplary embodiment of an image pickup apparatus according to the present invention.
Figure 24B:
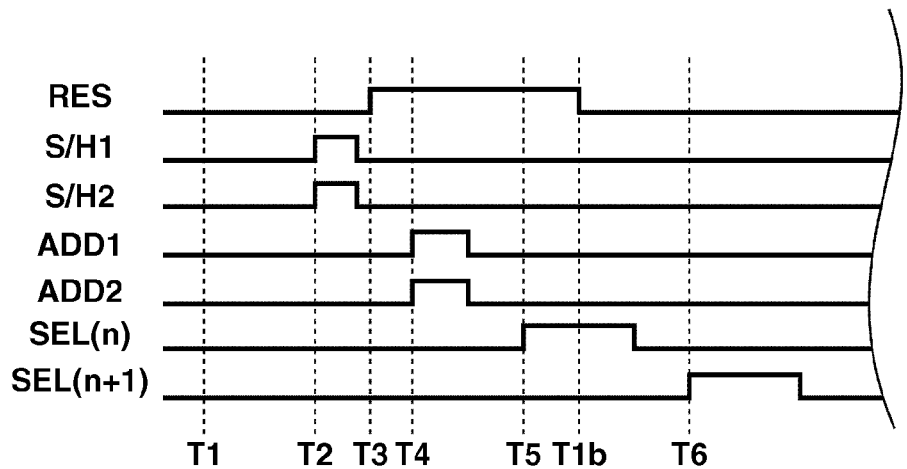

Now, an operation of the image pickup apparatus according to the present exemplary embodiment will be described. FIGS. 24A and 24B are a set of timing charts of a drive signal. A drive signal RES is supplied to a control line connected to the reset transistor 2203. A drive signal S/H1 is supplied to a control line connected to the first SH switch 2208. A drive signal S/H2 is supplied to a control line connected to the second SH switch 2209. A drive signal ADD1 is supplied to a control line connected to the switch ADD1. A drive signal ADD2 is supplied to a control line connected to the switch ADD2. A drive signal SEL is supplied to a control line connected to the first selection transistor 2212 as well as a control line connected to the second selection transistor 2213.

In the present exemplary embodiment, the drive signal RES, the drive signal S/H1, the drive signal S/H2, the drive signal ADD1, and the drive signal ADD2 are supplied to all the pixels synchronously. A drive signal SEL(n) and a drive signal SEL(n+1) are supplied to a control line of the selection transistor disposed in a different row.

The drive signal can take at least two values, namely, a high-level signal and a low-level signal. The transistor or the switch is turned on when the high-level drive signal is supplied, whereas the transistor or the switch is turned off when the low-level drive signal is supplied.

A first operation example will be described with reference to FIG. 24A. The drive signal RES is at a high level while all the other drive signals are at a low level prior to time T1 in FIG. 24A. A reset voltage is supplied to the photoelectric conversion unit 2202 because the reset transistor 203 is turned on. At this time, the first amplification transistor 204 outputs a signal corresponding to the photoelectric conversion unit 2202 in a reset state.

At time T1, the drive signal RES transitions from the high level to a low level, whereby the reset transistor 203 is turned off. An electric charge starts accumulating in the photoelectric conversion unit 2202 once the reset transistor 2203 has been turned off. This means that an exposure period begins at time T1. The first amplification transistor 2204 outputs a signal according to the amount of electric charge generated in the photoelectric conversion unit 2202 during the exposure period.

At time T2, the drive signals S/H1 and S/H2 transition from the low level to a high level, whereby the first and second SH switches 2208 and 2209 are turned on. The signal corresponding to the amount of electric charge generated in the photoelectric conversion unit 2202 is sampled into both the first and second capacitances 2206 and 2207. The drive signals S/H1 and S/H2 transition from the high level into the low level after a predetermined time has elapsed since time T2. As a result, the signal corresponding to the amount of electric charge generated in the photoelectric conversion unit 2202 is held in both the first and second capacitances 2206 and 2207. The exposure period may be completed at a point when the first SH switch 2208 and the second SH switch 2209 have been turned off.

At time T3, the drive signal RES transitions from the low level into the high level, whereby the reset transistor 2203 is turned on. The electric charge accumulated in the photoelectric conversion unit 2202 is discharged once the reset transistor 2203 has been turned on. Note that the reset transistor 2203 need not be turned on at time T3 as long as it is turned on before a next exposure period begins.

At time T4, the drive signals ADD1 and ADD2 transition from the low level into the high level, whereby the switches ADD1 and ADD2 are turned on. The signals from the first combination of the plurality of pixels 2201 held in the first capacitance 2206 are averaged once the switch ADD1 has been turned on. Likewise, the signals from the second combination of the plurality of pixels 2201 held in the second capacitance 2207 are averaged once the switch ADD2 has been turned on.

The averaged signal is successively read out thereafter. At time T5, the drive signal SEL(n) transitions from the low level into the high level, whereby the first and second selection transistors 2212 and 2213 to which the drive signal SEL(n) is supplied are turned on. For example, first and second selection transistors 2212$b$ and 2213$b$ included in the pixel 2201$b$ as well as first and second selection transistors 2212$d$ and 2213$d$ included in the pixel 2201$d$ are turned on. The second amplification transistor 2210 and the third amplification transistor 2211 corresponding to the selection transistors that have been turned on thereafter amplify the averaged signals and output them to the output lines 2216 and 2217, respectively. The signal that has been output to each of the output lines 2216 and 2217 is transmitted to the signal processing unit 2105 and subjected to predetermined signal processing. The drive signal SEL(n) transitions from the high level into the low level after a predetermined time has elapsed since time T5.

At time T6, the drive signal SEL(n+1) transitions from the low level into the high level, whereby a selection transistor different from the selection transistor that has been turned on at time T5 is turned on. For example, first and second selection transistors 2212$j$ and 2213$j$ included in the pixel 2201$j$ as well as first and second selection transistors 2212$l$ and 2213$l$ included in the pixel 2201$l$ are turned on. The second amplification transistor 2210 and the third amplification transistor 2211 corresponding to the selection transistors that have been turned on thereafter amplify the averaged signals and output them to the output lines 2216 and 2217, respectively.

As a result of the aforementioned operation, the memory units included in the different combinations of the plurality of pixels 2201 are connected by the plurality of switches ADD1 and the plurality of switches ADD2. The signals from the first combination of the plurality of pixels 2201 are then averaged by the switch ADD1 and output to the output line 2216. Likewise, the signals from the second combination of the plurality of pixels 2201 are averaged by the switch ADD2 and output to the output line 2217.

Note that the next exposure period may begin while the averaged signal is being read. A second operation example will be described with reference to FIG. 24B. At time T1$b$, the drive signal RES transitions from the high level into the low level as illustrated in FIG. 24B. The next exposure period begins from this time point. The exposure period begins while the signal is being read, thereby allowing a frame rate to be set high.

As described above, the pixel 2201 in the image pickup apparatus according to the present exemplary embodiment includes the first amplification transistor 2204 as well as the first and second capacitances 2206 and 2207 which hold the amplified signal that is output from the first amplification transistor 2204. The image pickup apparatus according to the present exemplary embodiment includes the switches ADD1 and ADD2 which connect the memory units included in the different combinations of the plurality of pixels 2201. This configuration allows for the increased freedom in selecting the plurality of pixels 2201, the signals from which are to be averaged. The image quality can be enhanced as a result.

The memory unit included in the pixel 2201 according to the present exemplary embodiment includes the first capacitance 2206 and the second capacitance 2207, so that the signal based on the electric charge that is accumulated in the same exposure period can be held in the two capacitances. Therefore, the signals used in the averaging operation from the first combination of the pixels and the signals used in the averaging operation from the second combination of the pixels are both based on the electric charge obtained in the same accumulating period. As a result, the deterioration in the image quality can be suppressed when synthesizing both of the signals.

Furthermore, the memory unit in the single pixel 2201 includes the plurality of capacitances. The switch ADD1 exclusively connects the first capacitances 206 in the plurality of pixels 2201 while the switch ADD2 exclusively connects the second capacitances 2207 in the plurality of pixels 2201. As a result, the memory units included in the different combinations of the plurality of pixels can be connected to one another even when the switch ADD1 is driven in synchronization with the switch ADD2. Here, the amount of wiring can be cut down by making the switch ADD1 and the switch ADD2 use a common control line, for example.

All the pixels are driven synchronously in the operation of the image pickup apparatus according to the present exemplary embodiment. That is, the image pickup apparatus performs a global electronic shutter operation in which the exposure period coincides in all the pixels. By adopting such configuration, the distortion in a fast-moving object can be reduced, thereby enhancing the image quality.

Moreover, in the operation of the image pickup apparatus according to the present exemplary embodiment, the first and second SH switches 2208 and 2209 are operated at the substantially same timing, in which case the control nodes of the first and second SH switches 2208 and 2209 may be connected to each other. The number of the control lines can therefore be decreased by adopting such configuration.

Moreover, the present exemplary embodiment adopts what is called a moving average. In the second column of the matrix, for example, a signal (a first signal) is obtained by averaging the signal from the pixel 2201$b$ and the signal from the pixel 2201$f$. A signal (a second signal) is obtained by averaging the signal from the pixel 2201$f$ and the signal from the pixel 2201$j$. A signal (a third signal) is obtained by averaging the signal from the pixel 2201$j$ and the signal from the pixel 2201$n$. A pitch of an optical center of the first signal, the second signal, and the third signal in a direction along which the four pixels in the second column are aligned corresponds with a pitch of the four pixels in the second column. That is, the signals from the pixels in four different combinations are averaged such that the optical center of the averaged signal is aligned with the pitch identical to that of the pixel arrangement. From another viewpoint, a pitch of the optical center of a signal group prior to averaging, namely a signal group from the pixels, is equal to a pitch of the optical center of a signal group after the averaging. This kind of averaging a signal group is called the moving average. Accordingly, an image with reduced noises such as a moire that are caused by a high-frequency component can be obtained even when signal processing such as synthesizing is omitted.

The Eleventh Embodiment

Another exemplary embodiment of an image pickup apparatus according to the present invention will now be described. The present exemplary embodiment differs from the Tenth Embodiment in that a color filter is provided in a pixel. The present exemplary embodiment is similar to the Tenth Embodiment except for a part that is described specifically.

Figures 25A, 25B:
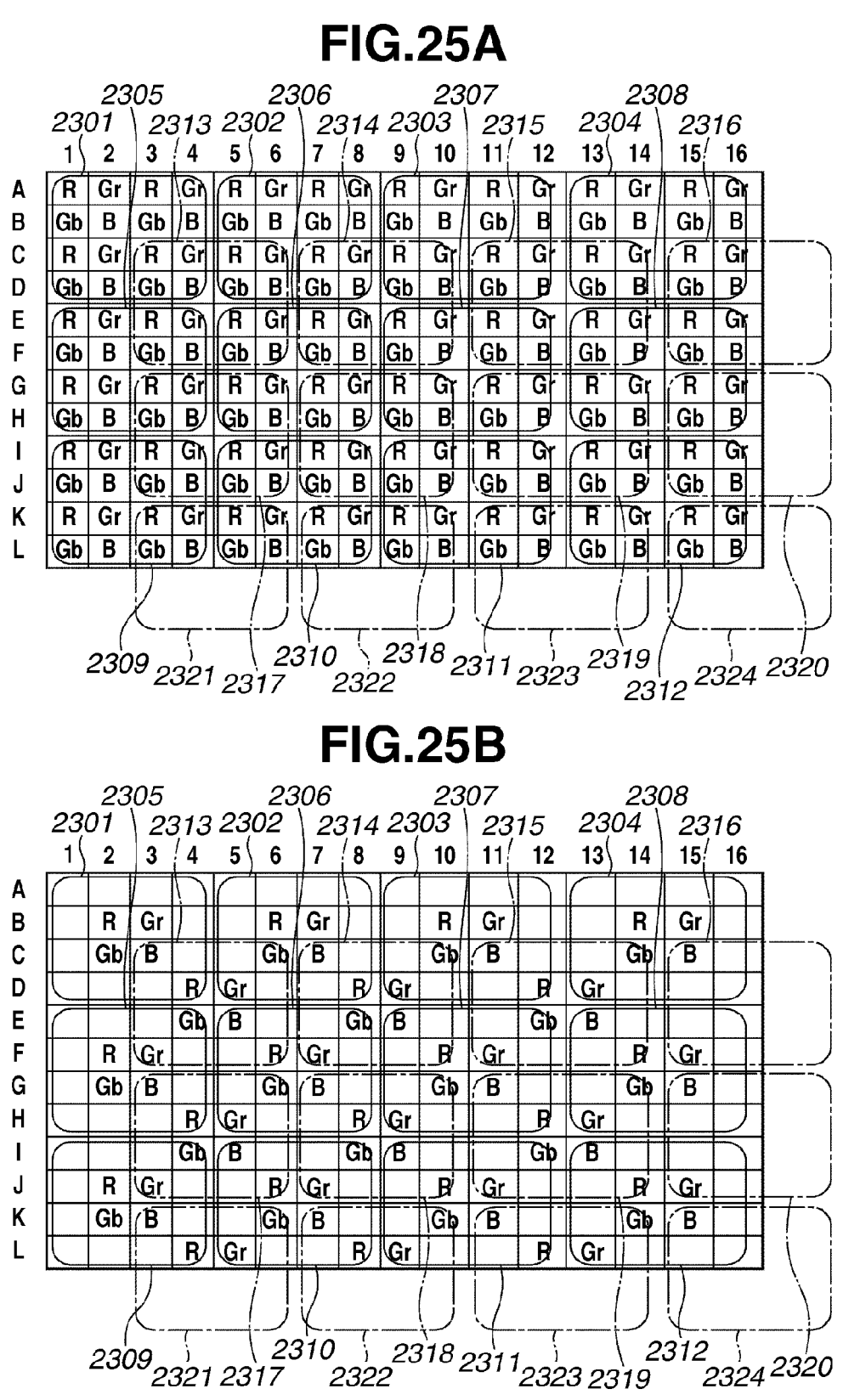

FIG. 25A is a diagram schematically illustrating a plurality of pixels included in the image pickup apparatus according to the present exemplary embodiment. Each small quadrangle schematically represents a region in which a single pixel is disposed within the image pickup region 2102 illustrated in FIG. 22. The group of elements illustrated as the elements included in one pixel 201 in the circuit diagram in FIG. 23 can be disposed within this single quadrangle.

A pixel location is labeled by a combination of an alphabet indicating a row and a number indicating a column since a number of pixels are disposed in FIGS. 25A and 25B. The same alphabet is assigned to pixels disposed in the same single row. Specifically, the alphabet A is assigned to the uppermost row in FIGS. 25A and 25B. Subsequently, the alphabet is assigned in order such as B for the second row from the top and C for the third row. On the other hand, the same number is assigned to pixels disposed in the same single column. The number 1 is assigned to the leftmost column in FIGS. 25A and 25B. Subsequently, the number is assigned in order such as 2 for the second column from the left and 3 for the third column. A pixel located in the fifth row from the top and the second column from the left in FIGS. 25A and 25B is labeled as a pixel F2, for example.

While a pixel is schematically illustrated as a quadrangle in FIGS. 25A and 25B, a single pixel region need not be a quadrangle. In addition, FIGS. 25A and 25B illustrate an example where the plurality of pixels is disposed in a square lattice, which is not required as long as the plurality of pixels is periodically disposed in two dimensions.

The image pickup apparatus according to the present exemplary embodiment includes the color filter for three different colors. FIG. 25A illustrates the color of the color filter disposed in each pixel. A letter R indicates that the color filter for a color in a first wavelength range such as red is disposed. Letters Gr and Gb indicate that the color filter for a color in a second wavelength range such as green is disposed. A letter B indicates that the color filter for a color in a third wavelength range such as blue is disposed. While the image pickup apparatus according to the present exemplary embodiment includes the color filter in what is called a Bayer pattern, the color filter for at least two colors or more may be disposed without necessarily adopting the Bayer pattern.

As illustrated in FIG. 25A, solid lines 2301 to 2312 as well as dot-dashed lines 2313 to 2324 indicate a combination of pixels each including a memory unit connected by a connecting unit. From among the plurality of pixels enclosed with the solid line or the dot-dashed line, the connecting unit according to the present exemplary embodiment mutually connects the memory units in the plurality of pixels in which the color filter for the same color is disposed.

Sixteen pixels enclosed with the solid line 2301 will be described as an example. A red color filter is disposed in a pixel A1, a pixel A3, a pixel C1, and a pixel C3, whereby the connecting unit mutually connects the memory units included in the pixel A1, the pixel A3, the pixel C1, and the pixel C3. This means that four signals held in the respective memory units included in the pixel A1, the pixel A3, the pixel C1, and the pixel C3 are averaged.

A green color filter is disposed in a pixel A2, a pixel A4, a pixel C2, and a pixel C4, whereby the connecting unit mutually connects the memory units included in the pixel A2, the pixel A4, the pixel C2, and the pixel C4. This means that four signals held in the respective memory units included in the pixel A2, the pixel A4, the pixel C2, and the pixel C4 are averaged. Moreover, a green color filter is disposed in a pixel B1, a pixel B3, a pixel D1, and a pixel D3, whereby the connecting unit mutually connects the memory units included in the pixel B1, the pixel B3, the pixel D1, and the pixel D3. This means that four signals held in the respective memory units included in the pixel B1, the pixel B3, the pixel D1, and the pixel D3 are averaged. Here, the green color filter is disposed in each of the pixel indicated by Gr and the pixel indicated by Gb. As described above, however, the signals from these pixels are averaged separately as different combinations.

A blue color filter is disposed in a pixel B2, a pixel B4, a pixel D2, and a pixel D4, whereby the connecting unit mutually connects the memory units included in the pixel B2, the pixel B4, the pixel D2, and the pixel D4. This means that four signals held in the respective memory units included in the pixel B2, the pixel B4, the pixel D2, and the pixel D4 are averaged.

The memory units included in the pixels of the same color are connected to one another as well in another sixteen pixels enclosed with any of the other solid lines 2302 to 2312 and the dot-dashed lines 313 to 324. Note that the dot-dashed lines 2316 and 2320 to 2324 in FIGS. 25A and 25B enclose less than sixteen pixels. In practice, however, the memory units included in the plurality of pixels including pixels not shown can be connected.

In the present exemplary embodiment, the plurality of pixels enclosed with each of the solid lines 2301 to 2312 forms a first combination. On the other hand, the plurality of pixels enclosed with each of the dot-dashed lines 2313 to 2324 forms a second combination. For example, the four signals from the pixel A1, the pixel A3, the pixel C1, and the pixel C3 enclosed with the solid line 2301 are averaged. On the other hand, four signals from the pixel C3, a pixel C5, a pixel E3, and a pixel E5 enclosed with the dot-dashed line 2313 are averaged.

The circuit arrangement of these pixels is similar to what has been described in the Tenth Embodiment. Specifically, the pixel A1, the pixel A3, the pixel C1, and the pixel C3 in FIGS. 25A and 25B are the same as the pixel 2201*a*, the pixel 2201*b*, the pixel 2201*e*, and the pixel 2201*f* illustrated in FIG. 23, respectively. The pixel C3, the pixel C5, the pixel E3, and the pixel E5 in FIGS. 25A and 25B are the same as the pixel 2201*f*, the pixel 2201*g*, the pixel 2201*j*, and the pixel 2201*k* illustrated in FIG. 23, respectively.

While the pixel 2201*a* and the pixel 2201*b* adjoin in FIG. 23, another pixel that is not connected to the pixels 2201*a* and 2201*b* can be disposed therebetween since the image pickup apparatus of the exemplary embodiment according to the present invention has the connecting unit which includes the switch and the wiring. That is, the memory units in the two pixels with the other pixel interposing therebetween can be easily connected. As a result, the memory units included in the plurality of pixels of the same color can be connected even when the color filters for different colors are disposed in the adjoining pixels as in the Bayer pattern.

FIG. 25B illustrates the optical center of the averaged signal. The pixel corresponding to the location of the optical center of the averaged signal is indicated by R, Gb, Gr, or B in FIG. 25B. For example, the optical center of the signal obtained by averaging the signals from the pixel A1, the pixel A3, the pixel C1, and the pixel C3 in FIG. 25A is located in the pixel B2 region, thereby allowing the averaged signal to be treated as the signal from the pixel B2. The noises such as a moire caused by the high-frequency component can therefore be reduced by synthesizing the averaged signal from the first combination and the averaged signal from the second combination. Moreover, the averaged signal has a reduced mixture of colors because the signals from the pixels having the same color are averaged in the present exemplary embodiment. The image with reduced noises can be obtained as a result.

The image pickup apparatus according to the present exemplary embodiment includes the color filter for the plurality of colors as described above. The connecting unit connects the memory units included in the first combination and the second combination of the plurality of pixels having the same color. As a result, the noises such as a moire caused by the high-frequency component can be reduced while reducing the mixture of colors.

The Twelfth Embodiment

Another exemplary embodiment of an image pickup apparatus according to the present invention will now be described. A combination of pixels connected by a connecting unit in the present exemplary embodiment is different from the Tenth and Eleventh Embodiments. The present exemplary embodiment is similar to the Tenth or Eleventh Embodiment except for a part that is specifically described.

FIG. 26A schematically illustrates a plurality of pixels included in the image pickup apparatus according to the present exemplary embodiment. The location of each pixel is marked in the same manner as that in FIGS. 25A and 25B. A color filter is disposed in the pixel in the present exemplary embodiment.

In the present exemplary embodiment, a memory unit included in one pixel is connected with memory units included in four different combinations of pixels each including the one pixel. A solid line 2401, a dashed line 2402, a dot-dashed line 2403, and a two-dot dashed line 2404 respectively enclose the four combinations.

A pixel C3 will be specifically described as an example. A red color filter is disposed in the pixel C3. The memory units in four pixels forming a first combination are connected, the pixels including a pixel A1, a pixel A3, a pixel C1, and the pixel C3. The memory units in four pixels forming a second combination are connected, the pixels including the pixel A3, a pixel A5, the pixel C3, and a pixel C5. The memory units in four pixels forming a third combination are connected, the pixels including the pixel C1, the pixel C3, a pixel E1, and a pixel E3. The memory units in four pixels forming a fourth combination are connected, the pixels including the pixel C3, the pixel C5, the pixel E3, and a pixel E5.

With regards to a pixel in which a color filter for another color is disposed, a memory unit included in the pixel is connected with memory units included in four different combinations of pixels including the pixel.

Each memory unit included in one pixel may include four capacitances in order to perform such connection. In this case, each capacitance is connected to the memory unit included in the different combination of the plurality of pixels. The memory unit in the pixel C3 including first to fourth capacitances will be specifically described as an example. The connecting unit includes a group of switches ADD1 (a first switch group) to connect the first capacitance with the memory unit included in each of the pixel A1, the pixel A3, and the pixel C1. The connecting unit further includes a group of switches ADD2 (a second switch group) to connect the second capacitance with the memory unit included in each of the pixel A3, the pixel A5, and the pixel C5. The connecting unit further includes a group of switches ADD3 (a third switch group) to connect the third capacitance with the memory unit included in each of the pixel C1, the pixel E1, and the pixel E3. The connecting unit further includes a group of switches ADD4 (a fourth switch group) to connect the fourth capacitance with the memory unit included in each of the pixel C5, the pixel E3, and the pixel E5.

Here, the memory unit may include three capacitances or less as a variation of the present exemplary embodiment. In this case, signals having different accumulating periods are averaged among different combinations of the plurality of pixels. The aperture of a photoelectric conversion unit can be made large by including a less number of capacitances, thereby achieving the enhanced sensitivity.

FIG. 26B illustrates an optical center of an averaged signal according to the present exemplary embodiment. The pixel corresponding to the location of the optical center of the averaged signal is indicated by R, Gb, Gr, or B in FIG. 26B. For example, the optical center of the signal obtained by averaging the signals from the pixel A1, the pixel A3, the pixel C1, and the pixel C3 in FIG. 26A is located in the pixel B2 region.

The memory unit in the present exemplary embodiment is connected in four different combinations, whereby the location of the optical center of the averaged signal obtained by each combination is different. Accordingly, more averaged signals can be obtained by connecting the memory unit in the greater number of combinations. An image having a high resolution can be obtained as a result.

The present exemplary embodiment adopts what is called a moving average. That is, the signals from the pixels in four different combinations are averaged such that the optical center of the averaged signal is aligned with the pitch identical to that of the pixel arrangement. From another viewpoint, a pitch of the optical center of a signal group prior to averaging, namely a signal group from the pixels, is equal to a pitch of the optical center of a signal group after the averaging. Accordingly, an image with reduced noises such as a moire that are caused by a high-frequency component can be obtained even when signal processing such as synthesizing is omitted.

In addition to the effects obtained in the Tenth and/or Eleventh Embodiments, the high-resolution image can be obtained in the present exemplary embodiment as described above.

The Thirteenth Embodiment

Another exemplary embodiment of an image pickup apparatus according to the present invention will now be described. The present exemplary embodiment is an example where a combination of pixels connected by a connecting unit is modified from what has been described in the Tenth through Twelfth Embodiments. The present exemplary embodiment is similar to at least one of Tenth through Twelfth Embodiments except for a part that is specifically described.

Figure 27:
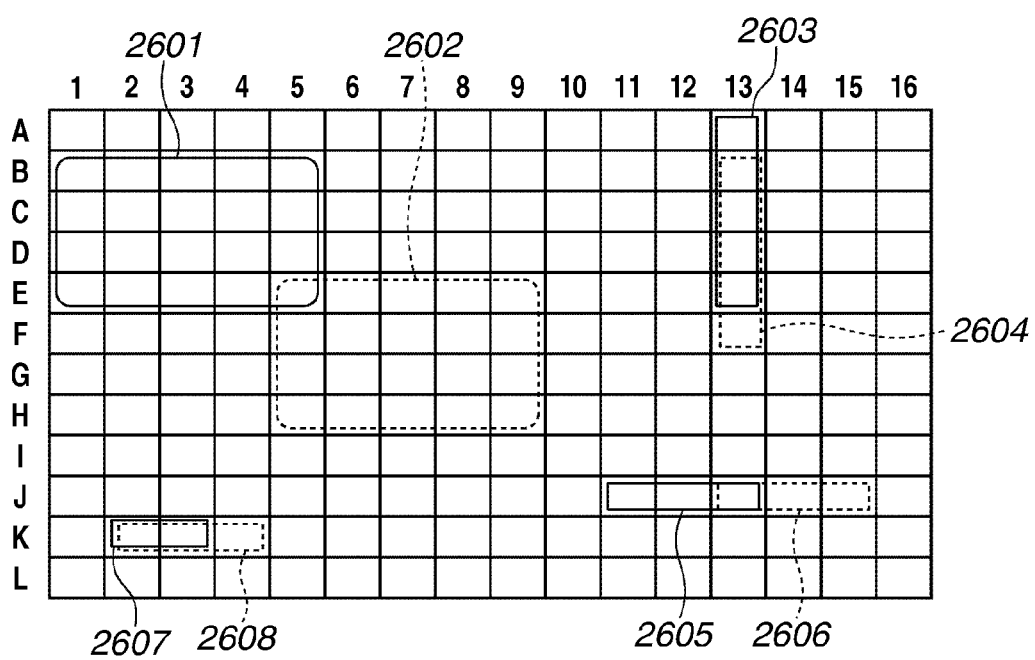
FIG. 27 is a schematic view illustrating an image pickup region in an exemplary embodiment of an image pickup apparatus according to the present invention.

FIG. 27 is a diagram schematically illustrating a plurality of pixels included in the image pickup apparatus according to the present exemplary embodiment. The location of each pixel is marked in the same manner as that in FIGS. 25A to 26B. The pixel in the present exemplary embodiment may include a color filter or may be black and white.

In the present exemplary embodiment, a plurality of pixels enclosed with a solid line 2601 is included in a first combination of pixels. A plurality of pixels enclosed with a dashed line 2602 is included in a second combination of pixels. Specifically, memory units in a pixel B1, a pixel B5, a pixel E1, and a pixel E5 that are included in the first combination are connected to one another. The memory units in the pixel E5, a pixel E9, a pixel H5, and a pixel H9 that are included in the second combination are connected to one another.

Among the two different combinations included in the present exemplary embodiment, the first combination includes: a pixel disposed in an (n−a) th row and an (m−b) th column; a pixel disposed in the (n−a)th row and an m-th column; a pixel disposed in an n-th row and the (m−b)th column; and a pixel disposed in the n-th row and the m-th column. The second combination includes: a pixel disposed in the n-th row and the m-th column; a pixel disposed in the n-th row and an (m+b) th column; a pixel disposed in an (n+a)th row and the m-th column; and a pixel disposed in the (n+a)th row and the (m+b)th column. Each of n, m, a, and b represents an integer. The combination of pixels enclosed with a solid line 2601 and a dashed line 2602 in FIG. 27 is realized when (a, b)=(3, 4). Each of the letters n and m indicates the location of a reference pixel. When a pixel A1 is disposed in a first row and a first column, for example, the combination of pixels enclosed with the solid line 601 and the dashed line 2602 in FIG. 27 is realized in a case where (n, m)=(5, 5).

The integers take the values (a, b, n, m)=(1, 1, 2, 2) when the first combination of the plurality of pixels 2201 is enclosed with the dashed line 2218 and the second combination of the plurality of pixels 2201 is enclosed with the dot-dashed line 2222 as illustrated in FIG. 23. On the other hand, the integers take the values (a, b, n, m)=(−1, −1, 2, 3) when the first combination of the plurality of pixels 2201 is enclosed with the dashed line 2219 and the second combination of the plurality of pixels 2201 is enclosed with the dot-dashed line 2222.

A case is considered where the first combination of the plurality of pixels 2201 is enclosed with the solid line 2302 and the second combination of the plurality of pixels 2201 is enclosed with the dot-dashed line 2314 as illustrated in FIGS. 25A and 25B. Here, the pixel including the red color filter is disposed where (a, b, n, m)=(2, 2, 3, 7), while the pixel including the blue color filter is disposed where (a, b, n, m)=(2, 2, 4, 8).

The connecting unit may connect only the memory units in the plurality of pixels that is aligned in one direction as indicated by a solid line 2603 and a dashed line 2604, or a solid line 2605 and a dashed line 2606 in FIG. 27. Moreover, the memory units in three or more of the pixels aligned in one direction may be connected. Furthermore, the first combination and the second combination may be provided such that all the pixels included in one combination are included in another combination as indicated by a solid line 2607 and a dashed line 2608.

Specifically, the memory units included in a pixel A13, a pixel B13, a pixel C13, a pixel D13, and a pixel E13 as the first combination of pixels may be connected to one another. Likewise, the memory units included in a pixel B13, a pixel C13, a pixel D13, a pixel E13, and a pixel F13 as the second combination of pixels may be connected to one another.

The connecting unit according to the present exemplary embodiment electrically connects the memory units included in the plurality of pixels that is disposed relatively far from one another, as described above. As a result, the noises such as a moire that are caused by the high-frequency component can be reduced.

The Fourteenth Embodiment

Another exemplary embodiment of an image pickup apparatus according to the present invention will now be described. In the present exemplary embodiment, the circuit arrangement in the following stage of a memory unit included in a pixel differs from the Tenth Embodiment. The rest of the configuration is similar to that in the Tenth Embodiment. The detailed description of a part having a function similar to that in the Tenth Embodiment will be omitted by assigning the same reference numeral as that in the Tenth Embodiment.

FIG. 22 is an overall block diagram of the image pickup apparatus according to the present exemplary embodiment. An image pickup apparatus 2101 can be formed of a single chip while using a semiconductor substrate. The image pickup apparatus 2101 includes a plurality of pixels disposed in an image pickup region 2102. The image pickup apparatus 2101 further includes a control unit 2103. The control unit 2103 supplies a control signal, a power supply voltage and the like to a vertical scanning unit 2104, a signal processing unit 2105, and an output unit 2106.

Figure 28:
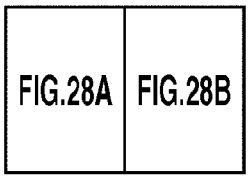
FIG. 28, which is composed of FIGS. 28A and 28B, is an equivalent circuit diagram illustrating an exemplary embodiment according to the present invention.
Figure 28A:
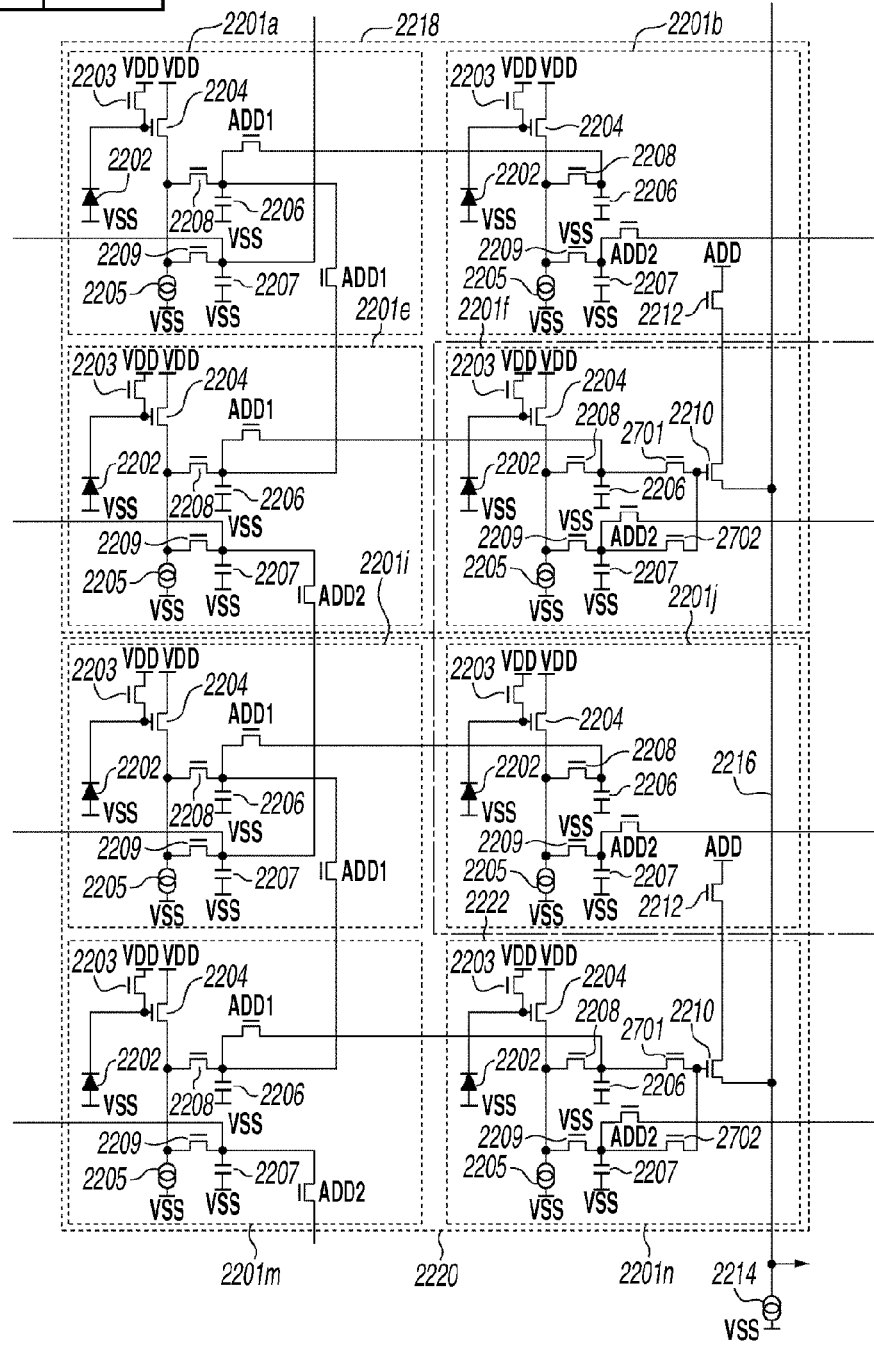
Figure 28B:
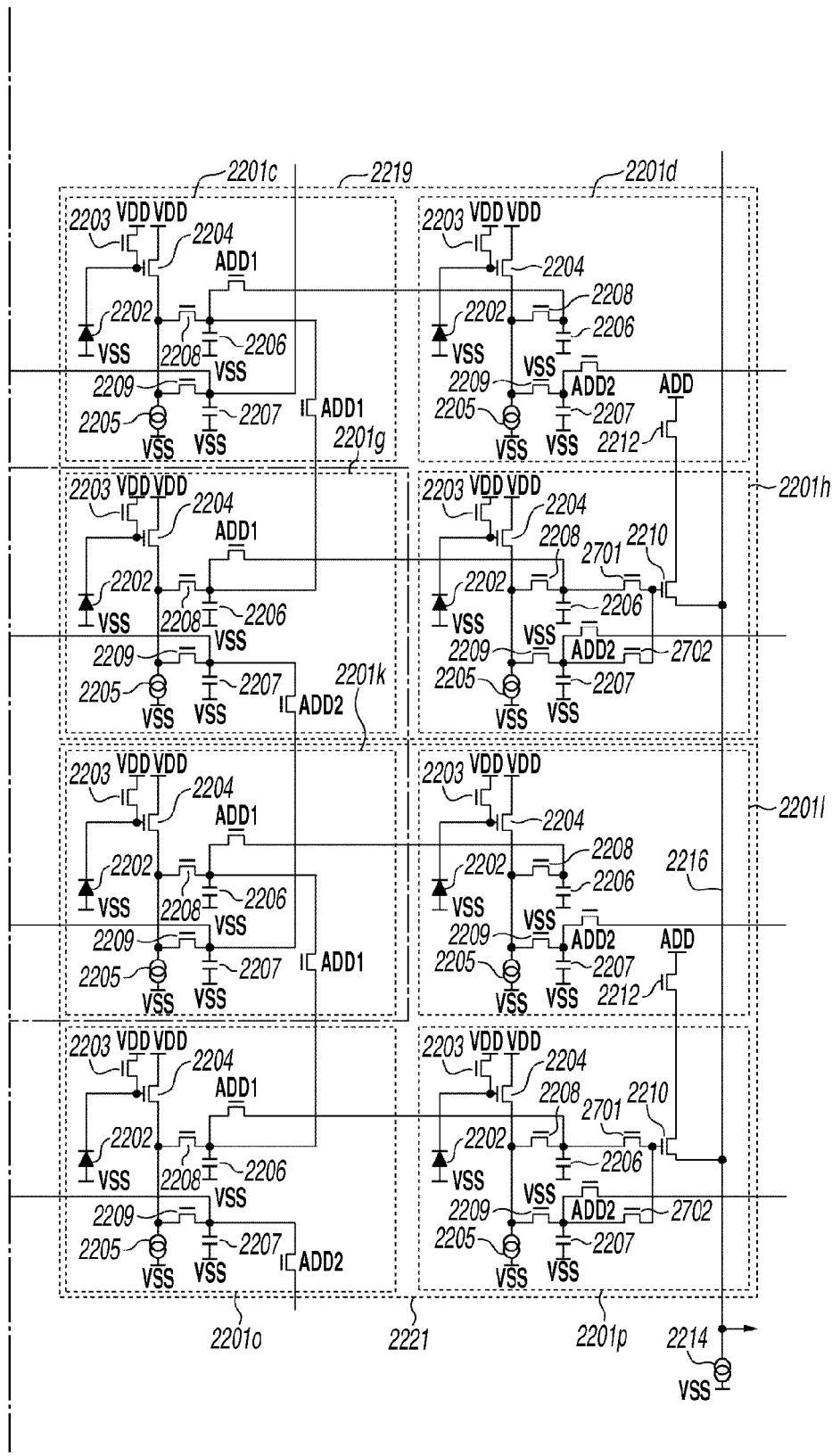

FIG. 28, which is composed of FIGS. 28A and 28B, is an equivalent circuit diagram of the image pickup apparatus according to the present exemplary embodiment. While sixteen pixels 2201 are illustrated in FIG. 28, the image pickup region 2102 may include a greater number of the pixels 2201. These pixels 2201 are disposed in a matrix in the present exemplary embodiment, where the aforementioned sixteen pixels 2201 are disposed in a matrix of four rows and four columns. Note that the plurality of pixels need not be disposed in a matrix but may be disposed one- or two-dimensionally within the image pickup region 2102. Memory units of the plurality of pixels are connected to one another by a connecting unit as illustrated in FIG. 28. Therefore, two pixels adjoining each other in FIG. 28 need not adjoin in the actual device. The pixel as well as an element included in the pixel is labeled in a manner similar to that in the Tenth Embodiment. Hereinafter, a pixel 2201a, a pixel 2201b, a pixel 2201e, and a pixel 201f form a first combination of pixels while the pixel 2201f, a pixel 2201g, a pixel 2201j, and a pixel 2201k form a second combination of pixels.

In the present exemplary embodiment, a signal obtained by averaging signals from the first combination of the plurality of pixels 2201 and a signal obtained by averaging signals from the second combination of the plurality of pixels 2201 are both output to an output line 2216. Accordingly a third amplification transistor 2211, a second selection transistor 2213, a current source 2215, and an output line 2217 included in the Tenth Embodiment are omitted from the image pickup apparatus according to the present exemplary embodiment. Switches 2701 and 2702 are disposed in an electric path between a gate of a second amplification transistor 2210 and each of a first capacitance 206 and a second capacitance 2207, respectively.

The operation of the switch 2701 and the switch 2702 will be described. The switch 2701 is turned on while turning off the switch 2702 when reading the signal obtained by averaging the signals from the first combination of the plurality of pixels 2201. On the other hand, the switch 2702 is turned on while turning off the switch 2701 when reading the signal obtained by averaging the signals from the second combination of the plurality of pixels 2201.

As described above, the averaged signal obtained from the first combination of pixels and the averaged signal obtained from the second combination of pixels are output to the same output line in the present exemplary embodiment, whereby the number of wirings can be decreased.

A gate of the switch 2701 may be connected to a gate of a switch ADD1 so that a wiring region can be decreased, the wiring being provided to control the switch 2701.

Moreover, a gate of the switch 2702 may be connected to a gate of a switch ADD2 so that a wiring region can be decreased, the wiring being provided to control the switch 2702.

A reset transistor may be connected to a gate of the second amplification transistor 2210, so that the voltage across the gate of the second amplification transistor 2210 can be reset to a predetermined value before outputting the signal held in the memory unit to the output line 2216. The image quality can be enhanced as a result.

Another transistor as a dummy may be connected to the first capacitance 2206 and the second capacitance 2207 included in the pixel 2201*b*, a pixel 2201*d*, the pixel 2201*j*, and a pixel 2201*l*, so that each capacitance included in four of the pixels 2201 is connected to three transistors. The averaging can be carried out more accurately as a result since the variation in the capacitance value can be reduced or eliminated.

The Fifteenth Embodiment

Another exemplary embodiment of an image pickup apparatus according to the present invention will now be described. The present exemplary embodiment differs from the Tenth though Fourteenth Embodiments in that a connecting unit includes a switch which connects a memory unit in a pixel and a bypass wiring. The detailed description of a part having a function similar to that in any one of the Tenth through Fourteenth Embodiments will be omitted by assigning the same reference numeral as that therein.

FIG. 22 is an overall block diagram of the image pickup apparatus according to the present exemplary embodiment. An image pickup apparatus 2101 can be formed of a single chip while using a semiconductor substrate. The image pickup apparatus 2101 includes a plurality of pixels disposed in an image pickup region 2102. The image pickup apparatus 2101 further includes a control unit 2103. The control unit 2103 supplies a control signal, a power supply voltage and the like to a vertical scanning unit 2104, a signal processing unit 2105, and an output unit 2106.

Figure 29:
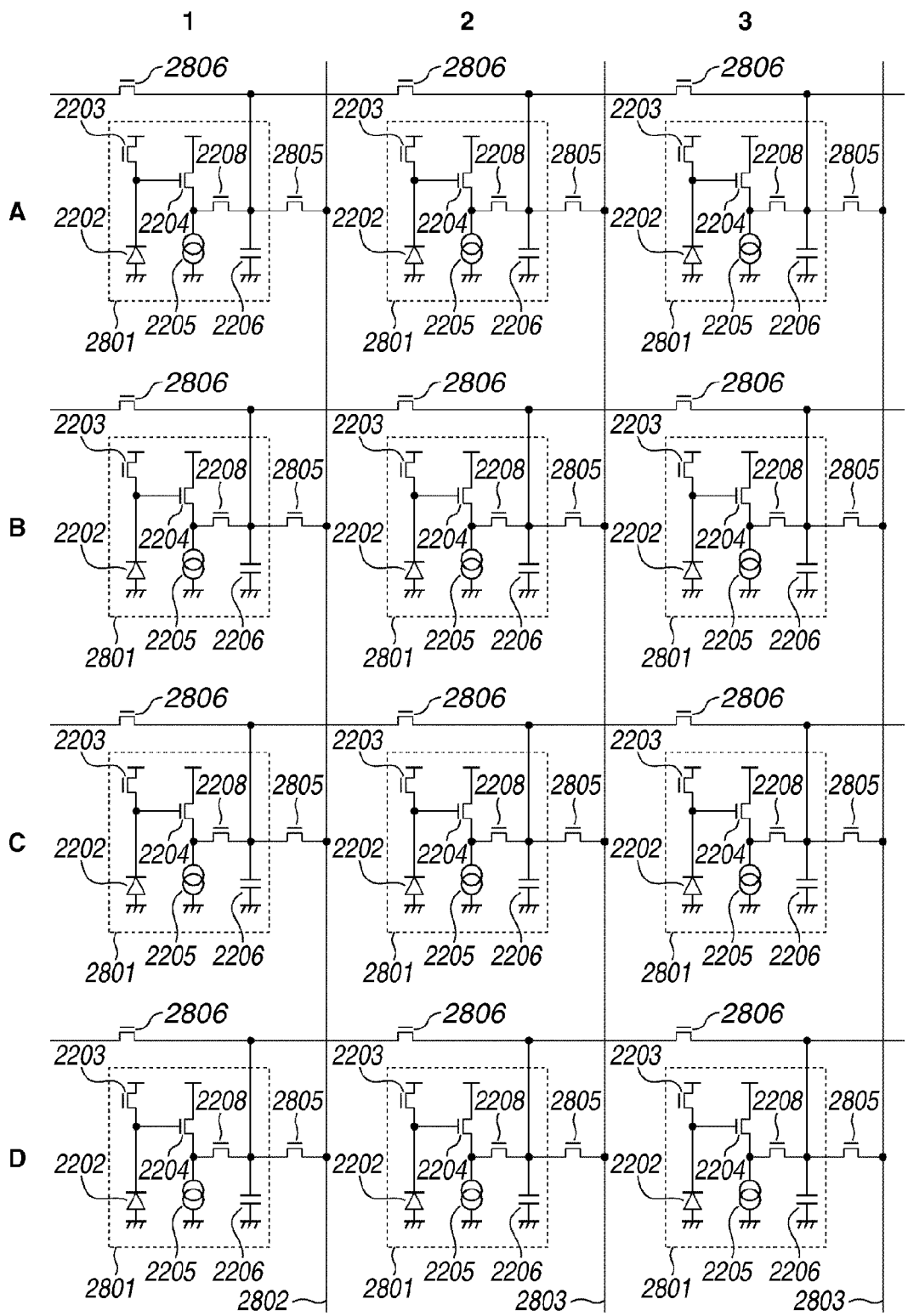
FIG. 29 is an equivalent circuit diagram illustrating an exemplary embodiment according to the present invention.

FIG. 29 is an equivalent circuit diagram of the image pickup apparatus according to the present exemplary embodiment. While twelve pixels 2801 are illustrated in FIG. 29, the image pickup region 2102 may include a greater number of the pixels 2801. These pixels 2801 are disposed in a matrix in the present exemplary embodiment. Note that the plurality of pixels need not be disposed in a matrix but may be disposed one- or two-dimensionally within the image pickup region 2102. The pixel is labeled in a manner similar to that in FIGS. 25 to 27.

FIG. 29 illustrates an example where the memory unit in the pixel 2801 includes only one capacitance. Specifically, a second capacitance 2207 and a second SH switch 2209 in a pixel 2201 illustrated in FIG. 28 are omitted from FIG. 29. Note that the memory unit in the pixel 2801 may include two capacitances in the present exemplary embodiment.

The image pickup apparatus according to the present exemplary embodiment includes a bypass wiring 2802, a bypass wiring 2803, and a bypass wiring 2804. The connecting unit includes a plurality of switches 2805 and a plurality of switches 2806. The switch 2805 electrically connects a capacitance 2206 in each pixel with any of the bypass wirings, while the switch 2806 electrically connects the capacitances 2206 included in two of the pixels with each other. Each of the plurality of switches 2805 and the plurality of switches 2806 is controlled independently.

The combination of pixels can be varied in the present exemplary embodiment, the pixels including the memory unit connected by the connecting unit. A case where the memory unit in each of a pixel A1, a pixel A2, a pixel B1, and a pixel B2 is connected will be described as an example. The switch 2805 disposed in the electric path between the capacitance 2206 in each of the four pixels and the bypass wirings 2802 and 2803 is turned on. Furthermore, the switch 2806 disposed in the electric path between the capacitance 2206 in the pixel A1 and the capacitance 2206 in the pixel A2 as well as the switch 2806 disposed in the electric path between the capacitance 2206 in the pixel B1 and the capacitance 2206 in the pixel B2 are turned on. The other switches 2805 and 2806 are turned off. As a result, the four capacitances 2206 are connected through the bypass wiring and the switch 2806.

Now, a case where the memory unit included in each of the pixel A1, the pixel A2, a pixel C1, and a pixel C2 is connected will be described. In this case, the switch 2805 disposed in the electric path between the capacitance 2206 in each of the pixels C1 and C2 and each of the bypass wirings 2802 and 2803 is turned on instead of turning on the switch 2805 disposed in the electric path between the capacitance 2206 in each of the pixels B1 and B2 and each of the bypass wirings 2802 and 2803. As a result, the capacitances 2206 included in the pixel A1, the pixel A2, the pixel C1, and the pixel C2 are connected through the bypass wiring and the switch 2806.

The connecting unit in the present exemplary embodiment includes the switch which connects the memory unit in the pixel and the bypass wiring, whereby the combination of pixels can be varied. As a result, the freedom in selecting a photoelectric conversion unit which is used to reduce the noises caused by a high-frequency component can be further increased.

The Sixteenth Embodiment

Figure 30:
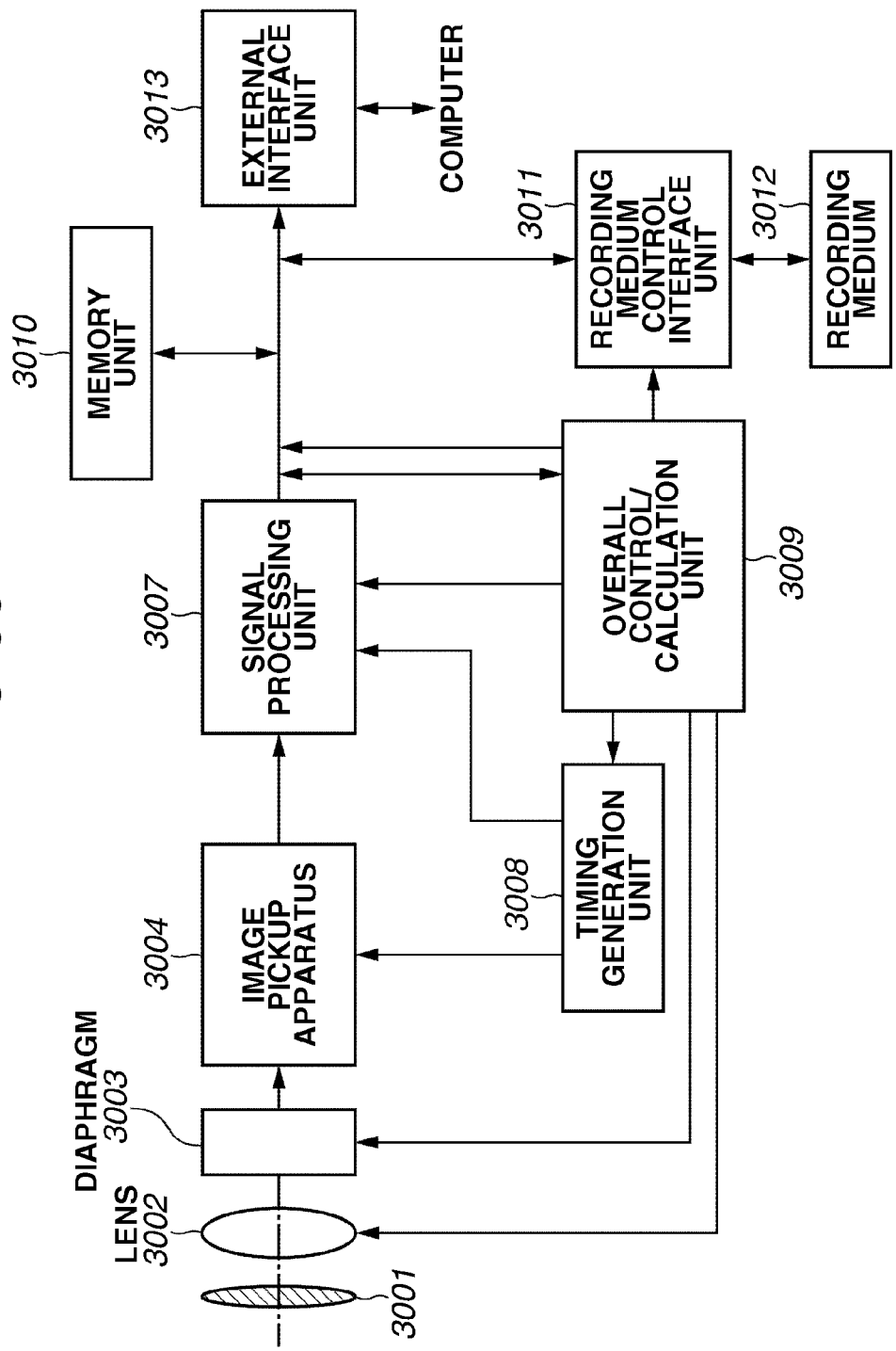
FIG. 30 is a block diagram illustrating an exemplary embodiment of an image pickup system according to the present invention.

An exemplary embodiment of an image pickup system according to the present invention will now be described. The image pickup system can be a digital still camera, a digital camcorder, a copying machine, a facsimile, a mobile phone, an in-vehicle camera, an observation satellite, and the like. FIG. 30 is a block diagram of the digital still camera illustrated as an example of the image pickup system.

As illustrated in FIG. 30, a barrier 3001 protects a lens, a lens 3002 focuses an optical image of an object onto an image pickup apparatus 3004, and a diaphragm 3003 adjusts the amount of light passing through the lens 3002. The image pickup apparatus 3004 corresponding to the image pickup apparatus described in each of the aforementioned exemplary embodiments converts the optical image focused by the lens 3002 as image data. Here, an AD conversion unit is formed on a semiconductor substrate of the image pickup apparatus 3004. A signal processing unit 3007 is provided to perform various corrections on imaged data or compress the imaged data that is output from the image pickup apparatus 3004.

Moreover, as illustrated in FIG. 30, a timing generation unit 3008 outputs various timing signals to the image pickup apparatus 3004 and the signal processing unit 3007, and an overall control unit 3009 controls the entire digital still camera. A frame memory unit 3010 temporarily stores the image data, an interface unit 3011 is provided to store or read data into/from a recording medium, and a recording medium 3012 such as a semiconductor memory that is detachably mounted stores or reads the imaged data. An interface unit 3013 is provided to communicate with an external computer or the like. Here, the timing signal may be input from outside the image pickup system so that the image pickup system includes at least the image pickup apparatus 3004 and the signal processing unit 3007 which processes the imaged signal that is output from the image pickup apparatus 3004.

While the present exemplary embodiment has described a case where the image pickup apparatus 3004 and the AD conversion unit are formed on the same semiconductor substrate, the image pickup apparatus 3004 and the AD conversion unit may be provided on a separate semiconductor substrate instead. The image pickup apparatus 3004 and the signal processing unit 3007 may be formed on the same substrate as well.

As described above, the image pickup apparatus of the present exemplary embodiment according to the present invention can be applied to the image pickup system, thereby allowing the image quality of the image pickup system to be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-157552 filed Jul. 13, 2012 and No. 2012-157553 filed Jul. 13, 2012, which are hereby incorporated by reference herein in their entirety.

What is claimed is:

1. A driving method for an image pickup apparatus that includes a plurality of pixels each including a photoelectric conversion portion, the driving method comprising:
    performing photoelectric conversion in each of the plurality of photoelectric conversion portions during period starting at first time and ending at second time;
    generating a plurality of first signals, each being a signal deriving from electric charge generated through the photoelectric conversion in the photoelectric conversion portion, wherein at least two of the first signals are generated for each of the plurality of pixels;
    generating a plurality of second signals by adding or averaging the at least two of first signals generated for each of the plurality of pixels to or with the first signals of respectively different pixels; and
    performing adding or averaging processing in such a way as to equalize an alignment pitch of a plurality of photoelectric conversion portions in a first direction with a signal centroid pitch of the plurality of second signals in the first direction.

2. The driving method according to claim 1, wherein the position of the signal centroid of the second signal is a midpoint between centroids of a plurality of the photoelectric conversion portions that generates the first signals to be added or averaged to generate the second signal.

3. The driving method according to claim 1, wherein each of the plurality of pixels includes a plurality of capacitors, and wherein the at least two of first signals that are generated for each of the plurality of pixels are output to the plurality of capacitors.

4. The driving method according to claim 3, wherein the plurality of pixels includes a first pixel, a second pixel, and a third pixel,
    wherein a first capacitor of the plurality of capacitors of the first pixel is electrically connected to any one of the plurality of capacitors of the second pixel via a first switch,
    wherein a second capacitor of the plurality of capacitors of the second pixel is electrically connected to any one of the plurality of capacitors of the third pixel via a second switch, and
    wherein the driving method further comprises generating the plurality of second signals by turning on the first switch and the second switch.

5. The driving method according to claim 3, wherein each of the plurality of pixels includes an amplification portion, and
    wherein the amplification portion is configured to output the plurality of first signals to the plurality of capacitors.

6. The driving method according to claim 1, wherein the plurality of pixels is arranged in a matrix pattern,
    wherein the image pickup apparatus includes column circuits provided correspondingly to each column of the plurality of pixels,
    wherein the column circuit includes a plurality of capacitors, and
    wherein the at least two of first signals generated for each of the plurality of pixels is output to the plurality of capacitors.

7. The driving method according to claim 6, further comprising:
    outputting the at least two of first signals generated for the pixel included in an n-th row (n being an integer) to a first capacitor and a second capacitor of the plurality of capacitors;
    outputting the at least two of first signals generated for the pixel included in an (n+m)th row (m being a natural number) to the first capacitor and a third capacitor of the plurality of capacitors while storing the first signal output from the pixel included in the n-th row in the second capacitor; and
    generating one of the plurality of second signals by adding or averaging the first signal output from the pixel included in the n-th row and stored in the second capacitor to or with the first signal output from the pixel included in the (n+m)th row and stored in the first or the third capacitor.

8. The driving method according to claim 1, wherein the plurality of pixels is arranged in a matrix pattern,
    wherein the image pickup apparatus includes column circuits provided correspondingly to each column of the plurality of pixels,
    wherein the column circuit includes an analog-to-digital conversion unit, a first memory, a second memory, and an adder,
    wherein the analog-to-digital conversion unit is configured to convert the first signal of the pixel into a digital signal, and the digital signal obtained through the conversion is stored in any one of the first memory and the second memory for each row, and
    wherein the driving method further comprises:
        outputting, to the adder, the first signal generated for the pixel included in an n-th row (n being an integer) and stored in the first memory so as to be added with the first signal generated for the pixel included in an (n−m)th row (m is being natural number) and stored in the second memory; and outputting, to the adder, the first signal generated for the pixel included in the n-th row and stored in the first memory so as to be added with the first signal generated for the pixel included in an (n+m)th row and stored in the second memory.

9. The driving method according to claim 1, wherein the plurality of pixels is arranged in a matrix pattern,
wherein the image pickup apparatus includes an analog-to-digital conversion unit provided correspondingly to each column of the plurality of pixels,
wherein the analog-to-digital conversion unit includes a comparator, a first counter, and a second counter,
wherein the comparator is configured to compare an analog signal of the pixel with a reference signal, and
wherein the at least two of first signals generated for each of the plurality of pixels are a plurality of signals indicating comparison results that are output from the comparator to the first counter and the second counter.

10. The driving method according to claim 9, further comprising:
before the analog-to-digital conversion unit starts analog-to-digital conversion processing on the first signal of the pixel included in an n-th row (n being an integer), resetting the first counter while holding a count value of the second counter obtained when the analog signal of the pixel included in an (n−m)th row (m being a natural number) is converted to a digital signal; and
performing the analog-to-digital conversion processing on the first signal of the pixel included in the n-th row, by starting counts of both the first counter and the second counter after the first counter has been reset.

11. The driving method according to claim 1, wherein each of the plurality of pixels includes a transfer portion configured to transfer electric charge of the photoelectric conversion portion, and
wherein the plurality of first signals is generated for each of the plurality of pixels when the transfer portion concurrently transfers the electric charge of the photoelectric conversion portion to a plurality of transfer destinations.

12. The driving method according to claim 11, wherein the electric charges transferred from the plurality of photoelectric conversion portions are added in each of the plurality of transfer destinations.

13. The driving method according to claim 1, wherein the plurality of second signals is generated in the image pickup apparatus.

14. The driving method according to claim 1, wherein electric charge generated through the photoelectric conversion is accumulated in each of the plurality of pixels during the period, and the plurality of first signals are signals deriving from the electric charges accumulated during the period.

15. A driving method for an image pickup apparatus that includes a plurality of pixels each including a photoelectric conversion portion, the driving method comprising:
performing photoelectric conversion in each of the plurality of photoelectric conversion portions during a period starting at first time and ending at second time;
outputting a plurality of first signals, each being a signal deriving from electric charge generated through the photoelectric conversion in the photoelectric conversion portion, wherein at least two of the first signals are generated for each of the plurality of pixels;
generating a plurality of second signals by adding or averaging the at least two of first signals generated for each of the plurality of pixels to or with the first signals of respectively different pixels; and
performing adding or averaging processing in such a way as to equalize an alignment pitch of a plurality of photoelectric conversion portions in a first direction with a sampling pitch of the plurality of second signals in the first direction.

16. A driving method for an image pickup apparatus that includes a plurality of pixels each including a photoelectric conversion portion, the driving method comprising:
performing photoelectric conversion in each of the plurality of photoelectric conversion portions during a period starting at first time and ending at second time;
generating a plurality of first signals, each being a signal deriving from electric charge generated through the photoelectric conversion in the photoelectric conversion portion, wherein at least two of the first signals are generated for each of the plurality of pixels; and
generating a plurality of second signals by performing moving average processing on the plurality of first signals;
wherein the first time is a start time of a single exposure period in each of the plurality of photoelectric conversion portions, and the second time is an end time of the single exposure period in each of the plurality of photoelectric conversion portions.

17. The driving method according to claim 16, wherein a global shutter type exposure processing is performed in the performing exposure processing.

18. The driving method according to claim 16, wherein a rolling shutter type exposure processing is performed in the performing exposure processing.

* * * * *